(12) United States Patent
Callahan

(10) Patent No.: US 10,140,387 B2
(45) Date of Patent: *Nov. 27, 2018

(54) MODEL FOR MANAGING VARIATIONS IN A PRODUCT STRUCTURE FOR A PRODUCT

(75) Inventor: Sean M. Callahan, Bellevue, WA (US)

(73) Assignee: The Boeing Company, Chicago, IL (US)

(*) Notice: Subject to any disclaimer, the term of this patent is extended or adjusted under 35 U.S.C. 154(b) by 318 days.

This patent is subject to a terminal disclaimer.

(21) Appl. No.: 13/585,664

(22) Filed: Aug. 14, 2012

(65) Prior Publication Data

US 2013/0218527 A1 Aug. 22, 2013

Related U.S. Application Data

(63) Continuation-in-part of application No. 11/459,975, filed on Jul. 26, 2006, now Pat. No. 8,275,799.

(60) Provisional application No. 60/704,631, filed on Aug. 2, 2005.

(51) Int. Cl.
*G06F 7/00* (2006.01)
*G06F 17/30* (2006.01)
*G06F 17/50* (2006.01)

(52) U.S. Cl.
CPC .......... *G06F 17/50* (2013.01); *G06F 2217/02* (2013.01); *G06F 2217/78* (2013.01)

(58) Field of Classification Search
CPC .................................................. G06F 2217/08
See application file for complete search history.

(56) References Cited

U.S. PATENT DOCUMENTS

| 5,119,307 | A | | 6/1992 | Blaha et al. |
| 5,121,330 | A | | 6/1992 | Blaha et al. |
| 5,689,711 | A | * | 11/1997 | Bardasz ............ G06F 8/34 345/420 |

(Continued)

FOREIGN PATENT DOCUMENTS

| EP | 1357486 A2 | 10/2003 |
| EP | 1447760 A2 | 8/2004 |

(Continued)

OTHER PUBLICATIONS

Salman Azhar; Building Information Modeling (BIM): Trends, Benefits, Risks, and Challenges for the AEC Industry; 2011; ASCE; pp. 241-252.*

(Continued)

*Primary Examiner* — Mariela Reyes
*Assistant Examiner* — Jermaine Mincey
(74) *Attorney, Agent, or Firm* — Yee & Associates, P.C.

(57) ABSTRACT

A method and apparatus for managing variations in a product structure for a product. In one illustrative embodiment, a product management system for managing variations in a product structure for a product comprises a model. The model comprises a primary hierarchical organization and a number of optimized product variant structures. The primary hierarchical organization comprises a group of domain master objects. The number of optimized product variant structures comprises a group of domain configuration objects in which each domain configuration object in the group of domain configuration objects represents a configuration for a component represented by a corresponding domain master object in the group of domain master objects.

17 Claims, 35 Drawing Sheets

(56) References Cited

U.S. PATENT DOCUMENTS

| | | | |
|---|---|---|---|
| 5,710,635 | A | 1/1998 | Webster et al. |
| 6,047,283 | A | 4/2000 | Braun |
| 6,065,010 | A | 5/2000 | Otsuka et al. |
| 6,260,068 | B1 | 7/2001 | Zalewski et al. |
| 6,278,452 | B1 | 8/2001 | Huberman et al. |
| 6,647,508 | B2 | 11/2003 | Zalewski et al. |
| 6,839,714 | B2 | 1/2005 | Wheeler et al. |
| 7,038,677 | B2 | 5/2006 | Callahan |
| 7,085,776 | B2 | 8/2006 | Callahan |
| 7,124,275 | B2 | 10/2006 | Gemmel et al. |
| 7,483,944 | B2 | 1/2009 | Parupudi et al. |
| 7,730,498 | B2 | 6/2010 | Resnick et al. |
| 7,877,238 | B2 | 1/2011 | Watanabe et al. |
| 7,882,132 | B2 | 2/2011 | Ghatare |
| 8,275,799 | B2 | 9/2012 | Callahan |
| 2002/0016892 | A1 | 2/2002 | Zalewski et al. |
| 2003/0055674 | A1* | 3/2003 | Nishiyama ............ G06Q 10/06 703/8 |
| 2003/0204527 | A1* | 10/2003 | Callahan ................ G06F 17/50 |
| 2004/0140976 | A1 | 7/2004 | Callahan |
| 2004/0176905 | A1 | 9/2004 | Sanqunetti et al. |
| 2005/0015378 | A1 | 1/2005 | Gammel et al. |
| 2005/0038780 | A1* | 2/2005 | de Souza et al. .............. 707/3 |
| 2005/0060329 | A1 | 3/2005 | Watanabe et al. |
| 2005/0080792 | A1 | 4/2005 | Ghatare |
| 2005/0080800 | A1 | 4/2005 | Parupudi et al. |
| 2005/0138057 | A1* | 6/2005 | Bender et al. .............. 707/102 |
| 2005/0165807 | A1 | 7/2005 | Srinivasan et al. |
| 2006/0122967 | A1 | 6/2006 | Purkayastha et al. |
| 2007/0033204 | A1 | 2/2007 | Callahan |
| 2009/0070368 | A1 | 3/2009 | Callahan |
| 2013/0080478 | A1 | 3/2013 | Ben-Haim et al. |
| 2015/0213154 | A1 | 7/2015 | Toebben et al. |
| 2016/0162607 | A1 | 6/2016 | Callahan |

FOREIGN PATENT DOCUMENTS

| | | | | |
|---|---|---|---|---|
| EP | | 1507223 | A1 | 2/2005 |
| EP | | 2698734 | A2 * | 2/2014 ......... G06F 17/5086 |
| WO | WO2007016551 | | | 2/2007 |

OTHER PUBLICATIONS

Shah et al., "Assembly Modeling as an Extension of Feature-Based Design," Research in Engineering Design, vol. 5, No. 3-4, Sep. 1993, pp. 218-237.
PCT Search Report dated Feb. 2, 2007 application No. PCT/US2006029899, 3 pages.
USPTO Office Action dated May 2, 2008 for U.S. Appl. No. 11/459,975, 38 pages.
Response to Office Action dated Aug. 13, 2008 for U.S. Appl. No. 11/459,975, 12 pages.
USPTO Final Office Action dated Nov. 18, 2008 for U.S. Appl. No. 11/459,975, 21 pages.
Response to Final Office Action filed with Request for Continued Examination dated Feb. 18, 2009 for U.S. Appl. No. 11/459,975, 19 pages.
USPTO Office Action dated May 1, 2009 for U.S. Appl. No. 11/459,975, 27 pages.
Response to Office Action dated Jul. 15, 2009 for U.S. Appl. No. 11/459,975, 18 pages.
USPTO Final Office Action dated Oct. 7, 2009 for U.S. Appl. No. 11/459,975, 30 pages.
Response to Final Office Action dated Jan. 7, 2010 for U.S. Appl. No. 11/459,975, 17 pages.
USPTO Office Action dated Jun. 3, 2010 for U.S. Appl. No. 11/459,975, 24 pages.
Response to Office Action dated Aug. 31, 2010 for U.S. Appl. No. 11/459,975, 18 pages.
USPTO Office Action dated Dec. 14, 2010 for U.S. Appl. No. 11/459,975, 23 pages.
Response to Office Action dated Apr. 13, 2011 for U.S. Appl. No. 11/459,975, 16 pages.
USPTO Final Office Action dated Jul. 8, 2011 for U.S. Appl. No. 11/459,975, 18 pages.
Response to Final Office Action dated Sep. 9, 2011 for U.S. Appl. No. 11/459,975, 15 pages.
USPTO Office Action dated Dec. 15, 2010 for U.S. Appl. No. 12/266,846, 12 pages.
Response to Office Action dated Mar. 7, 2011 for U.S. Appl. No. 12/266,846, 9 pages.
USPTO Final Office Action dated May 2, 2011 for U.S. Appl. No. 12/266,846, 9 pages.
Response to Final Office Action dated Jul. 28, 2011 for U.S. Appl. No. 12/266,846, 17 pages.
USPTO Office Action dated Oct. 6, 2011 for U.S. Appl. No. 12/266,846, 10 pages.
Response to Office Action dated Mar. 1, 2012 for U.S. Appl. No. 12/266,846, 16 pages.
USPTO notice of allowance dated May 23, 2012 regarding U.S. Appl. No. 12/266,846, 10 pages.
Wongvasu et al., "Representing the relationship between items in logical bill-of-material to support customers' request for quotation for make to order products," Proceedings of SPIE vol. 4192, 2000, pp. 74-85.
Fouda et al., "A Heuristic to Generate a Precedence Graph Between Components for a Product Family," Proceedings of the 4th IEEE International Symposium on Assembly and Task Planning, May 2001, pp. 43-48.
Wongvasu et al., "Trie Representation for Expressing the Compatibility Between Items in a Logical Bill of Material Structure," Proceeding of SPIE vol. 4565, 2001, pp. 84-90.
Callahan, "Extended Generic Product Structure: An Information Model for Representing Product Families," Journal of Computing and Information Science in Engineering, vol. 6, Sep. 2006, pp. 263-275.
Notice of Allowance, dated Aug. 17, 2012, regarding U.S. Appl. No. 11/459,975, 11 pages.
Notice of Allowance, dated Nov. 2, 2012, regarding U.S. Appl. No. 12/266,846, 20 pages.
Extended European Search Report, dated Jul. 13, 2017, regarding Application No. 16201218.1, 13 pages.
State Intellectual Property Office of the PRC, dated Aug. 1, 2017, regarding Application No. 2013103511644, 18 pages.
Extended European Examination Report, dated Nov. 6, 2017, regarding Application No. 13179450.5, 14 pages.
Canadian Intellectual Property Office Examination Search Report, dated Jan. 22, 2015, regarding Application No. 2816830, 6 pages.

\* cited by examiner

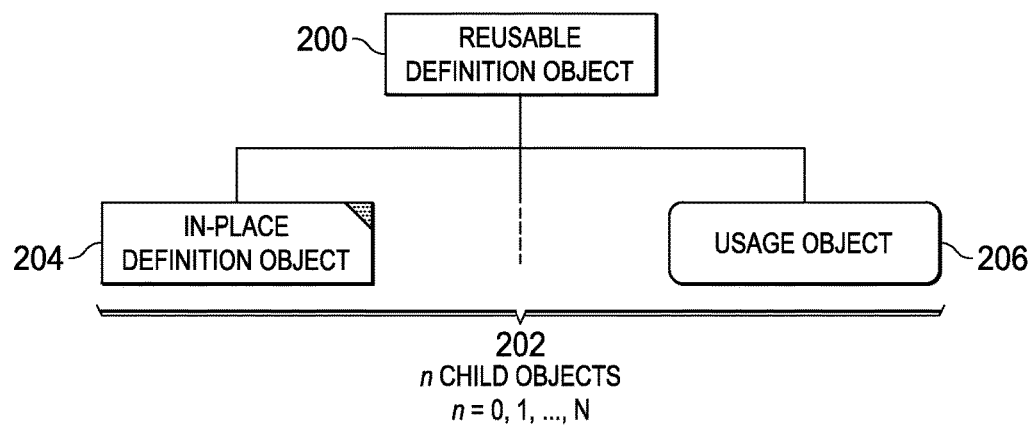
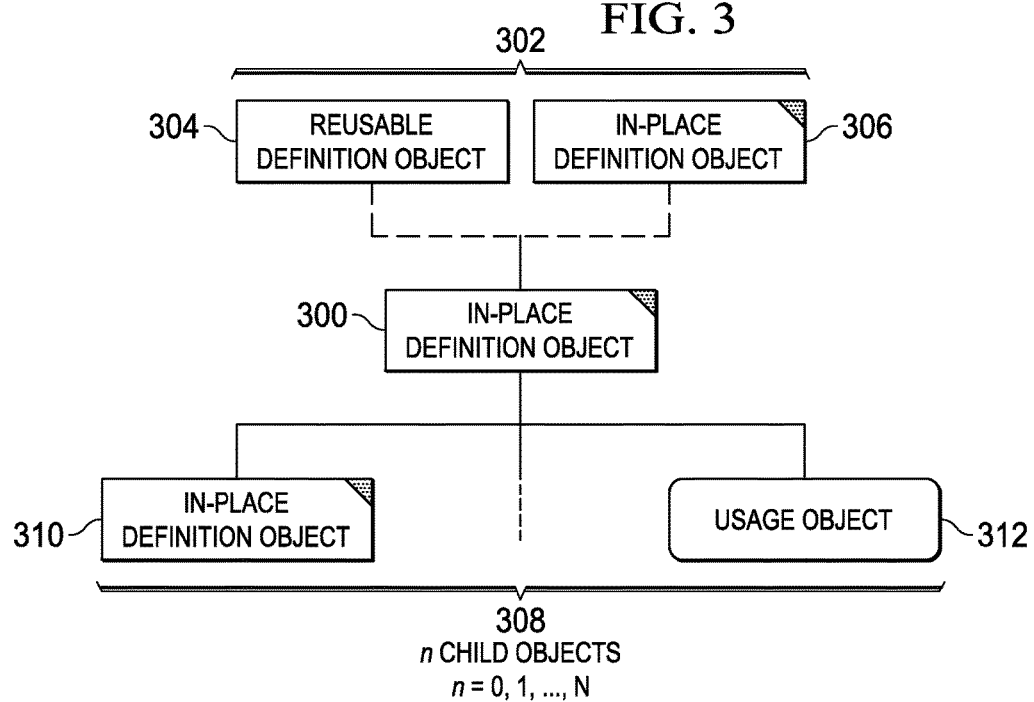

FIG. 35A

| TERMS | DESCRIPTIONS |
|---|---|
| PRODUCT | ANY ITEM THAT HAS BEEN PRODUCED BY LABOR OR EFFORT OR ANY ITEM THAT RESULTS FROM AN ACT OR PROCESS |
| TANGIBLE PRODUCT | ANY PHYSICAL OBJECT THAT CAN BE PERCEIVED BY TOUCH |
| INTANGIBLE PRODUCT | ANY ITEM THAT CAN BE PERCEIVED ONLY INDIRECTLY AND NOT BY TOUCH |
| LEAF COMPONENT | A COMPONENT THAT DOES NOT HAVE ANY SUB-COMPONENTS |
| ASSEMBLY COMPONENT | A COMPONENT MADE UP OF TWO OR MORE SUB-COMPONENTS |
| SUB-ASSEMBLY COMPONENT | AN ASSEMBLY COMPONENT THAT IS PART OF ANOTHER ASSEMBLY COMPONENT |
| PRODUCT STRUCTURE | A LOGICAL HIERARCHICAL DECOMPOSITION OF A PRODUCT WITH RESPECT TO THE COMPONENTS THAT MAKE UP THE PRODUCT |
| MODEL | A COMPUTER-BASED REPRESENTATION OF A PRODUCT |
| CONFIGURATION | A PARTICULAR IMPLEMENTATION FOR A COMPONENT |
| FUNDAMENTAL OBJECT | AN OBJECT BELONGING TO A FUNDAMENTAL CLASS |
| MASTER OBJECT | AN OBJECT BELONGING TO A MASTER CLASS |
| DEFINITION OBJECT | A MASTER OBJECT BELONGING TO A DEFINITION CLASS |
| USAGE OBJECT | A MASTER OBJECT BELONGING TO A USAGE CLASS |
| OCCURRENCE OBJECT | A MASTER OBJECT BELONGING TO AN OCCURRENCE CLASS |
| CONFIGURATION OBJECT | AN OBJECT BELONGING TO A CONFIGURATION CLASS |
| DEFINITION CONFIGURATION OBJECT | A CONFIGURATION OBJECT BELONGING TO A DEFINITION CONFIGURATION CLASS |
| USAGE CONFIGURATION OBJECT | A CONFIGURATION OBJECT BELONGING TO A USAGE CONFIGURATION CLASS |
| OCCURRENCE CONFIGURATION OBJECT | A CONFIGURATION OBJECT BELONGING TO AN OCCURRENCE CONFIGURATION CLASS |
| DOMAIN OBJECT | AN OBJECT BELONGING TO A DOMAIN CLASS DERIVED FROM A FUNDAMENTAL CLASS WITH RESPECT TO A SELECTED DOMAIN |
| AUXILIARY OBJECT | AN OBJECT BELONGING TO AN AUXILIARY CLASS DERIVED FROM ONE OF A FUNDAMENTAL CLASS AND A DOMAIN CLASS |
| PORT OBJECT | AN AUXILIARY OBJECT BELONGING TO A PORT CLASS |
| PORT MASTER OBJECT | AN AUXILIARY OBJECT BELONGING TO BOTH A PORT CLASS AND A MASTER CLASS |
| PORT CONFIGURATION OBJECT | AN AUXILIARY OBJECT BELONGING TO BOTH A PORT CLASS AND A CONFIGURATION CLASS |

FIG. 35B

| TERMS | DESCRIPTIONS |
|---|---|
| REUSABLE PORT OBJECT | A PORT OBJECT THAT IS NOT THE CHILD OBJECT OF ANY OTHER OBJECT AND THAT CAN BE INSTANTIATED WITHIN A MODEL |
| INTERFACE PORT OBJECT | A PORT OBJECT THAT IS A CHILD OBJECT OF A ROOT OBJECT AND THAT IS NOT DIRECTLY CONNECTABLE TO ANOTHER PORT OBJECT |
| CONNECTABLE PORT OBJECT | A PORT OBJECT THAT IS THE CHILD OBJECT OF A FUNDAMENTAL OBJECT THAT IS NOT A ROOT OBJECT AND THAT IS CONNECTABLE TO ANOTHER CONNECTABLE PORT OBJECT |
| PROMOTION OBJECT | AN AUXILIARY OBJECT BELONGING TO A PROMOTION CLASS |
| CONNECTION OBJECT | AN AUXILIARY OBJECT BELONGING TO A CONNECTION CLASS |
| INSTANTIATION | A USAGE OR AN OCCURRENCE OF AN OBJECT |
| HIERARCHICAL STRUCTURE | A REPRESENTATION OF AN ARRANGEMENT OF ITEMS IN WHICH THE ITEMS ARE REPRESENTED AS BEING ABOVE, BELOW, OR AT THE SAME LEVEL AS ONE ANOTHER |
| ROOT OBJECT | AN OBJECT AT THE TOPMOST LEVEL IN A HIERARCHICAL STRUCTURE |
| PARENT OBJECT | AN OBJECT HAVING ONE OR MORE CHILD OBJECTS AT A LEVEL IN A HIERARCHICAL STRUCTURE THAT IS ONE LEVEL BELOW THE LEVEL OF THE OBJECT |
| CHILD OBJECT | AN OBJECT HAVING ONE OR MORE PARENT OBJECTS AT A LEVEL IN A HIERARCHICAL STRUCTURE THAT IS ONE LEVEL ABOVE THE LEVEL OF THE OBJECT |
| MAIN STRUCTURE | A HIERARCHCIAL STRUCTURE |
| INSTANTIATED STRUCTURE | A HIERARCHICAL STRUCTURE ASSOCIATED WITH THE MAIN STRUCTURE IN WHICH AN OBJECT IN THE MAIN STRUCTURE IS AN INSTANTIATION OF THE ROOT OBJECT OF THE ASSOCIATED STRUCTURE |
| HIERARCHICAL ORGANIZATION | AN ORGANIZATION OF OBJECTS COMPRISING A MAIN STRUCTURE AND A NUMBER OF ASSOCIATED STRUCTURES |
| PRIMARY HIERARCHICAL ORGANIZATION | AN ORGANIZATION OF MASTER OBJECTS COMPRISING A MAIN STRUCTURE AND A NUMBER OF ASSOCIATED SUBSTRUCTURES |
| SECONDARY HIERARCHICAL ORGANIZATION | AN ORGANIZATION OF CONFIGURATION OBJECTS COMPRISING A MAIN STRUCTURE AND A NUMBER OF ASSOCIATED STRUCTURES |
| STRUCTURAL LINK | A LINK BETWEEN TWO OBJECTS THAT INDICATES THAT ONE OF THE OBJECTS IS THE CHILD OBJECT OF THE OTHER OBJECT |

FIG. 35C

| TERMS | DESCRIPTIONS |
|---|---|
| PRIMARY STRUCTURAL LINK | A STRUCTURAL LINK BETWEEN TWO MASTER OBJECTS IN A PRIMARY HIERARCHICAL ORGANIZATION |
| SECONDARY STRUCTURAL LINK | A STRUCTURAL LINK BETWEEN TWO CONFIGURATION OBJECTS IN A PRIMARY HIERARCHICAL ORGANIZATION |
| INSTANCE LINK | A LINK BETWEEN TWO OBJECTS THAT INDICATES THAT ONE OBJECT IS AN INSTANTIATION OF THE OTHER OBJECT |
| PRIMARY INSTANCE LINK | AN INSTANCE LINK BETWEEN TWO MASTER OBJECTS |
| SECONDARY INSTANCE LINK | AN INSTANCE LINK BETWEEN TWO CONFIGURATION OBJECTS |
| AUXILIARY STRUCTURAL LINK | A LINK BETWEEN AN AUXILIARY OBJECT AND A DOMAIN OBJECT |
| PRIMARY PORT STRUCTURAL LINK | A LINK BETWEEN A PORT MASTER OBJECT AND EITHER A MASTER OBJECT OR ANOTHER PORT MASTER OBJECT |
| SECONDARY PORT STRUCTURAL LINK | A LINK BETWEEN A PORT CONFIGURATION OBJECT AND EITHER A CONFIGURATION OBJECT OR ANOTHER PORT CONFIGURATION OBJECT |
| PROMOTION LINK | A LINK BETWEEN A PROMOTION OBJECT AND A PORT OBJECT |
| CONNECTION LINK | A LINK BETWEEN A CONNECTION OBJECT AND A CONNECTION OBJECT |
| MAPPING LINK | A LINK MAPPING ONE OBJECT IN A MODEL FOR ONE DOMAIN TO ANOTHER OBJECT IN ANOTHER MODEL FOR ANOTHER DOMAIN |

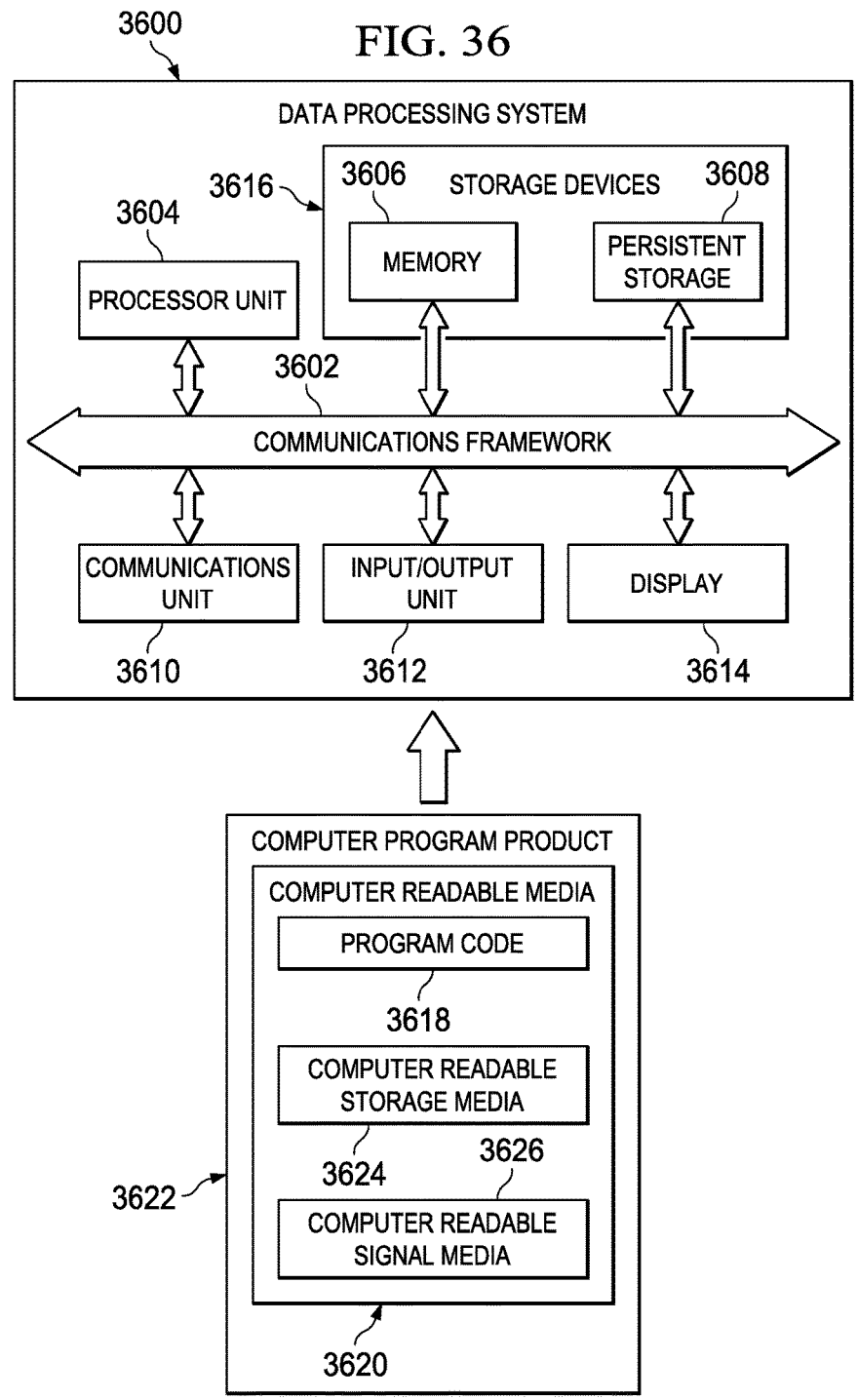

ically in various embodiments of the present disclosure or may be combined in yet other embodiments in which further details can be seen with reference to the following description and drawings.

MODEL FOR MANAGING VARIATIONS IN A PRODUCT STRUCTURE FOR A PRODUCT

CROSS-REFERENCE TO RELATED APPLICATION

This application is a Continuation-In-Part of U.S. patent application Ser. No. 11/459,975, filed Jul. 26, 2006, which issued as U.S. Pat. No. 8,275,799, which claims the benefit of Provisional Patent Application Ser. No. 60/704,631, filed Aug. 2, 2005, both of which are incorporated herein by reference.

BACKGROUND INFORMATION

1. Field

The present disclosure relates generally to managing a model of a product structure for a product and, in particular, to a method and apparatus for using the model to manage and present information about variations in the product structure for the product.

2. Background

A product may be any item that has been produced by labor or effort or any item that results from an act or process. Oftentimes, different variants of a product may be designed and produced. Variants of a product may differ in one or more properties with respect to the design for the product. Oftentimes, computer software, such as, for example, without limitation, computer-aided design (CAD) programs, may be used to manage the designs of products. For instance, computer-aided design models may be used to manage the designs of complex products. A complex product may comprise, for example, without limitation, thousands to millions of components.

As the number of components that make up a product increases, managing the different possible variations in the design for that product may become more difficult. In particular, managing the different variations in the design for a complex product may take more time, effort, resources, and/or processing power than desired.

For example, with some currently available computer-aided design programs for modeling the design of a product, adding a variation to the design of a complex product in a model may require adding redundant data to the model for the design of the complex product. For instance, capturing a modification to the design of the complex product in the model may require copying and/or duplicating more data than just the data associated with the modification.

This type of redundancy of data within the model may increase the amount of time, effort, and cost needed to manage the model relative to a desired amount of time, effort, and cost, respectively. Therefore, it would be desirable to have a method and apparatus that takes into account at least some of the issues discussed above as well as possibly other issues.

SUMMARY

In one illustrative embodiment, a product management system for managing variations in a product structure for a product comprises a model. The model comprises a primary hierarchical organization and a number of optimized product variant structures. The primary hierarchical organization comprises a group of domain master objects. The number of optimized product variant structures comprises a group of domain configuration objects in which each domain configuration object in the group of domain configuration objects represents a configuration for a component represented by a corresponding domain master object in the group of domain master objects.

In another illustrative embodiment, an apparatus for managing variations in a product structure for a product comprises a model. The model comprises a primary hierarchical organization and a number of optimized product variant structures. The primary hierarchical organization comprises a group of domain master objects in which a domain master object in the group of domain master objects belongs to a domain master class derived directly from a corresponding fundamental class. The number of optimized product variant structures comprises a group of domain configuration objects in which a domain configuration object in the group of domain configuration objects belongs to a domain configuration class derived directly from a corresponding fundamental class or indirectly from a domain configuration class. Each domain configuration object in the group of domain configuration objects represents a configuration for a component represented by a corresponding domain master object in the group of domain master objects.

In yet another illustrative embodiment, a computer-implemented method for managing variations in a product structure for a product is provided. A primary hierarchical organization for a model of the product structure for the product is created using a group of domain master objects. A number of optimized product variant structures for the model are created using a group of domain configuration objects. Each domain configuration object in the group of domain configuration objects represents a configuration for a component represented by a corresponding domain master object in the group of domain master objects.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 2 is an illustration of a reusable definition object in the form of a block diagram in accordance with an illustrative embodiment;

FIG. 3 is an illustration of an in-place definition object in the form of a block diagram in accordance with an illustrative embodiment;

FIG. 35A, FIG. 35B, and FIG. 35C are a table of terms and descriptions for these terms in accordance with an illustrative embodiment; and FIG. 36 is an illustration of a data processing system in the form of a block diagram in accordance with an illustrative embodiment.

DETAILED DESCRIPTION

Figure 1:
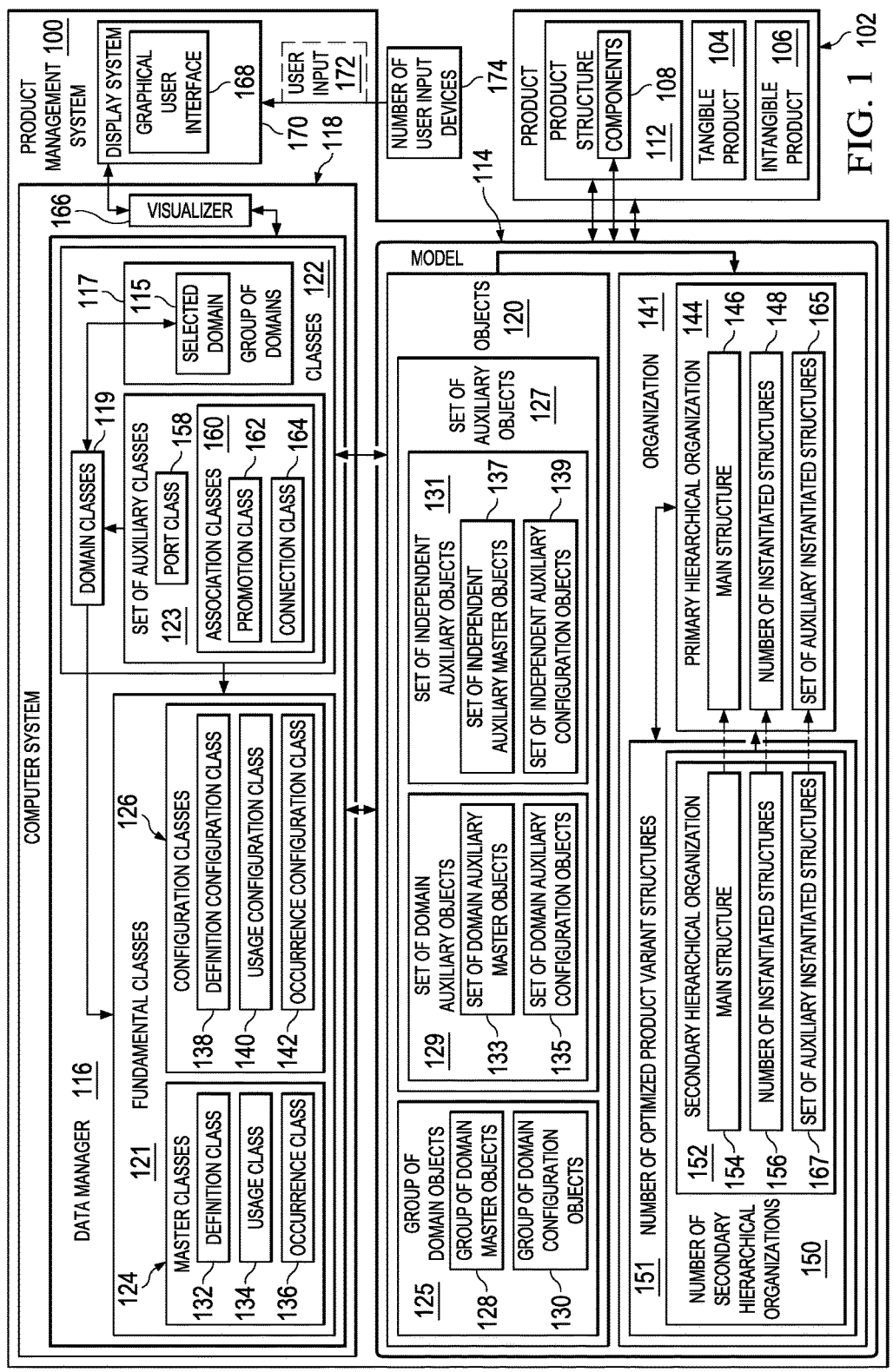
FIG. 1 is an illustration of a product management system in the form of a block diagram in accordance with an illustrative embodiment.

The different illustrative embodiments recognize and take into account different considerations. For example, the different illustrative embodiments recognize and take into account that some currently available computer-aided design (CAD) programs for modeling the design of a complex product may not allow the sharing of common data between variants of a product.

For example, in some cases, with some currently available computer-aided design (CAD) programs, a model of the design for a product may be created for each variant of the product. These programs may not allow data that is common between these models to be shared. Consequently, the amount of data that may need to be stored to capture the different possible variations in the design for a product may require more processing power, data storage, and/or other computer resources than desired.

Further, managing the associations between redundant data and the different variations in the design for a product may require more time and effort than desired. Additionally, the existence of redundant data may make it more difficult than desired to understand the differences between design variants. Consequently, this increase in difficulty and the complexity added by the redundant data may lead to undesired inconsistencies when forming a product. Reworking the product to correct these undesired inconsistencies may be more expensive than desired.

The different illustrative embodiments recognize and take into account that a model that is capable of capturing different possible variations in the design for a product may be desirable. In particular, the different illustrative embodiments recognize and take into account that it may be desirable to have a model that is capable of capturing these different variations without increasing the amount of redundant data in the model more than desired.

Thus, the illustrative embodiments may provide an organization schema for representing variants of a product in a manner that minimizes storage requirements and processing power. For example, in the past, one technique for storing multiple variations of a product was to store a complete set of aircraft system schematics for each variant of the product.

In an extreme example, even with a minor set of differences, like a few changed pumps and actuators, a large fraction of the set of aircraft system schematics may have been saved uniquely for both aircraft system designs. A first set of aircraft system schematics may have been saved for a first aircraft and a second set of aircraft system schematics may have been saved for a second aircraft, when the only difference between the two sets of aircraft system schematics was a different configuration for a single pump or single actuator. As a result, most of the same data may be redundantly saved twice, thereby using storage space undesirably and making it difficult to understand what has changed between the two product design configurations.

However, when using this old technique for storing hundreds of variants of a product that may include hundreds of thousands or even millions of components, the amount of storage space and processing power used to store, compare, and manipulate variations among product schemas may become undesirable due to vast redundancies in stored data. The illustrative embodiments address this issue, and other issues, by providing an organization schema for representing variations in a product using a minimum amount of storage space.

The different illustrative embodiments recognize and take into account that a model that supports sharing of product data between the designs of completely configured variants within a family of products may be desirable. The different illustrative embodiments provide a model that allows data that is common between different variations of a product structure for a product to be shared by different representations of the components for the components in the product. The model allows design data for the product to be shared across a plurality of levels in the hierarchy for the product structure for the product.

Thus, the illustrative embodiments may minimize or eliminate redundant data when representing multiple variations in a product. Further, the different illustrative embodiments may provide a model that may be used to accurately identify and present the differences between product design configurations without using redundant data. In this manner, understanding of the differences between product design configurations may be increased. In particular, an operator may be able to more easily find and understand the differences between product designs using the model provided in the different illustrative embodiments.

For example, in the model provided by the different illustrative embodiments, adding a representation of a change in one component in a sub-assembly to the model does not require that all of the objects representing the components in the sub-assembly be duplicated in the model. This feature is a feature of the completely configured model and is provided without the use of any filtering mechanisms. The model recognizes an overall organization for the product structure for the product that may act as a template for the different variants of the product. In this manner, data sharing between representations of the different variants of the product may be maximized.

Further, the model provided by the different illustrative embodiments may be used for different abstractions of the product structure for the product. These abstractions may include, for example, without limitation, a geometric design, a logical systems design, or some other suitable type of abstraction. The model achieves data scalability for hierarchical product structures such that the amount of new data added to a model to add a representation of a new variant for a product may be proportional to the amount of design change required for the new variant. These different abstractions may be achieved by sub-classing or typing the classes.

Thus, the different illustrative embodiments may provide a method and apparatus for managing variations in a product structure for a product using a model for the product structure. A listing of the different terms related to the different illustrative embodiments and descriptions of these terms, as used herein, may be found in FIGS. 35A-35C below.

Referring now to the figures, FIG. 1 is an illustration of a product management system in the form of a block diagram, depicted in accordance with an illustrative embodiment. In these illustrative examples, product management system 100 may be configured to manage and visually present information about product 102. As used herein, a "product", such as product 102, may be any item that has been produced by labor or effort or any item that results from an act or process.

Product 102 may be selected from one of tangible product 104 and intangible product 106. As used herein, a "tangible product", such as tangible product 104, may be any physical object that can be perceived by touch. For example, tangible product 104 may take the form of, without limitation, a mobile platform, a stationary platform, a vehicle, a house, an electromechanical system, an engine, a robotic machine, a tool, a computer system, an appliance, a manmade structure, a building, a piece of furniture, a writing instrument, a container, an aircraft, or some other suitable type of tangible object. In one illustrative example, product 102 is tangible product 104, which may be an aircraft comprising at least one million components.

As used herein, an "intangible product", such as intangible product 106, may be any item that can be perceived only indirectly and not by touch. For example, intangible product 106 may take the form of, without limitation, a business organizational product, a power point presentation, a logical systems design, a build plan, an assembly sequence, a manufacturing plan, a simulation model, a functional design, a computer-aided design (CAD) model, a policy, a handbook, a dance routine, or some other suitable type of intangible item.

In these illustrative examples, product 102 may comprise components 108. Components 108 may be the different items that, together, form product 102. Components 108 may include tangible components or intangible components, depending on the implementation. In some illustrative examples, components 108 for tangible product 104 may include both tangible and intangible components. Of course, components 108 for intangible product 106 may include only intangible components in these illustrative examples.

Each component in components 108 may be described as either a leaf component or an assembly component. As used herein, a "leaf component" may be a component that does not have any sub-components. In other words, a leaf component may be a primary constituent of product 102 that is not made up of other components. In some cases, product 102 may be a leaf component. In other words, product 102 may be a single component that is indivisible and does not have any sub-components.

An "assembly component", as used herein, may be made up of two or more sub-components. Product 102 may be considered an assembly component in these examples. In some cases, a sub-component of an assembly component may be a leaf component or another assembly component. Further, an assembly component that is part of another assembly component may be referred to as a sub-assembly component.

As depicted, product 102 may have product structure 112. In these illustrative examples, product structure 112 may be a logical hierarchical decomposition of product 102 with respect to components 108 that make up product 102. In other words, product structure 112 may describe the relationships between components 108 as well as the sub-components that make up assembly components in components 108.

In these illustrative examples, product structure 112 may be a logical hierarchical decomposition of product 102 with respect to selected domain 115 from group of domains 117. In some illustrative examples, product 102 may have multiple product structures within a particular domain in group of domains 117.

As used herein, a "group of" items, such as group of domains 117, means one or more items. In this manner, group of domains 117 may be one or more domains. A "domain", as used herein, is a particular level of abstraction for product 102. In other words, each of these domains may be a different way of describing product 102. Group of domains 117 may include, for example, without limitation, a geometric domain, a system domain, a manufacturing domain, and/or other types of domains.

In some cases, product structure 112 may be the logical hierarchical decomposition of a design for product 102 with respect to components 108 that make up product 102. Further, product structure 112 may capture a standard configuration for product 102 and components 108 in product 102. In some illustrative examples, product structure 112 may be referred to as a bill of materials (BOM). In other illustrative examples, product structure 112 may be referred to as an extended generic product structure (EGPS).

The logical hierarchical decomposition of product 102 in product structure 112 may be based on a selected level of abstraction for describing components 108 that make up product 102. For example, components 108 that make up product 102 may be organized in product structure 112 according to one of a selected level of detail, a selected domain for components 108, or some other suitable level of abstraction for describing components 108 that make up product 102.

Product management system 100 may be configured to manage product structure 112 for product 102. In particular, data manager 116 in product management system 100 may manage product structure 112 of product 102. Data manager 116 may be implemented using hardware, software, or a combination of the two.

For example, data manager 116 may be implemented in computer system 118. Computer system 118 may comprise one or more computers. When more than one computer is present in computer system 118, these computers may be in communication with each other. An example of one manner in which computer system 118 may be implemented is described in FIG. 36 below.

In these illustrative examples, data manager 116 in product management system 100 may manage product structure 112 for product 102 using model 114. Model 114 may be a representation of product structure 112 in a form that is substantially comprehensive and yet comprehensible. Further, model 114 may be configured to represent variations in product structure 112 that may result in different variants of product 102. Data manager 116 may manage variations in product structure 112 for product 102 using model 114.

As depicted, data manager 116 may be configured to create model 114 using objects 120. Objects 120 may belong to classes 122. Objects 120 may represent components 108 and/or types of components 108 that make up product 102. An object in objects 120 that belongs to a particular class in classes 122 may be of the type of that particular class. In other words, an object belonging to a particular class may share the same attributes as the attributes for that particular class.

In object-oriented programming, an object may be referred to as an "instance" of a class. However, in these illustrative examples, the word "instance" and "instantiation" are used differently. As used herein, an "instance" or an "instantiation" of an item may mean a usage of that item in model 114. For example, an instantiation of an object, such as one of objects 120, may be a usage of that object in model 114.

In these illustrative examples, classes 122 may be derived from fundamental classes 121. In other words fundamental classes 121 may be the base classes off of which all other classes in classes 122 are directly or indirectly based. Each class in classes 122 may share the attributes of the corresponding fundamental class in fundamental classes 121 from which the class is derived. An object in objects 120 in model 114 belonging to a particular class in classes 122 may be considered as also belonging to the corresponding fundamental class in fundamental classes 121 from which the particular class is derived.

A class in classes 122 may be either directly or indirectly derived from a fundamental class in fundamental classes 121. A class in classes 122 that is indirectly derived from a fundamental class may be a class that is directly derived from another class in classes 122 that is directly derived from a fundamental class. This type of derivation may correspond to one level of indirect derivation. Depending on the implementation, more than one level of indirect derivation may be present between a class in classes 122 and a fundamental class in fundamental classes 121.

An object belonging to one of fundamental classes 121 may be referred to as a fundamental object. As depicted, fundamental classes 121 include master classes 124 and configuration classes 126. An object belonging to one of master classes 124 may be referred to as a master object. A master object may represent a component in product structure 112 for product 102. An object belonging to one of configuration classes 126 may be referred to as a configuration object. In these illustrative examples, a configuration object may correspond to a master object. In particular, the configuration object may represent a configuration for the component in product structure 112 for product 102 represented by the corresponding master object.

As used herein, a "configuration" for a component may be a particular implementation for that component. For example, a configuration for a component in product structure 112 for product 102 may be a variation in product structure 112 for product 102 or may be associated with a particular variation in product structure 112 for product 102.

Different configurations of the same component may, for example, without limitation, have different features, have different properties, have different shapes, comprise different materials, have different attachments, and/or have other differing characteristics. In these examples, a configuration object may belong to only one master object. However, more than one configuration object may belong to the same master object.

As depicted, master classes 124 may include definition class 132, usage class 134, and occurrence class 136. An object belonging to definition class 132 may be referred to as a definition object. An object belonging to usage class 134 may be referred to as a usage object. An object belonging to occurrence class 136 may be referred to as an occurrence object.

In this manner, a definition object, a usage object, and an occurrence object are examples of master objects. Examples of implementations for definition objects, usage objects, and occurrence objects are described in greater detail in FIGS. 2-5 below.

Configuration classes 126 may include definition configuration class 138, usage configuration class 140, and occurrence configuration class 142. An object belonging to definition configuration class 138 may be referred to as a definition configuration object. An object belonging to usage configuration class 140 may be referred to as a usage configuration object. An object belonging to occurrence configuration class 142 may be referred to as an occurrence configuration object.

In this manner, a definition configuration object, a usage configuration object, and an occurrence configuration object are examples of configuration objects. Examples of implementations for definition configuration objects, usage configuration objects, and occurrence configuration objects in group of domain configuration objects 130 are described in greater detail in FIGS. 6-9 below.

Classes 122 may include domain classes 119 and set of auxiliary classes 123. Domain classes 119 may be derived from fundamental classes 121 for selected domain 115. In particular, domain classes 119 include classes derived from each of master classes 124 and each of configuration classes 126 for selected domain 115. An object belonging to one of domain classes 119 may be referred to as a domain object.

Set of auxiliary classes 123 may be classes that are derived from fundamental classes 121 and/or domain classes 119. An auxiliary class in auxiliary classes 123 that is derived from a domain class in domain classes 119 that is directly derived from a fundamental class in fundamental classes 121 may be considered indirectly derived from that fundamental class. An object belonging to set of auxiliary classes 123 may be referred to as an auxiliary object.

Objects 120 in model 114 may include group of domain objects 125 belonging to domain classes 119 and set of auxiliary objects 127 belonging to set of auxiliary classes 123. As used herein, a "set of" items means zero or more items. For example, set of auxiliary objects 127 may be zero, one, two, or some other number of auxiliary classes. In this manner, in some cases, set of auxiliary objects 127 may be an empty set or a null set.

A domain object in group of domain objects 125 is an object that is considered necessary in product structure 112. As depicted, group of domain objects 125 may include group of domain master objects 128 and group of domain configuration objects 130.

Group of domain master objects 128 may belong to one or more domain master classes in domain classes 119 derived from master classes 124. Group of domain master objects 128 may include any number of objects belonging to definition class 132, usage class 134, and/or occurrence class 136.

Further, group of domain configuration objects 130 may belong to one or more domain configuration classes in domain classes 119 derived from configuration classes 126. Group of domain configuration objects 130 may include any number of objects belonging to definition configuration class 138, usage configuration class 140, and occurrence configuration class 142.

In these illustrative examples, objects 120 may be organized into organization 141. Organization 141 may comprise primary hierarchical organization 144 and number of secondary hierarchical organizations 150. Group of domain master objects 128 may be organized into primary hierarchical organization 144 in model 114. For example, without limitation, group of domain master objects 128 may be related to each other in model 114 such that group of domain master objects 128 have primary hierarchical organization 144 with respect to product 102.

Primary hierarchical organization 144 may comprise main structure 146 and number of instantiated structures 148. As used herein, a "number of" items means one or more items. For example, number of instantiated structures 148 may mean one or more instantiated structures.

Main structure 146 of primary hierarchical organization 144 and each instantiated structure in number of instantiated structures 148 of primary hierarchical organization 144 may be hierarchical structures. As used herein, a "hierarchical structure" may be a representation of an arrangement of items in which the items are represented as being above, below, or at the same level as one another. Typically, a hierarchical structure may be organized into a tree structure comprising parent objects and child objects.

In these illustrative examples, first objects that are in a level above second objects may be parent objects of the second objects. The second objects may be child objects of the parent objects. In these illustrative examples, each child object may have only one parent object in a particular hierarchical structure. However, in some cases, an object may be part of two different hierarchical structures and have two different parent objects in these different hierarchical structures. These different hierarchical structures may be considered part of a multi-tree structure in some illustrative examples.

A hierarchical structure may have a root object. As used herein, a "root object" may be the object at the topmost level in a hierarchical structure. Further, in these illustrative examples, a hierarchical structure may have substructures. As used herein, a "substructure" may comprise a particular object and any child objects related to that particular object. Child objects related to a particular object may include child objects of the particular object, child objects of the child objects of the particular object, and so on. The substructure may not include the parent objects of the particular object.

Main structure 146 may represent the hierarchical decomposition of product 102 with respect to components 108 using a plurality of hierarchical levels. Product 102 may be represented in model 114 by the root object of main structure 146 in primary hierarchical organization 144.

One or more of the domain master objects in main structure 146 may be associated with an instantiated structure in number of instantiated structures 148. An instantiated structure in number of instantiated structures 148 may represent the hierarchical decomposition of a particular component in components 108 for product 102 using one or more hierarchical levels. This particular component may be represented by the root object of the instantiated structure.

Each instantiated structure in number of instantiated structures 148 may be implemented in a manner similar to main structure 146. Further, in these illustrative examples, an instantiated structure in number of instantiated structures 148 may be considered a main structure for a primary hierarchical organization when the component represented by the root object of the instantiated structure is considered to be a product.

A domain master object in main structure 146 that is associated with an instantiated structure in number of instantiated structures 148 of primary hierarchical organization 144 may represent an instance of the component in components 108 for product 102 represented by the root object of the instantiated structure. An instance of this component may be a usage of the component in a specific manner in product 102.

When the root object of the instantiated structure is instantiated as the domain master object in main structure 146, all other objects within the instantiated structure may be also instantiated in main structure 146. In particular, when the root object of the instantiated structure is instantiated as a domain usage object in main structure 146, all other objects within the instantiated structure may also be instantiated as domain occurrence objects that are child objects related to the domain usage object in main structure 146.

In this manner, a portion of the domain master objects in main structure 146 may represent or instantiate the instantiated structure. This representation or instantiation of the instantiated structure may be referred to as a substructure of main structure 146. In other words, the instantiated structure may be a "template" on which a substructure of main structure 146 is based. In particular, this substructure of main structure 146 may be considered a "lightweight" copy of the instantiated structure.

In these illustrative examples, an instantiated structure in number of instantiated structures 148 may be associated with one or more domain master objects in main structure 146 of primary hierarchical organization 144. In other words, one or more substructures within main structure 146 may be based off of a particular instantiated structure. Further, an instantiated structure may also be considered the main structure of a primary hierarchical organization for a product represented by the root object of the instantiated structure.

Additionally, group of domain configuration objects 130 may be organized into number of secondary hierarchical organizations 150 in model 114. Each of number of secondary hierarchical organizations 150 may be associated with primary hierarchical organization 144. In some cases, a secondary hierarchical organization may be referred to as being "nested within" primary hierarchical organization 144. Each of number of secondary hierarchical organizations 150 may be configured to represent a particular configuration or variant of product 102 in model 114.

Further, a number of domain configuration objects in a secondary hierarchical organization may represent a number of variations in product structure 112 for product 102. These variations may include, for example, without limitation, a variation in a placement of a component, a variation in a size of a component, a variation in a feature of a component, an optional feature for a component, and/or other suitable types of variations.

Secondary hierarchical organization 152 may be an example of one of number of secondary hierarchical organizations 150. Secondary hierarchical organization 152 may be implemented in a manner similar to primary hierarchical organization 144.

For example, secondary hierarchical organization 152 may comprise main structure 154 and number of instantiated structures 156. Main structure 154 and number of instantiated structures 156 for secondary hierarchical organization 152 may be implemented in a manner similar to main structure 146 and number of instantiated structures 148, respectively, for primary hierarchical organization 144. Main structure 154 and each instantiated structure in number of instantiated structures 156 may be hierarchical instantiated structures.

Main structure 154 of secondary hierarchical organization 152 may be implemented similarly to main structure 146 of primary hierarchical organization 144. Number of instantiated structures 156 in secondary hierarchical organization 152 may be implemented similarly to number of instantiated structures 148 in primary hierarchical organization 144.

In these illustrative examples, main structure 154 of secondary hierarchical organization 152 may represent the hierarchical decomposition of a particular configuration for product 102 using a plurality of hierarchical levels. Main structure 154 may include a main structure for each configuration for product 102. An instantiated structure in number of instantiated structures 156 in secondary hierarchical organization 152 may represent the hierarchical decomposition of a particular configuration for a component in components 108 for product 102 using a number of hierarchical levels.

In these illustrative examples, group of domain objects 125 that form primary hierarchical organization 144 and number of secondary hierarchical organizations 150 are specialized to selected domain 115 for which model 114 is created. In particular, group of domain master objects 128 and group of domain configuration objects 130 are specialized to selected domain 115 for which model 114 is created.

Group of domain master objects 128 and group of domain configuration objects 130 may be named using the name of the fundamental unit for selected domain 115. For example, the fundamental unit for the geometric domain may be a "part", the fundamental unit for the system domain may be a "system", and the fundamental unit for the manufacturing domain may be a "sequence."

As one illustrative example, selected domain 115 may be a geometric domain for product 102.

Consequently, when group of domain master objects 128 is created for the geometric domain, a domain definition object belonging to definition class 132 is referred to as a part definition object; a domain usage object belonging to usage class 134 is referred to as a part usage object; and a domain occurrence object belonging to occurrence class 136 is referred to as a part occurrence object. In some cases, a part definition object may be simply referred to as a part object.

Similarly, when group of domain configuration objects 130 is created for the geometric domain, a domain definition configuration object belonging to definition configuration class 138 is referred to as a part definition configuration object; a domain usage configuration object belonging to usage configuration class 140 is referred to as a part usage configuration object; and a domain occurrence configuration object belonging to occurrence configuration class 142 is referred to as a part occurrence configuration object. In some cases, a part definition configuration object may be simply referred to as a part configuration object.

Primary hierarchical organization 144 and number of secondary hierarchical organizations 150 may be used to represent product structure 112 for product 102 and variations in product structure 112 for product 102 in a manner that reduces redundancy in model 114 and increases the amount of information that may be represented in model 114. Further, primary hierarchical organization 144 and number of secondary hierarchical organizations 150 may allow model 114 to maintain a desired level of specificity with respect to the hierarchical decomposition of components 108 in product structure 112 without increasing the amount of data that needs to be stored more than is desirable.

In particular, primary hierarchical organization 144 may provide a base architecture or template from which all variations in product structure 112 for product 102 and/or all product design data may be captured and shared between variants of product 102. Each variant of product 102 may be represented using a secondary hierarchical organization.

For example, when a new variant of product 102 is to be represented in model 114, data manager 116 may add secondary hierarchical organization 152 to model 114 and nest secondary hierarchical organization 152 within primary hierarchical organization 144 to represent this new variant. This action is taken instead of creating a new primary hierarchical organization for this variant.

The number of domain configuration objects added to model 114 to form secondary hierarchical organization 152 may be less than the number of domain master objects that may need to be duplicated to represent the new variant in model 114 using a new primary hierarchical organization. For example, secondary hierarchical organization 152 may share a same number of domain configuration objects with another secondary hierarchical organization in number of secondary hierarchical organizations 150.

The only new domain configuration objects that need to be added to form secondary hierarchical organization 152 may be the one or more domain configuration objects needed to represent the respective one or more new variations of components that make up the new variant of product 102. In this manner, secondary hierarchical organization 152 may be an optimized product variant structure configured to represent the new variant of product 102.

Secondary hierarchical organization 152 may be optimized in that the number of domain configuration objects needed to represent the new variant of product 102 is reduced. This optimized product variant structure may reduce the overall data footprint of model 114. As used herein, the "data footprint" of a data structure, such as model 114, may be the amount of data storage required to store the data structure.

For example, product 102 may be an aerospace vehicle comprising billions or trillions of components. A new variant of product 102 may comprise a variation in a single fastener in product 102. Representing this variation within model 114 may be performed by forming a new secondary hierarchical organization within model 114.

This new secondary hierarchical organization may include a new domain configuration object in a particular hierarchical level within organization 141 to represent the variation of the fastener and a new domain configuration object for every hierarchical level in organization 141 above this particular hierarchical level. However, the new secondary hierarchical organization may share previously created domain configuration objects that are already part of other secondary hierarchical organizations within model 114.

In one illustrative example, when a new variant of product 102 includes variations to multiple components represented by domain master objects in a particular hierarchical level within organization 141 in which the domain master objects are child objects of the same parent object, new domain configuration objects may be added to model 114 at the particular hierarchical level for these domain master objects. However, only one new domain configuration object may need to be added to represent this collection of variations at each hierarchical level above the particular hierarchical level for the parent object. In this manner, this new secondary hierarchical organization may be optimized to reduce the data footprint associated with representing the new variant of product 102.

In these illustrative examples, at least two secondary hierarchical organizations in number of secondary hierarchical organizations 150 may share a same number of domain configuration objects. Further, any number of domain configuration objects in group of domain configuration objects 130 may be shared between different second hierarchical organizations in number of secondary hierarchical organizations 150.

Consequently, relating the different variations in product structure 112 for product 102 to each other and to a standard configuration for product 102 may be easier and require less data by using number of secondary hierarchical organizations 150 relative to using multiple primary hierarchical organizations. Number of secondary hierarchical organizations 150 may be referred to as number of optimized product variant structures 151.

In some illustrative examples, model 114 may include set of auxiliary objects 127 belonging to set of auxiliary classes 123. Set of auxiliary classes 123 are auxiliary to domain classes 119. In other words, set of auxiliary objects 127 are supplementary and may not be necessary to describe the basic structure of product 102. In this manner, set of auxiliary objects 127 may provide supplementary information about product structure 112 for product 102.

Set of auxiliary objects 127 may include set of domain auxiliary objects 129 belonging to auxiliary classes derived from domain classes 119 and set of independent auxiliary objects 131 belonging to auxiliary classes derived from fundamental classes 121.

Set of domain auxiliary objects 129 may include set of domain auxiliary master objects 133 and set of domain auxiliary configuration objects 135. Set of domain auxiliary master objects 133 may be auxiliary objects that belong to auxiliary classes derived from domain master classes in which the domain master classes are derived from master classes 124. Similarly, set of domain auxiliary configuration objects 135 may be auxiliary objects that belong to auxiliary classes derived from domain configuration classes in which the domain configuration classes are derived from configuration classes 126.

Set of independent auxiliary objects 131 may include set of independent auxiliary master objects 137 and set of auxiliary configuration objects 139. Set of independent auxiliary master objects 137 may be auxiliary objects that belong to auxiliary classes derived from master classes 124. Set of independent auxiliary configuration objects 139 may be auxiliary objects that belong to auxiliary classes derived from configuration classes 126.

Set of auxiliary classes 123 may include, for example, without limitation, port class 158 and association classes 160. A port object belonging to port class 158 may be either a port master object or a port configuration object. Further, an association object belonging to one of association classes 160 may be either an association master object or an association configuration object.

A port master object may represent a connection point on product 102 or a component of product 102. This connection point may be a physical connection point or a logical connection point. For example, a port master object may represent a physical interface, a physical connection element, an outlet, a jack, a connector, a logical interface, a data interface, a virtual data connection, or some other type of connection point. A port configuration object may correspond to a particular port master object. The port configuration object may represent a particular configuration for the connection point represented by the particular port master object.

An association master object may represent a relationship between two objects. In particular, an association master object may represent any type of association not explicitly represented by the hierarchical relationships and instantiation relationships between objects belonging to fundamental classes 121. An association configuration object may correspond to a particular association master object. The association configuration object may represent a particular configuration for the relationship represented by the particular association master object.

Association classes 160 may include, for example, without limitation, promotion class 162 and connection class 164. Each of these different auxiliary classes may be derived from either one of domain classes 119 or one of fundamental classes 121.

In particular, an auxiliary object may behave according to both the auxiliary class to which the auxiliary object belongs and the auxiliary class and/or fundamental class and/or domain class from which the auxiliary class is derived. The auxiliary class to which the auxiliary object belongs may impose one or more constraints and/or impart one or more properties to the auxiliary object, depending on the role of the auxiliary object within model 114.

In these illustrative examples, set of auxiliary objects 127 may be considered part of primary hierarchical organization 144 and/or number of secondary hierarchical organizations 150. For example, an auxiliary object may be a child object of an object in primary hierarchical organization 144 or one of number of secondary hierarchical organizations 150. However, in some cases, an auxiliary object may not be considered part of main structure 146 or number of instantiated structures 148 in primary hierarchical organization 144 or part of the main structure 154 or number of instantiated structures 156 in one of number of secondary hierarchical organizations 150.

For example, one or more of set of auxiliary objects 127 may belong to number of auxiliary instantiated structures 165 within primary hierarchical organization 144. Further, one or more of set of auxiliary objects 127 may belong to a set of auxiliary instantiated structures within one of number of secondary hierarchical organizations 150, such as set of auxiliary instantiated structures 167 in secondary hierarchical organization 152.

An auxiliary instantiated structure may be a hierarchical structure that is instantiated as a substructure connected to main structure 146 or one of number of instantiated structures 148 in primary hierarchical organization 144. In some cases, an auxiliary instantiated structure may be a hierarchical structure that is instantiated as a substructure connected to main structure 154 or one of number of instantiated structures 156 in secondary hierarchical organization 152.

In some illustrative examples, at least two secondary hierarchical organizations in number of secondary hierarchical organizations 150 may share a same number of auxiliary configuration objects. Further, any number of auxiliary configuration objects in set of auxiliary objects 127 may be shared between different second hierarchical organizations in number of secondary hierarchical organizations 150.

In these illustrative examples, product management system 100 may include visualizer 166 in addition to data manager 116. As depicted, visualizer 166 may be implemented in computer system 118.

Visualizer 166 may be configured to visually present the information about product structure 112 represented in model 114. In particular, visualizer 166 may visually present information about product structure 112 for product 102, as represented in model 114, in a manner that may be easily understood by a user.

Visualizer 166 may visually present this information about product structure 112 for product 102 in graphical user interface 168. Graphical user interface 168 may be configured for display on display system 170.

Further, graphical user interface 168 may be configured to receive user input 172 through number of user input devices 174. In this manner, a user may interact with graphical user interface 168 by entering user input 172 through number of user input devices 174.

Number of user input devices 174 may include any device configured to allow a user to interact with graphical user interface 168. Number of user input devices 174 may include, for example, without limitation, a keyboard, a mouse, a joystick, a touch screen, a touchpad, a pen, a pointer, a microphone, and/or some other suitable type of user input device.

Graphical user interface 168 may allow a user to make modifications to model 114 to modify product structure 112 for product 102. For example, without limitation, graphical user interface 168 may allow a user to add and remove variations to and from product structure 112, add and remove one or more components to and from product structure 112, add and remove one or more relationships between components in product structure 112, and/or modify product structure 112 in some other suitable manner by modifying model 114.

In this manner, product management system 100 may be used to manage model 114 for product structure 112 for product 102 as well as visually present information about product structure 112 in graphical user interface 168. Further, a user may be able to interact with graphical user interface 168 to modify model 114 to indicate variations in product structure 112 for product 102.

For example, without limitation, visualizer 166 may be configured to present information about an object in model 114 on graphical user interface 168 using a multi-column display. When the object is a master object, the first column in this multi-column display may identify the master object and all child objects belonging to the master object.

Further, other columns in the multi-column display may present information about one or more selected configuration for the component represented by the master object. For example, a particular column may identify a configuration object corresponding to the master object and all the child objects belonging to this configuration object. Additionally, other columns in the multi-column display may include information such as, for example, without limitation, a type of object, a level of an object with respect to a hierarchical organization to which the object belongs, and/or other types of information.

In this manner, a user may be able to compare the different configurations for a component represented by a master object side-by-side. Further, visualizer 166 may visually present the information about the master object in a manner such that particular variations between different configurations for the component may be readily discernible to the user. For example, the information may be displayed using any number of graphical indicators. Examples of graphical indicators that may be used include, but are not limited to, highlighting, color, bolding, italicizing, icons, flashing text, text descriptions, shading, shadowing, and/or other types of text effects and visual effects.

In some cases, data manager 116 and/or visualizer 166 may be configured to generate a report that compares the different variations in product structure 112 for product 102 represented by model 114. The report may comprise, a table, a spreadsheet, a slide presentation, a graph, a chart, a text report, a number of images, a video, an animated report, and/or some other suitable type of report.

In some illustrative examples, data manager 116 may be configured to receive user input through graphical user interface 168 and make changes to model 114 based on this user input. For example, data manager 116 may add objects to model 114, remove objects from model 114, change relationships between objects in model 114, and/or change model 114 in some other manner. In one illustrative example, the user input may identify new possible variations to one or more components for product 102. Data manger 116 may determine the number and type of objects that need to be added to model 114 to capture these new variations.

Additionally, data manager 116 may be configured to manage multiple models for multiple domains. Data manager 116 may manage the mapping of objects in a model for one domain to the objects in a model for another domain.

Data manager 116 may also be configured to synchronize the data stored in model 114 with data managed by, for example, other types of product management systems. In some cases, data manager 116 may be able to synchronize the data stored in model 114 with a computer aided design (CAD) model such that variations to items in the computer aided design model using computer aided design software tools may be represented in model 114 without requiring additional user input.

In these illustrative examples, data manager 116 may manage model 114 for product 102 and, in some cases, other models for product 102 over the entire lifecycle of product 102. In some illustrative examples, data manager 116 may be configured to store timestamps corresponding to each of objects 120 in model 114. In this manner, a history of the creation of model 114 and any changes to model 114 over the life of product 102 may be recorded.

The illustration of product management system 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, data manager 116 and visualizer 166 may be implemented in two different computer systems. Visualizer 166 may be in a location remote to data manager 116. In other illustrative examples, data manager 116 and visualizer 166 may be implemented as part of the same module within computer system 118. In some cases, visualizer 166 may be implemented as part of data manager 116.

FIGS. 2-9 are illustrations of the different types of objects that may be used in a model, in the form of block diagrams, depicted in accordance with an illustrative embodiment. In particular, FIGS. 2-5 are illustrations of the different types of master objects that may belong to master classes 124 in FIG. 1 in the form of block diagrams. FIGS. 6-9 are illustrations of the different types of configuration objects that may belong to configuration classes 126 in FIG. 1 in the form of block diagrams.

The master objects described in FIGS. 2-6 and the configuration objects described in FIGS. 6-9 may be described in the context of domain master objects and domain configuration objects, respectively. However, auxiliary master objects and auxiliary configuration object may behave similarly to the master objects described in FIGS. 2-5 and the configuration objects described in FIGS. 6-9, respectively.

Referring now to FIGS. 2-5, FIG. 2 is an illustration of a reusable definition object in the form of a block diagram depicted in accordance with an illustrative embodiment. In these illustrative examples, reusable definition object 200 may be one example of a definition object that belongs to a domain master class derived from definition class 132 of master classes 124 in FIG. 1.

Any reusable definition object described herein may be implemented in a manner similar to reusable definition object 200. Reusable definition object 200 may represent a leaf component or an assembly component in components 108 for product 102 in FIG. 1. In one illustrative example, reusable definition object 200 may represent product 102 in model 114 in FIG. 1.

As depicted, reusable definition object 200 may not have any parent objects. In other words, reusable definition object 200 may not be the child object of any other master objects in primary hierarchical organization 144 in FIG. 1. Consequently, reusable definition object 200 may be referred to as a root object and, in particular a root definition object.

In these illustrative examples, reusable definition object 200 may be the root object of main structure 146 in primary hierarchical organization 144 or the root object of an instantiated structure in number of instantiated structures 148 in primary hierarchical organization 144 in FIG. 1. In other words, reusable definition object 200 may be the object at the topmost level of main structure 146 or the object at the topmost level of an instantiated structure in number of instantiated structures 148.

Reusable definition objects, such as reusable definition object 200, may not be used in model 114 at any level below the topmost level in main structure 146 or the topmost level in an instantiated structure in number of instantiated structures 148. In this manner, only one reusable definition object may be present in main structure 146 of primary hierarchical organization 144 in FIG. 1. Further, only one reusable definition object may be present in an instantiated structure in number of instantiated structures 148 of primary hierarchical organization 144.

However, reusable definition object 200 may represent a component in components 108 for product 102 that may be used any number of times in product 102. More specifically, reusable definition object 200 may represent a type of component in which multiple components of this type may be used in product 102.

In these illustrative examples, a usage of the component represented by reusable definition object 200 may be represented in primary hierarchical organization 144 as a usage of reusable definition object 200. Each usage of reusable definition object 200 may be referred to as an "instantiation" or "instance" of reusable definition object 200 in these illustrative examples. Each instantiation of reusable definition object 200 may take the form of a usage object belonging to usage class 134 of master classes 124 in FIG. 1.

As one illustrative example, when product 102 is a wing for an aircraft, reusable definition object 200 may represent a particular type of fastener configured for use in the wing. Multiple fasteners of this particular type may be used in the wing. Reusable definition object 200 may be instantiated in model 114 as many times as the number of times that a fastener of that particular type is used in the wing.

In these illustrative examples, reusable definition object 200 may be a parent object for set of child objects 202. Set of child objects 202 may include n child objects. As described above, a "set of" items means zero or more items. In this manner, set of child objects 202 may be an empty set or a null set in some cases.

When set of child objects 202 for reusable definition object 200 is an empty set, reusable definition object 200 may represent a leaf component in components 108 for product 102. In other words, reusable definition object 200 may represent an indivisible component within product 102. When set of child objects 202 for reusable definition object 200 includes one or more child objects, reusable definition object 200 may represent an assembly component in components 108.

In these illustrative examples, when set of child objects 202 is a non-empty set, set of child objects 202 may include one or more in-place definition objects and/or one or more usage objects. In-place definition object 204 and usage object 206 are examples of child objects that may be in set of child objects 202. In-place definition objects are described in greater detail in FIG. 3 below. Further, usage objects are described in greater detail in FIG. 4 below.

FIG. 3 is an illustration of an in-place definition object in the form of a block diagram depicted in accordance with an illustrative embodiment. In these illustrative examples, in-place definition object 300 may be one example of a definition object that belongs to a domain master class derived from definition class 132 of master classes 124 in FIG. 1.

Any in-place definition object described herein may be implemented in a manner similar to in-place definition object 300. Further, an in-place definition object that is a child object of a reusable definition object, such as reusable definition object 200 in FIG. 2, may be implemented in a manner similar to in-place definition object 300.

In-place definition object 300 may be part of primary hierarchical organization 144 in FIG. 1. The component represented by in-place definition object 300 may be a leaf component or an assembly component.

As depicted in these examples, in-place definition object 300 may be a child object of one of potential parent objects 302. Potential parent objects 302 may be definition objects belonging to definition class 132 of master classes 124. For example, potential parent objects 302 for in-place definition object 300 may include reusable definition object 304 and in-place definition object 306.

In these illustrative examples, in-place definition object 300 may be used only once as a child object of a definition object. In-place definition object 300 may not be instantiated as the child object of any other objects other than this definition object. In other words, in-place definition object 300 may be a child object specific to that definition object.

In this manner, in-place definition object 300 may represent a component in product 102 that is only used once in an assembly component in product 102 in FIG. 1. In other words, in-place definition object 300 may represent a component that is specific to an assembly component in product 102 and that may not be used in any other assembly component for product 102.

As one illustrative example, reusable definition object 304 may be the parent object of in-place definition object 300. Reusable definition object 304 may represent product 102. Product 102 may be, for example, a fuselage of an aircraft. In-place definition object 300 may represent a skin panel for the fuselage of the aircraft that has a particular label indicating that the skin panel is for a particular location of the fuselage.

Additionally, in-place definition object 300 may be a parent object for set of child objects 308. Set of child objects 308 may include n child objects. When set of child objects 308 is a non-empty set, set of child objects 308 may include one or more in-place definition objects and/or one or more usage objects. In-place definition object 310 and usage object 312 are examples of child objects that may be in set of child objects 308. Usage objects are described in greater detail in FIG. 4 below.

Figure 4:
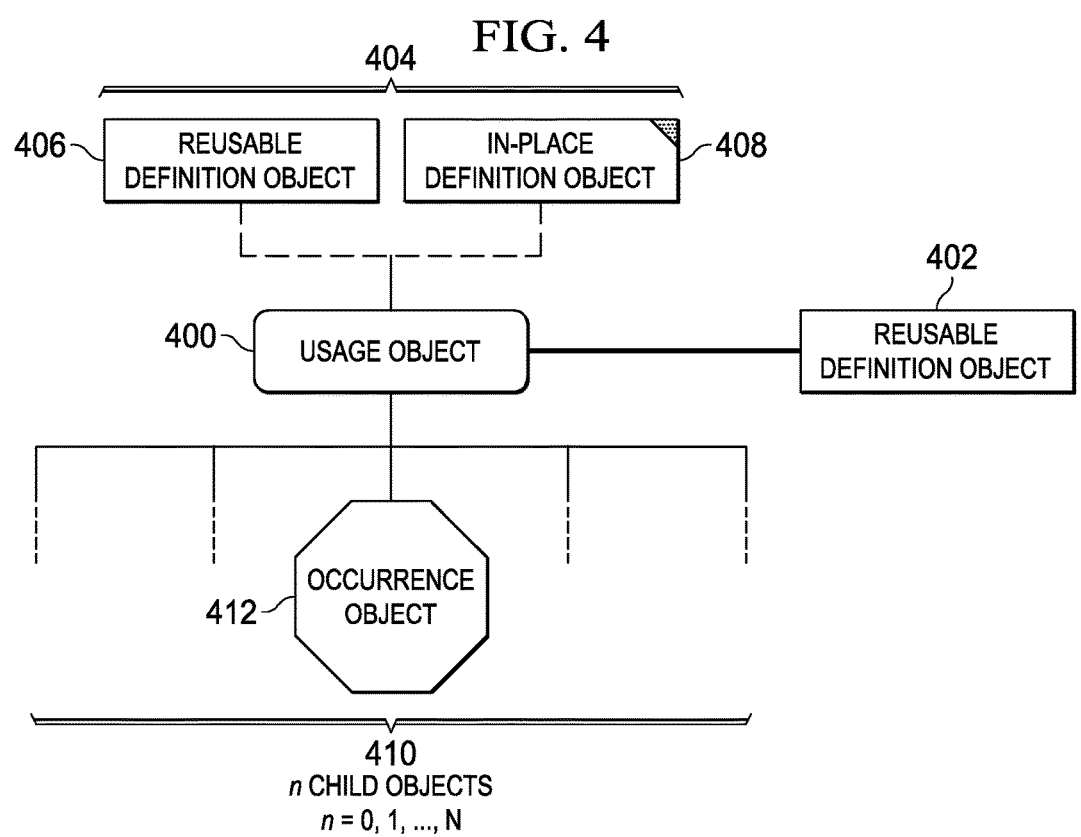
FIG. 4 is an illustration of a usage object in the form of a block diagram in accordance with an illustrative embodiment.

FIG. 4 is an illustration of a usage object in the form of a block diagram depicted in accordance with an illustrative embodiment. In this illustrative example, usage object 400 may be an example of one implementation for a usage object belonging to a domain master class derived from usage class 134 of master classes 124 in FIG. 1. Any usage object described herein may be implemented in a manner similar to usage object 400.

A usage object that is a child object of a reusable definition object, such as reusable definition object 200, or an in-place definition object, such as in-place definition object 300, may be implemented in a manner similar to usage object 400. Usage object 400 may be part of primary hierarchical organization 144 in FIG. 1.

Usage object 400 may be an instantiation of a corresponding reusable definition object. For example, usage object 400 may be an instantiation of reusable definition object 402. In this manner, usage object 400 is a usage of the component represented by reusable definition object 402 in product 102 in FIG. 1.

As depicted, usage object 400 may be the child object of one of potential parent objects 404. Potential parent objects 404 for usage object 400 include reusable definition object 406 and in-place definition object 408.

When the child object of reusable definition object 406 or in-place definition object 408 needs to represent a component that is represented by reusable definition object 402, usage object 400 is used as the child object instead of reusable definition object 402. In this manner, reusable definition object 402 may be instantiated multiple times as usage objects without tying reusable definition object 402 to a particular hierarchical structure.

As depicted, usage object 400 may have set of child objects 410. Set of child objects 410 may include n objects. In particular, set of child objects 410 may include any number of occurrence objects belonging to occurrence class 136 of master classes 124 in FIG. 1.

When reusable definition object 402 represents an assembly component, reusable definition object 402 may be a root object of a hierarchical structure for that assembly component. When usage object 400 is created as an instantiation of reusable definition object 402, all child objects of reusable definition object 402 are instantiated as occurrence objects that become child objects of usage object 400.

In this manner, when reusable definition object 402 represents a leaf component, set of child objects 410 may be an empty set. When reusable definition object 402 represents an assembly component, set of child objects 410 may include one or more occurrence objects. Occurrence object 412 may be an example of an occurrence object in set of child objects 410. Occurrence objects are described in greater detail in FIG. 5 below.

Figure 5:
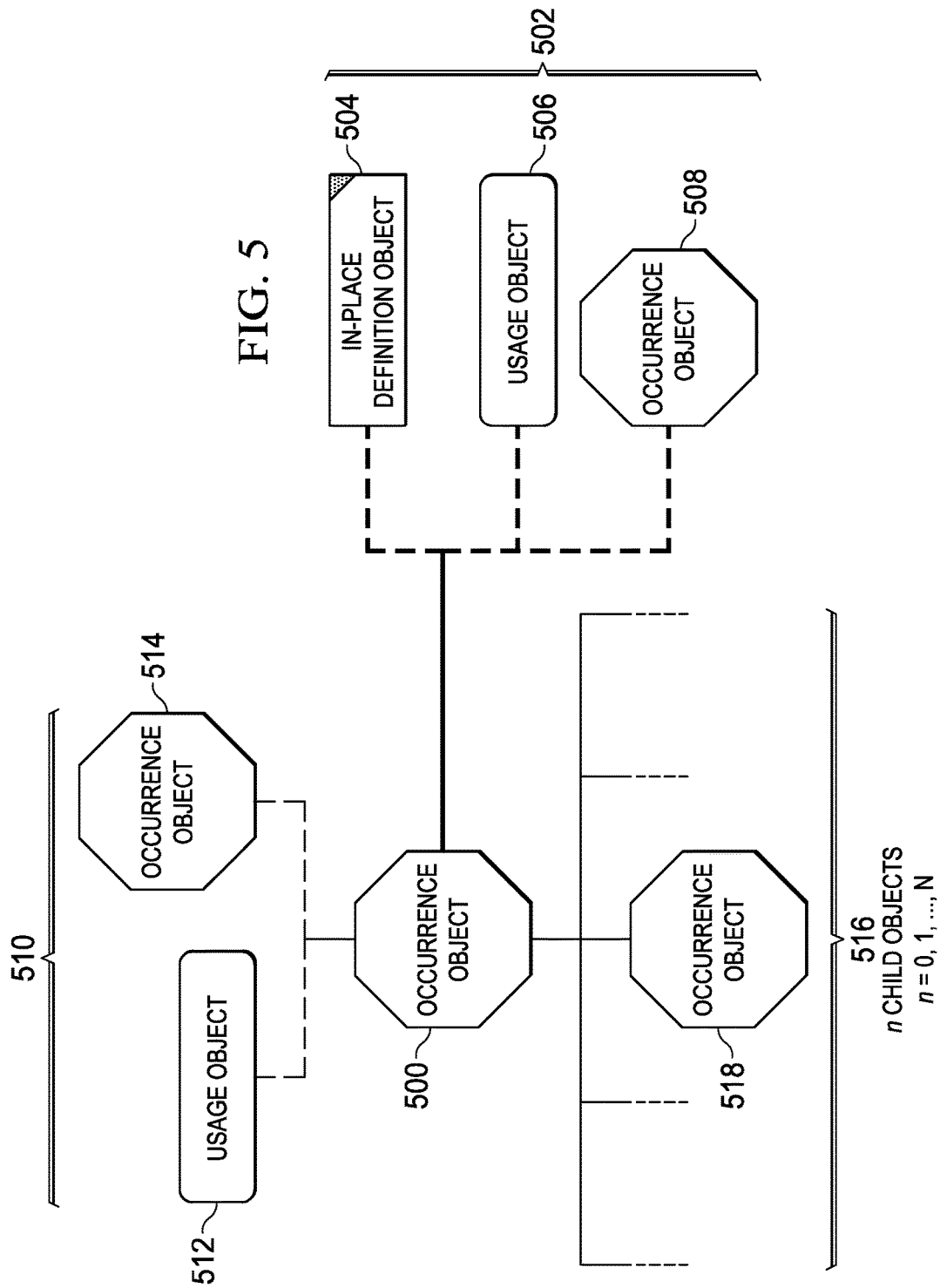
FIG. 5 is an illustration of an occurrence object in the form of a block diagram in accordance with an illustrative embodiment.

FIG. 5 is an illustration of an occurrence object in the form of a block diagram depicted in accordance with an illustrative embodiment. In this illustrative example, occurrence object 500 may be an example of one implementation for an occurrence object belonging to a domain master class derived from occurrence class 136 of master classes 124 in FIG. 1. Any occurrence object described herein may be implemented in a manner similar to occurrence object 500.

An occurrence object that is a child object of a usage object, such as usage object 400 in FIG. 4, may be implemented in a manner similar to occurrence object 500. Occurrence object 500 may be part of primary hierarchical organization 144 in FIG. 1.

Occurrence object 500 may be an instantiation of one of potential objects 502. Potential objects 502 include in-place definition object 504, usage object 506, and occurrence object 508. The particular object in potential objects 502 instantiated by occurrence object 500 may depend on which of potential parent objects 510 is the parent object of occurrence object 500.

For example, potential parent objects 510 include usage object 512 and occurrence object 514. When usage object 512 is the parent object of occurrence object 500, occurrence object 500 may be the instantiation of a child object of the reusable definition object instantiated by usage object 512. For example, when usage object 512 is the parent object of occurrence object 500, occurrence object 500 may be an instantiation of in-place definition object 504 or usage object 506.

Further, when occurrence object 514 is the parent object of occurrence object 500, occurrence object 500 may be the instantiation of a child object of the object instantiated by occurrence object 514. In particular, when occurrence object 514 is the parent object of occurrence object 500 and occurrence object 514 is the child object of a usage object, occurrence object 500 may be the instantiation of a child object of an in-place definition object or the instantiation of a child object of a usage object.

Occurrence object 500 may be the instantiation of occurrence object 508. For example, when occurrence object 514 is an instantiation of a usage object, occurrence object 500 may be an instantiation of the occurrence object that is a child object of this usage object.

In these illustrative examples, occurrence object 500 may have set of child objects 516. Set of child objects 516 may include n child objects. In particular, set of child objects 516 may include any number of occurrence objects. The number of occurrence objects in set of child objects 516 may be equal to the number of children of the object in potential objects 502 instantiated by occurrence object 500. Occurrence object 518 may be an example of an occurrence object in set of child objects 516.

Referring now to FIGS. 6-9, FIG. 6 is an illustration of a reusable definition configuration object in the form of a block diagram depicted in accordance with an illustrative embodiment. In these illustrative examples, reusable definition configuration object 600 may be one example of a definition configuration object that belongs to a domain configuration class derived from definition configuration class 138 of configuration classes 126 in FIG. 1.

Any reusable definition configuration object described herein may be implemented in a manner similar to reusable definition configuration object 600.

Reusable definition configuration object 600 corresponds to a reusable definition object, such as, for example, reusable definition object 601. Reusable definition configuration object 600 may represent a configuration for the component represented by reusable definition object 601.

In this manner, reusable definition configuration object 600 may correspond to only one reusable definition object. However, any number of reusable definition configuration objects may correspond to the same reusable definition object. In other words, the component represented by reusable definition object 601 may have multiple configurations, which may be represented by multiple reusable definition configuration objects.

As depicted, reusable definition configuration object 600 may not have any parent objects. In other words, reusable definition configuration object 600 may not be the child object of any other configuration objects in model 114 in FIG. 1. Consequently, reusable definition configuration object 600 may be referred to as a root configuration object and, in particular, a root definition configuration object.

Reusable definition configuration object 600 may be part of a secondary hierarchical organization in number of secondary hierarchical organizations 150, such as secondary hierarchical organization 152, in FIG. 1. For example, reusable definition configuration object 600 may be the root configuration object of main structure 154 in secondary hierarchical organization 152 or the root configuration object of an instantiated structure in number of instantiated structures 156 in secondary hierarchical organization 152 in FIG. 1.

In other words, reusable definition configuration object 600 may be the configuration object at the topmost level of main structure 154 or the configuration object at the topmost level of an instantiated structure in number of instantiated structures 156. Only one reusable definition configuration object may be present in main structure 154 of secondary hierarchical organization 152 in FIG. 1. Further, only one reusable definition configuration object may be present in each instantiated structure in number of instantiated structures 156 of secondary hierarchical organization 152.

However, reusable definition configuration object 600 may represent a configuration for a component that may be used any number of times in product 102 in FIG. 1. In these illustrative examples, a usage of the configuration represented by reusable definition configuration object 600 may be represented as an instantiation of reusable definition configuration object 600 in secondary hierarchical organization 152. Each instantiation of reusable definition configuration object 600 may take the form of a usage configuration object belonging to usage configuration class 140 of configuration classes 126 in FIG. 1.

As one illustrative example, when reusable definition object 601 represents a family of hydraulic pumps, reusable definition configuration object 600 may represent one configuration or member for this family of pumps. This configuration may be, for example, a heavy-duty pump versus a light-duty pump.

In these illustrative examples, reusable definition configuration object 600 may be a parent object for set of child objects 602. Set of child objects 602 may include n child objects. In particular, when reusable definition object 601 has one or more child objects, reusable definition configuration object 600 may have one or more corresponding child objects. In this manner, each child object of reusable definition object 601 may have a corresponding child object in set of child objects 602 for reusable definition configuration object 600.

For example, when a child object of reusable definition object 601 is an in-place definition object, set of child objects 602 may include an in-place definition configuration object, such as in-place definition configuration object 604. When a child object of reusable definition object 601 is a usage object, set of child objects 602 may include a usage configuration object, such as usage configuration object 606.

In-place definition configuration objects are described in greater detail in FIG. 7 below.
Additionally, usage configuration objects are described in greater detail in FIG. 8 below.

Figure 7:
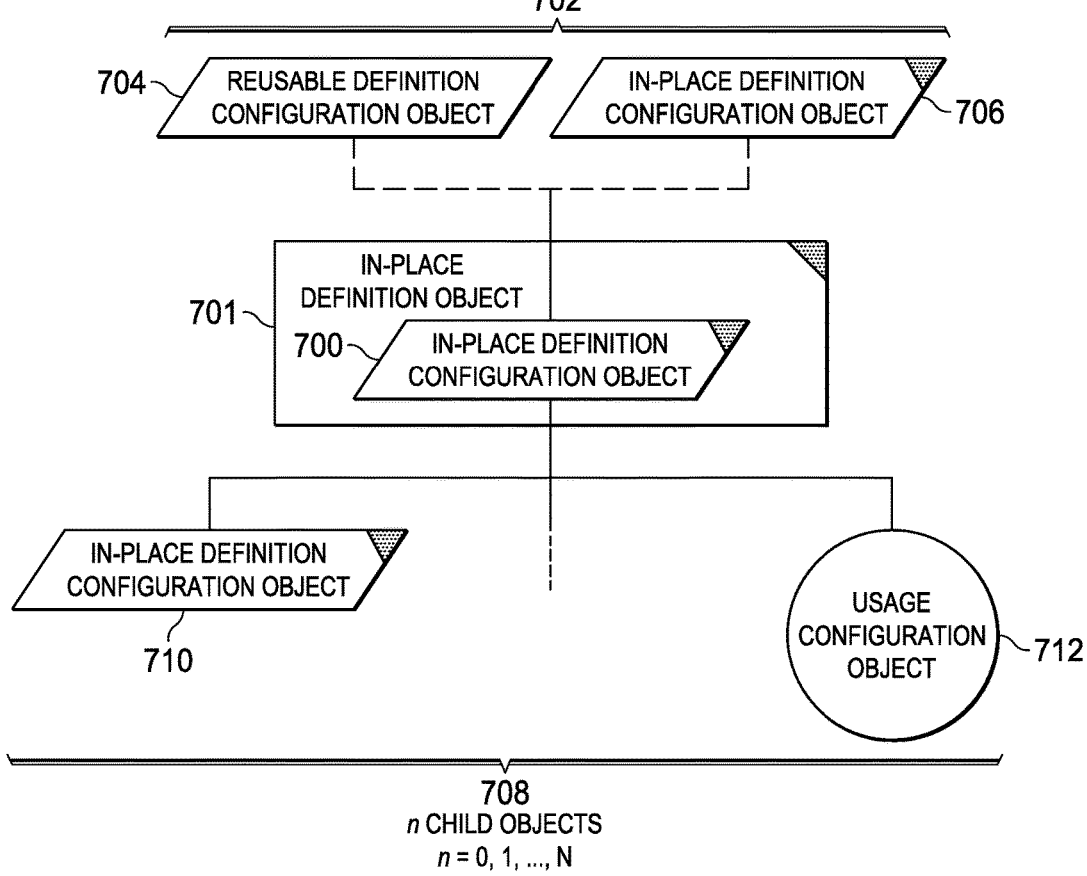
FIG. 7 is an illustration of an in-place definition configuration object in the form of a block diagram in accordance with an illustrative embodiment.

FIG. 7 is an illustration of an in-place definition configuration object in the form of a block diagram depicted in accordance with an illustrative embodiment. In these illustrative examples, in-place definition configuration object 700 may be one example of a definition configuration object that belongs to a domain configuration class derived from definition configuration class 138 of configuration classes 126 in FIG. 1.

Any in-place definition configuration object described herein may be implemented in a manner similar to in-place definition configuration object 700. An in-place definition configuration object that is a child object of a reusable definition configuration object, such as reusable definition configuration object 600 in FIG. 6, may be implemented in a manner similar to in-place definition configuration object 700.

Further, in-place definition configuration object 700 may be part of a secondary hierarchical organization in number of secondary hierarchical organizations 150, such as secondary hierarchical organization 152, in FIG. 1. In-place definition configuration object 700 may correspond to an in-place definition object, such as in-place definition object 701. For example, in-place definition configuration object 700 may represent the configuration for a component represented by in-place definition object 701.

In these illustrative examples, in-place definition configuration object 700 corresponds to only one in-place definition object. However, any number of in-place definition configuration objects may correspond to the same in-place definition object.

As depicted in these examples, in-place definition configuration object 700 may be a child object of one or more configuration objects in potential parent objects 702. Potential parent objects 702 for in-place definition configuration object 700 may include any number of definition configuration objects belonging to definition configuration class 138 of configuration classes 126 in FIG. 1.

For example, potential parent objects 702 for in-place definition configuration object 700 may include reusable definition configuration object 704 and in-place definition configuration object 706. In one illustrative example, in-place definition configuration object 700 may have two parent objects that are both reusable definition configuration objects corresponding to the same reusable definition object. In this manner, these two reusable definition configuration objects may share in-place definition configuration object 700 as a child object.

Further, as depicted, in-place definition configuration object 700 may be a parent object for set of child objects 708. Set of child objects 708 may include n child objects. When set of child objects 708 is not a null set, set of child objects 708 may include one or more in-place definition configuration objects and/or one or more usage configuration objects. In-place definition configuration object 710 and usage configuration object 712 are examples of child objects in set of child objects 708. Usage configuration objects are described in greater detail in FIG. 8 below.

Figure 8:
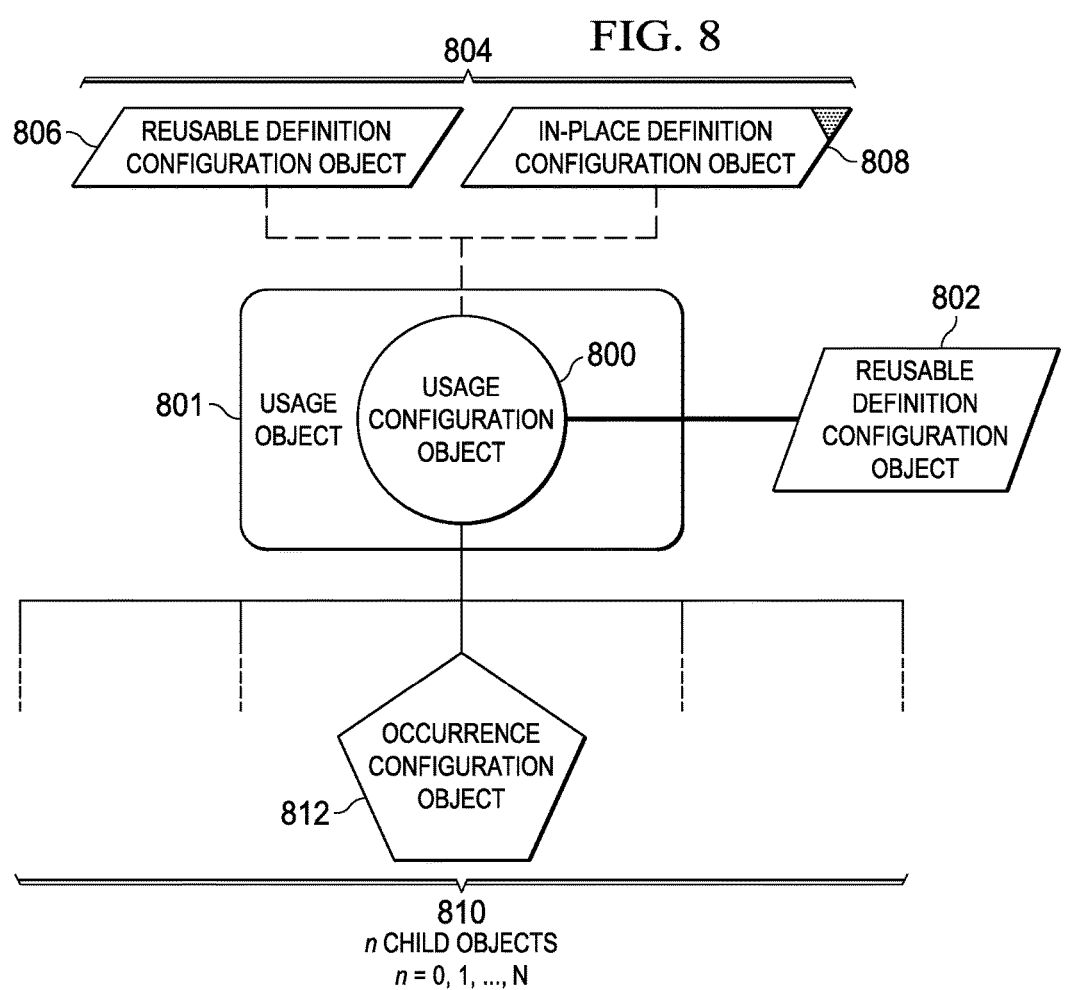
FIG. 8 is an illustration of a usage configuration object in the form of a block diagram in accordance with an illustrative embodiment.

FIG. 8 is an illustration of a usage configuration object in the form of a block diagram depicted in accordance with an illustrative embodiment. In this illustrative example, usage configuration object 800 may be an example of one implementation for a usage configuration object belonging to a domain configuration class derived from usage configuration class 140 of configuration classes 126 in FIG. 1. Any usage configuration object described herein may be implemented in a manner similar to usage configuration object 800.

Figure 6:
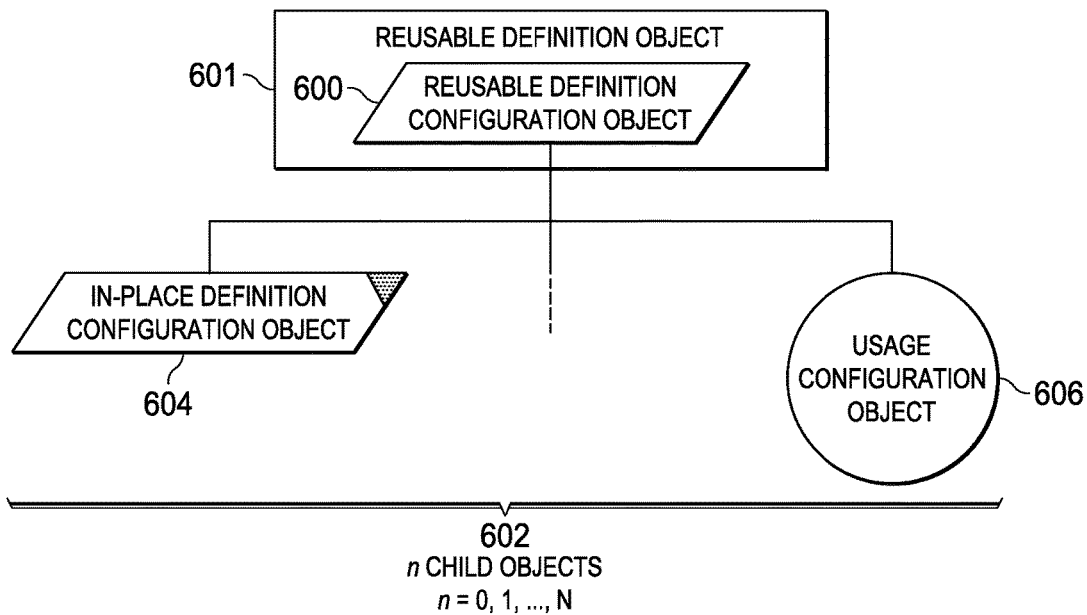
FIG. 6 is an illustration of a reusable definition configuration object in the form of a block diagram in accordance with an illustrative embodiment.

A usage configuration object that is a child object of a reusable definition configuration object, such as reusable definition configuration object 600 in FIG. 6, or a child object of an in-place definition configuration object, such as in-place definition configuration object 700 in FIG. 7, may be implemented in a manner similar to usage configuration object 800. Usage configuration object 800 may be part of a secondary hierarchical organization in number of secondary hierarchical organizations 150, such as secondary hierarchical organization 152 in FIG. 1.

Usage configuration object 800 may correspond to a usage object, such as, for example, usage object 801. Usage object 801 may be an instantiation of a corresponding reusable definition object. Consequently, usage configuration object 800 may be an instantiation of a reusable definition configuration object corresponding to the reusable definition object instantiated by usage object 801.

For example, reusable definition configuration object 802 may correspond to the reusable definition object instantiated by usage object 801. Usage configuration object 800 may be an instantiation of reusable definition configuration object 802.

As depicted, usage configuration object 800 may be the child object of one or more of potential parent objects 804. Potential parent objects 804 for usage configuration object 800 include reusable definition configuration object 806 and in-place definition configuration object 808.

In these illustrative examples, more than one parent object in potential parent objects 804 may share usage configuration object 800 when the parent objects correspond to the same definition object. For example, three reusable definition configuration objects corresponding to the same reusable definition object may share usage configuration object 800 as a child object.

As depicted, usage configuration object 800 may be the parent object for set of child objects 810. Set of child objects 810 may include n child objects. In particular, set of child objects 810 may include any number of occurrence configuration objects belonging to occurrence configuration class 142 of configuration classes 126 in FIG. 1.

In these illustrative examples, when usage object 801 has one or more child objects, usage configuration object 800 may have one or more corresponding child objects. In other words, each child object of usage object 801 may have a corresponding child object in set of child objects 810 for usage configuration object 800.

In this manner, all child objects in set of child objects 810 may be occurrence configuration objects. Occurrence configuration object 812 is an example of an occurrence configuration object in set of child objects 810. Occurrence configuration objects are described in greater detail in FIG. 9 below.

Figure 9:
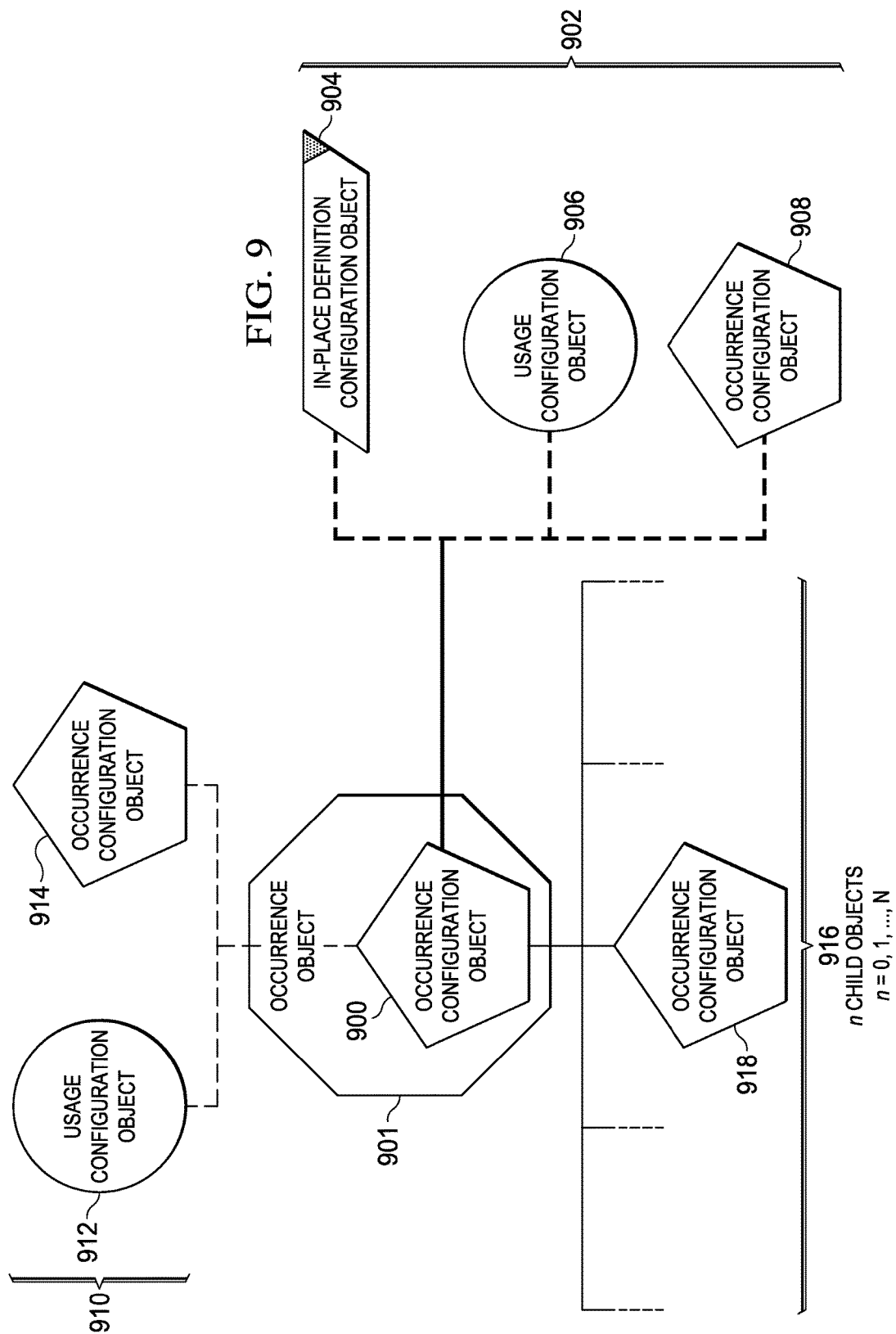
FIG. 9 is an illustration of an occurrence configuration object in the form of a block diagram in accordance with an illustrative embodiment.

FIG. 9 is an illustration of an occurrence configuration object in the form of a block diagram depicted in accordance with an illustrative embodiment. In this illustrative example, occurrence configuration object 900 may be an example of one implementation for an occurrence configuration object belonging to a domain configuration class derived from occurrence configuration class 142 of configuration classes 126 in FIG. 1. Any occurrence configuration object described herein may be implemented in a manner similar to occurrence configuration object 900.

An occurrence configuration object that is a child object of a usage configuration object, such as usage configuration object 800 in FIG. 8, may be implemented in a manner similar to occurrence configuration object 900. Occurrence configuration object 812 in FIG. 8 may be part of a secondary hierarchical organization in number of secondary hierarchical organizations 150, such as secondary hierarchical organization 152, in FIG. 1.

As depicted, occurrence configuration object 900 may correspond to an occurrence object, such as occurrence object 901. Occurrence object 901 may be an instantiation of a child object of a usage object. Consequently, occurrence configuration object 900 may be an instantiation of a configuration object corresponding to a child object of the usage object instantiated by occurrence object 901.

For example, occurrence configuration object 900 may be an instantiation of one of potential configuration objects 902. Potential configuration objects 902 include in-place definition configuration object 904, usage configuration object 906, and occurrence configuration object 908.

As depicted, occurrence configuration object 900 may be the child object of one or more of potential parent objects 910. Potential parent objects 910 for occurrence configuration object 900 may include usage configuration object 912 and occurrence configuration object 914.

In these illustrative examples, more than one parent object in potential parent objects 910 may share occurrence configuration object 900 when the parent objects correspond to the same usage object or the same occurrence object. For example, three usage configuration objects corresponding to the same usage object may share occurrence configuration object 900 as a child object.

As depicted, occurrence configuration object 900 may be the parent object for set of child objects 916. Set of child objects 916 may include n child objects. The number of child objects in set of child objects 916 may be equal to and correspond to the number of child objects of the object in potential configuration objects 902 instantiated by occurrence configuration object 900. In particular, set of child objects 916 may include any number of occurrence configuration objects belonging to occurrence configuration class 142 of configuration classes 126 in FIG. 1.

In these illustrative examples, when occurrence object 901 has one or more child objects, occurrence configuration object 900 may have one or more corresponding child objects. In other words, each child object of occurrence object 901 may have a corresponding child object in set of child objects 916 for occurrence configuration object 900.

In this manner, all child objects in set of child objects 916 may be occurrence configuration objects. Occurrence configuration object 918 is an example of an occurrence configuration object in set of child objects 916.

FIGS. 10-15 are illustrations of the different types of auxiliary objects that may be used in a model, in the form of block diagrams, depicted in accordance with an illustrative embodiment. In particular, FIGS. 10-15 are illustrations of the different types of auxiliary objects that may be present in set of auxiliary objects 127 in model 114 in FIG. 1 in the form of block diagrams.

Figure 10:
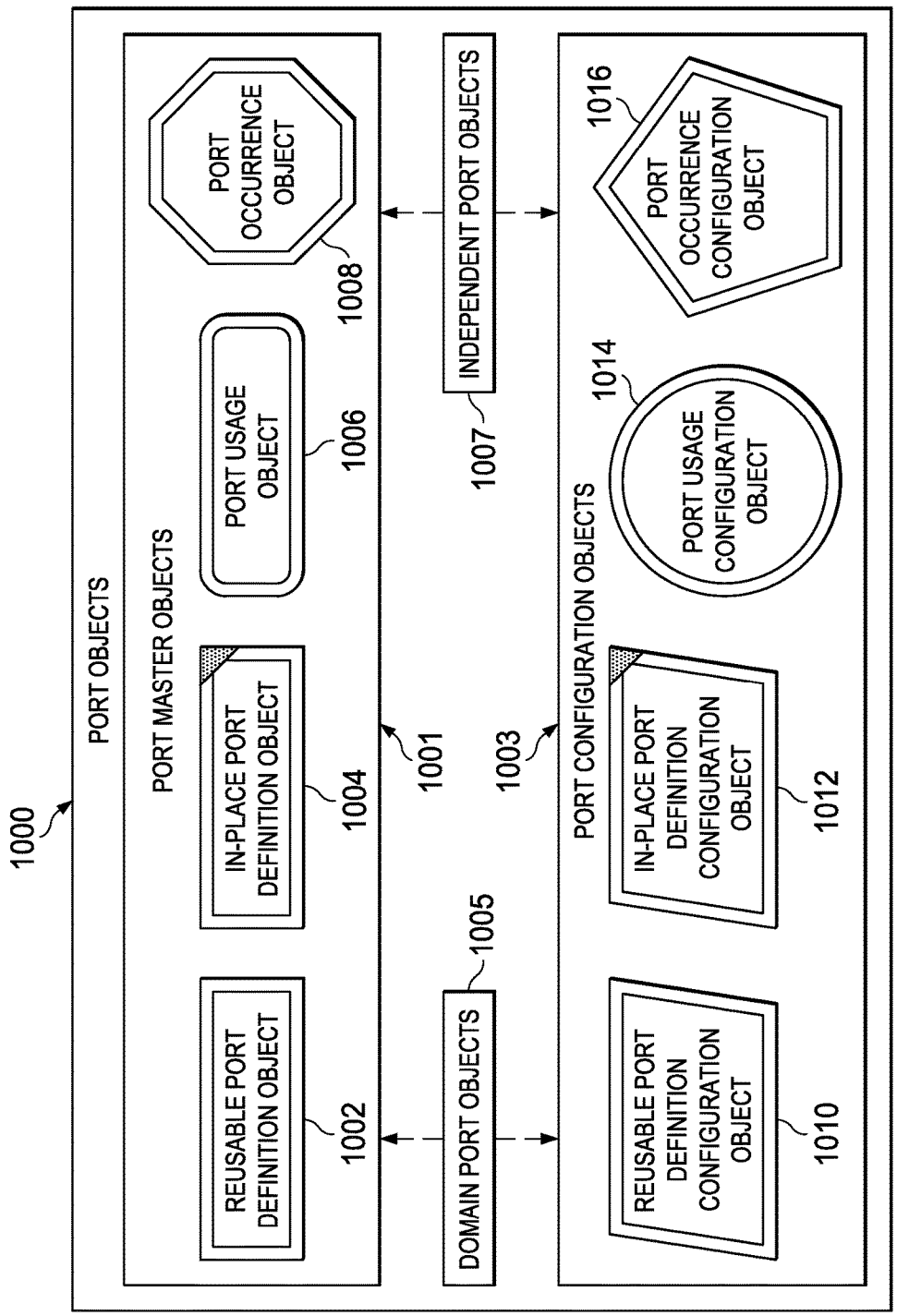
FIG. 10 is an illustration of port objects in the form of a block diagram.

FIG. 10 is an illustration of port objects in the form of a block diagram depicted in accordance with an illustrative embodiment. Port objects 1000 are examples of auxiliary objects that may be included in set of auxiliary objects 127 in FIG. 1. In particular, port objects 1000 are examples of objects belonging to port class 158 in FIG. 1.

Port objects 1000 may include port master objects 1001 and port configuration objects 1003. Port master objects 1001 may be considered either domain port objects 1005 or independent port objects 1007. Further, port configuration objects 1003 may be considered either domain port objects 1005 or independent port objects 1007.

Domain port objects 1005 may be port objects belonging to port class 158 in FIG. 1 when port class 158 is derived from one of domain classes 119 in FIG. 1 and thus, derived from the fundamental class from which the domain class is derived. In this manner, domain port objects 1005 may be specific to selected domain 115 represented by domain classes 119 in FIG. 1.

Independent port objects 1007 may be port objects belonging to port class 158 when port class 158 is derived from one of fundamental classes 121 in FIG. 1. In this manner, independent port objects 1007 may be independent of selected domain 115.

Each of port master objects 1001 may represent a connection point on a product or component of the product. This connection point may be a physical connection point or a logical connection point. For example, a port master object may represent a physical interface, a physical connection element, an outlet, a jack, a connector, a logical interface, a data interface, a virtual data connection, or some other type of connection point. The behavior of the port master object within a model may be based on the fundamental class from which the port master object is derived.

Port master objects 1001 may include reusable port definition object 1002, in-place port definition object 1004, port usage object 1006, and port occurrence object 1008. Reusable port definition object 1002 may behave in a manner similar to, for example, reusable definition object 200 in FIG. 2. In-place port definition object 1004 may behave in a manner similar to, for example, in-place definition object 300 in FIG. 3. Port usage object 1006 may behave in a manner similar to, for example, usage object 400 in FIG. 4. Port occurrence object 1008 may behave in a manner similar to, for example, occurrence object 500 in FIG. 5.

Each of port configuration objects 1003 may correspond to a port master object. The port configuration object may represent a particular configuration for the connection point represented by the particular port master object.

As depicted, port configuration objects 1003 may include reusable port definition configuration object 1010, in-place port definition configuration object 1012, port usage configuration object 1014, and port occurrence configuration object 1016. Reusable port definition configuration object 1010, in-place port definition configuration object 1012, port usage configuration object 1014, and port occurrence configuration object 1016 may correspond to a reusable port definition object 1002, an in-place port definition object 1004, a port usage object 1006, and a port occurrence object 1008, respectively.

Reusable port definition configuration object 1010 may behave in a manner similar to, for example, reusable definition configuration object 600 in FIG. 6. In-place port definition configuration object 1012 may behave in a manner similar to, for example, in-place definition configuration object 700 in FIG. 7. Port usage configuration object 1014 may behave in a manner similar to, for example, usage configuration object 800 in FIG. 8. Port occurrence configuration object 1016 may behave in a manner similar to, for example, occurrence configuration object 900 in FIG. 9.

When used in a model, such as model 114 in FIG. 1, a portion of port objects 1000 may be considered as belonging to a particular category. In other words, one, some, or all of the port objects in a model may belong to one of a plurality of categories. The behavior of a port object within the model may also depend on the category to which that port object belongs. A port master object and a port configuration object corresponding to the port master object may belong to the same category.

The potential categories to which a port object may belong may include a reusable category, an interface category, and a connectable category. The particular category to which a port object belongs may depend on the location of the port object within the organization of the model and the parent object of the port object. These categories are described in greater detail in FIGS. 11-13.

Figure 11:
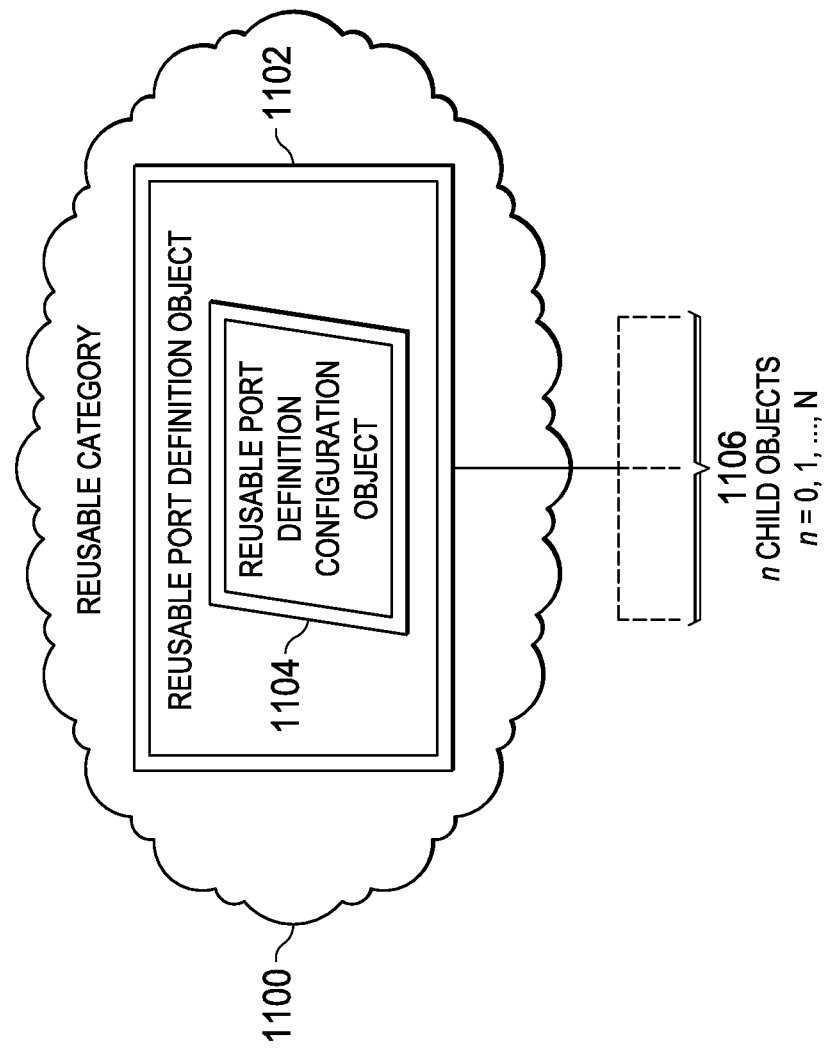
FIG. 11 is an illustration of a reusable category for port objects in the form of a block diagram in accordance with an illustrative embodiment.

FIG. 11 is an illustration of a reusable category for port objects in the form of a block diagram depicted in accordance with an illustrative embodiment. Reusable category 1100 may be an example of a category to which port objects may belong. A port object that belongs to reusable category 1100 may also be referred to as a reusable port definition object in some cases.

As depicted, reusable port definition object 1102 may belong to reusable category 1100. A reusable port definition object may be the only type of port master object that can belong to reusable category 1100. Further, reusable port definition configuration object 1104 may correspond to reusable port definition object 1102. Consequently, reusable port definition configuration object 1104 may also be considered as belonging to reusable category 1100. A reusable port definition configuration object may be the only type of port configuration object that may belong to reusable category 1100.

A port object belonging to reusable category 1100 may be reusable. In other words, a port object belonging to reusable category 1100 may be instantiated within a model. In these illustrative examples, a port object belonging to reusable category 1100 may be required to be a root object. In this manner, a root object belonging to reusable category 1100 may not be the child object of any other object. This root object may be the root object for an auxiliary instantiated structure, such as one of number of auxiliary instantiated structures 165 in FIG. 1.

For example, reusable port definition object 1102 may be a root object for an auxiliary instantiated structure in a model. Reusable port definition object 1102 may be instantiated as a port usage object that is a child object of an object within a primary hierarchical organization for the model. Consequently, reusable port definition configuration object 1104 corresponding to reusable port definition object 1102 may be instantiated as a port usage configuration object corresponding to the port usage object.

As depicted, reusable port definition object 1102 may have set of child objects 1106. Set of child objects 1106 may include n child objects. Set of child objects 1106 belonging to reusable port definition object 1102 may not be considered as belonging to reusable category 1100.

Figure 12:
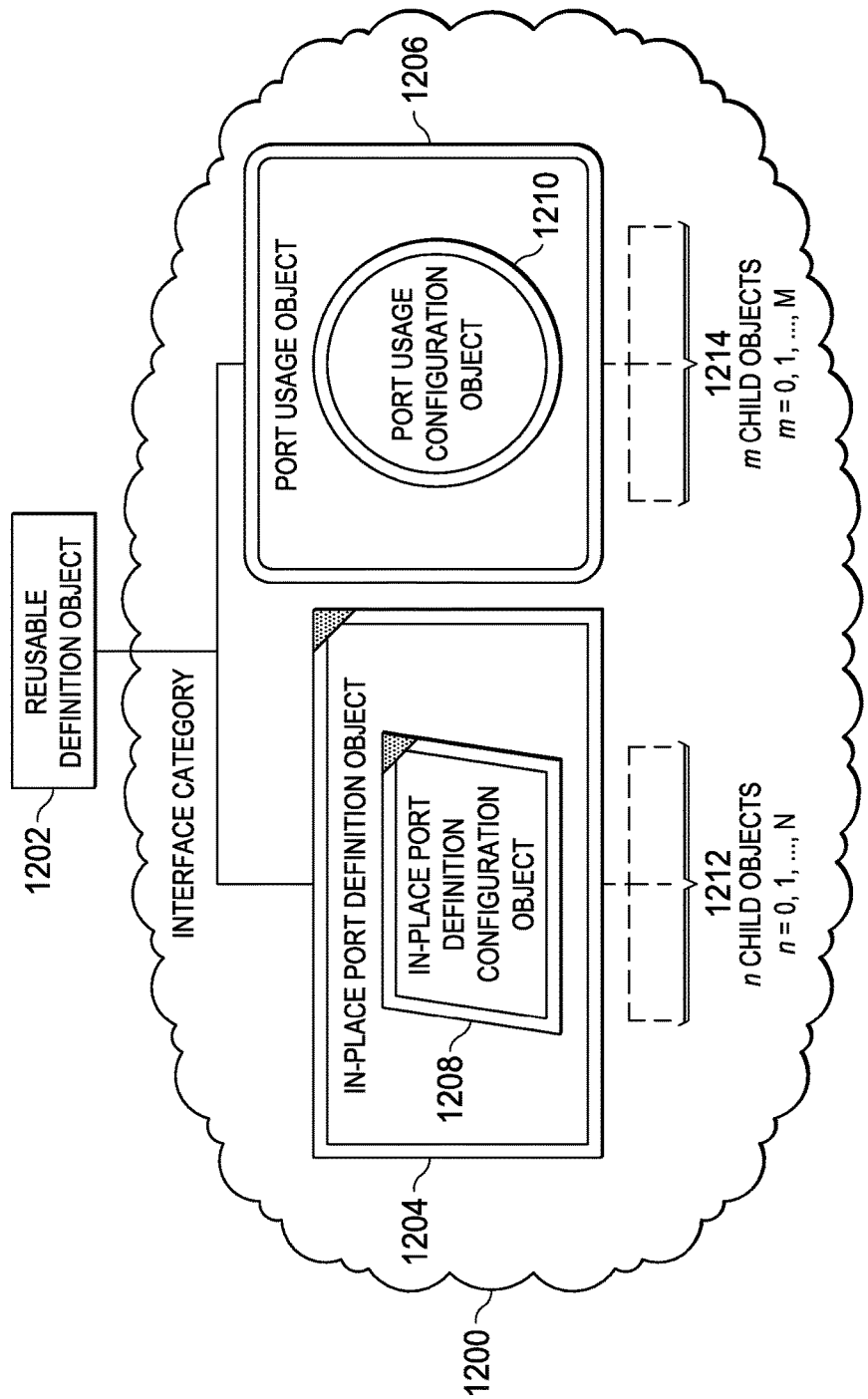
FIG. 12 is an illustration of an interface category for port objects in the form of a block diagram in accordance with an illustrative embodiment.

FIG. 12 is an illustration of an interface category for port objects in the form of a block diagram depicted in accordance with an illustrative embodiment. Interface category 1200 may be an example of a category to which port objects belong. A port object that belongs to interface category 1200 may also be referred to as an interface port object in some cases.

A port object that belongs to interface category 1200 may not be reusable. In other words, a port object that belongs to interface category 1200 may not be instantiated by a usage within a model. Further, a port object that belongs to interface category 1200 may not be connectable to any other port object. Rather, another port object that is connectable may be used to implement a port object belonging to interface category 1200. This connectable port object may then be connected to another connectable port object that is in the same hierarchy as the connectable port object.

In this illustrative example, any port master object that is a child object of a reusable definition object, such as reusable definition object 1202, may belong to interface category 1200. In other words, any port master object that is a child object of the root object of a primary hierarchical organization may belong to interface category 1200.

For example, in-place port definition object 1204 and port usage object 1206 may be child objects of reusable definition object 1202. Reusable definition object 1202 may be the root object of a primary hierarchical organization.

Further, any port configuration object that corresponds to a port master object belonging to interface category 1200 may also belong to interface category 1200. For example, in-place port definition configuration object 1208 and port usage configuration objet 1210 may correspond to in-place port definition object 1204 and port usage object 1206, respectively. Consequently, in-place port definition configuration object 1208 and port usage configuration object 1210 may also belong to interface category 1200.

In these illustrative examples, any child objects belonging to a port object belonging to interface category 1200 and any child objects within the port substructure formed by this port object may be considered as belonging to interface category 1200. For example, in-place port definition object 1204 may have set of child objects 1212, and port usage object 1206 may have set of child objects 1214. Set of child objects 1212 may include n child objects, while set of child objects 1214 may include m child objects.

In these illustrative examples, both set of child objects 1212 and set of child objects 1214 may be considered part of interface category 1200. Further, any child objects of these child objects may also be considered part of interface category 1200.

Figure 13:
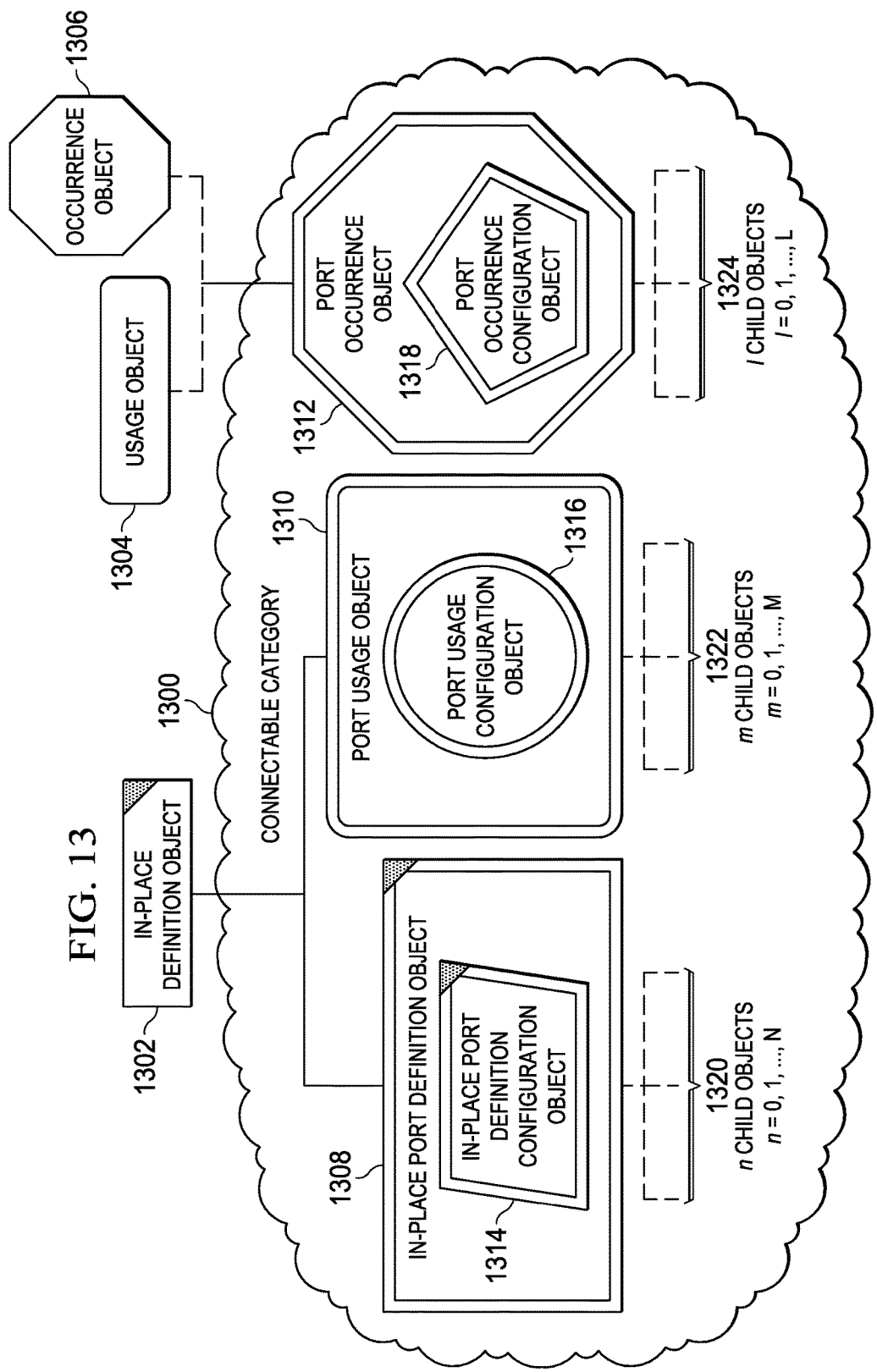
FIG. 13 is an illustration of a connectable category for port objects in the form of a block diagram in accordance with an illustrative embodiment.

FIG. 13 is an illustration of a connectable category for port objects in the form of a block diagram depicted in accordance with an illustrative embodiment. Connectable category 1300 may be an example of a category to which port objects may belong. A port object that belongs to connectable category 1300 may also be referred to as a connectable port object in some cases.

A port object that belongs to connectable category 1300 may be connected to another port object belonging to connectable category 1300. Further, a port object belonging to connectable category 1300 may be used to implement a port object belonging to interface category 1200 in FIG. 12.

In these illustrative examples, any port master object that is a child object of a master object, which is not a root object, may belong to connectable category 1300. For example, any port master object that is the child object of in-place definition object 1302, usage object 1304, or occurrence object 1306 within a primary hierarchical organization may belong to connectable category 1300.

For example, in-place port definition object 1308 and port usage object 1310 may be the child objects of in-place definition object 1302. Port occurrence object 1312 may be the child object of either usage object 1304 or occurrence object 1306. As depicted, in-place port definition object 1308, port usage object 1310, and port occurrence object 1312 may all belong to connectable category 1300.

Further, any port configuration object corresponding to a port master object that belongs to connectable category 1300 may also belong to connectable category 1300. In this manner, in-place port definition configuration object 1314 corresponding to in-place port definition object 1308, port usage configuration object 1316 corresponding to port usage object 1310, and port occurrence configuration object 1318 corresponding to port occurrence object 1312 may all belong to connectable category 1300.

Additionally, all child objects of a port object belonging to connectable category 1300 may also be considered as belonging to connectable category 1300. For example, in-place port definition object 1308 may have set of child objects 1320, port usage object 1310 may have set of child objects 1322, and port occurrence object 1312 may have set of child objects 1324. Set of child objects 1320 may include n child objects, set of child objects 1322 may include m child objects, and set of child objects 1324 may include l child objects.

Set of child objects 1320, set of child objects 1322, and set of child objects 1324 may all belong to connectable category 1300. Further, any child objects of these child objects may also belong to connectable category 1300.

Connectable category 1300 in FIG. 13, interface category 1200 in FIG. 12, and reusable category 1100 in FIG. 11 are examples of categories for port objects. However, in some illustrative examples, not all port objects may belong to one of these categories. In other illustrative examples, other categories may be present.

Figure 14:
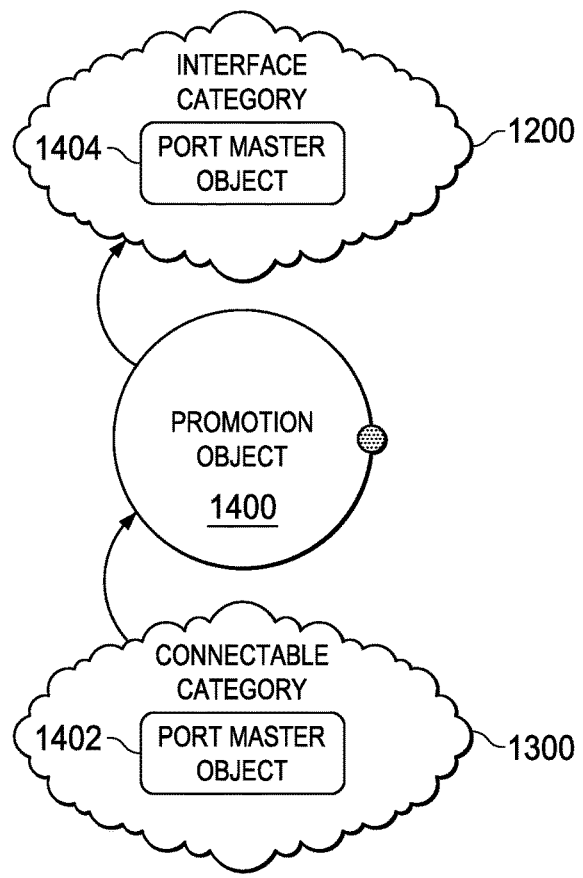
FIG. 14 is an illustration of a promotion object in the form of a block diagram in accordance with an illustrative embodiment.

FIG. 14 is an illustration of a promotion object in the form of a block diagram depicted in accordance with an illustrative embodiment. In these illustrative examples, promotion object 1400 may be an example of an object belonging to promotion class 162 in FIG. 1.

Promotion object 1400 may be used in a model to indicate that a connectable port object belonging to connectable category 1300 is used to implement an interface port object belonging to interface category 1200. For example, promotion object 1400 may be connected to both port master object 1402 belonging to connectable category 1300 and port master object 1404 belonging to interface category 1200. Promotion object 1400 may be used to indicate that port master object 1402 implements port master object 1404. In other words, promotion object 1400 may promote port master object 1402 to port master object 1404.

Figure 15:
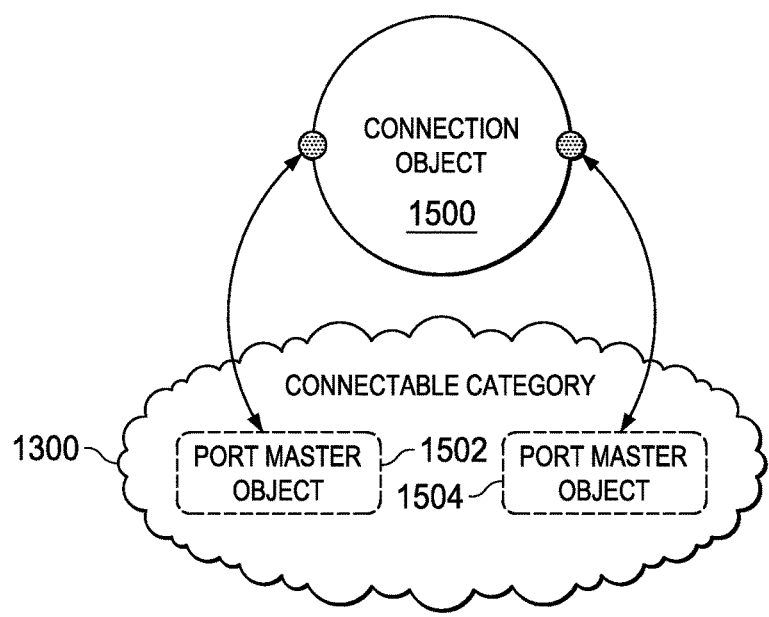
FIG. 15 is an illustration of a connection object in the form of a block diagram in accordance with an illustrative embodiment.

FIG. 15 is an illustration of a connection object in the form of a block diagram depicted in accordance with an illustrative embodiment. In these illustrative examples, connection object 1500 may be an example of an object belonging to connection class 164 in FIG. 1.

Connection object 1500 may be used in a model to connect a connectable port object belonging to connectable category 1300 to another port object belonging to connectable category 1300. For example, connection object 1500 may be connected to both port master object 1502 belonging to connectable category 1300 and port master object 1504 belonging to connectable category 1300. Connection object 1500 may connect port master object 1502 to port master object 1504.

The illustrations of reusable definition object 200 in FIG. 2, in-place definition object 300 in FIG. 3, usage object 400 in FIG. 4, occurrence object 500 in FIG. 5, reusable definition configuration object 600 in FIG. 6, in-place definition configuration object 700 in FIG. 7, usage configuration object 800 in FIG. 8, occurrence configuration object 900 in FIG. 9, port objects 1000 in FIG. 10, reusable category 1100 of port objects in FIG. 2, interface category 1200 of port objects in FIG. 12, connectable category 1300 of port objects in FIG. 13, promotion object 1400, in FIG. 14, and connection object 1500 in FIG. 15 are not meant to imply physical or architectural limitations to the manner in which an illustrative embodiment may be implemented. Other components in addition to or in place of the ones illustrated may be used. Some components may be optional.

Figure 16:
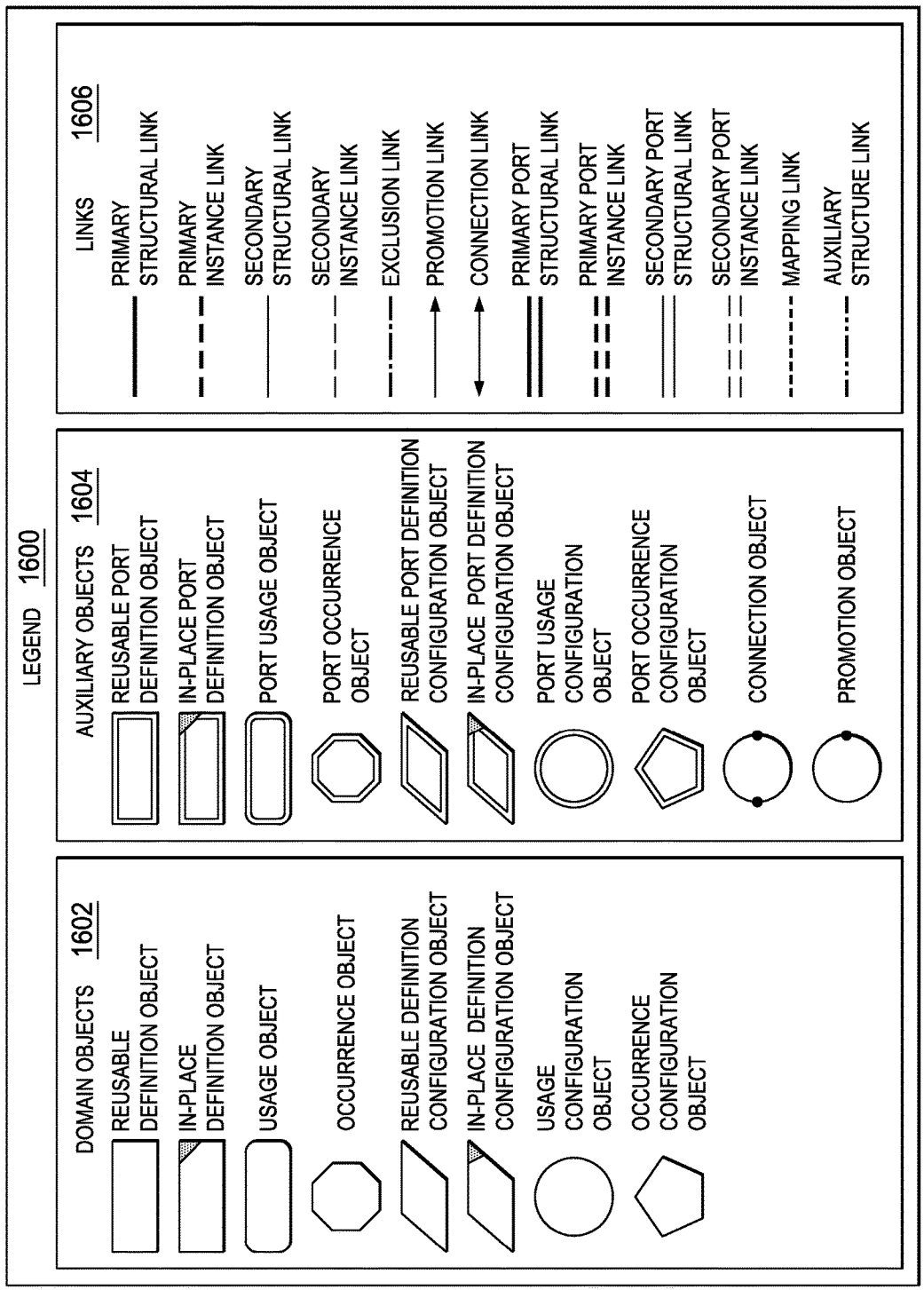
FIG. 16 is an illustration of a legend of objects in accordance with an illustrative embodiment.

FIG. 16 is an illustration of a legend of objects depicted in accordance with an illustrative embodiment. In FIG. 16, legend 1600 includes a listing of domain objects 1602, auxiliary objects 1604, and links 1606 that appear in the illustrations of models in FIGS. 17-32 below. The models illustrated in FIGS. 17-32 may be examples of implementations for model 114 in FIG. 1.

Figure 17:
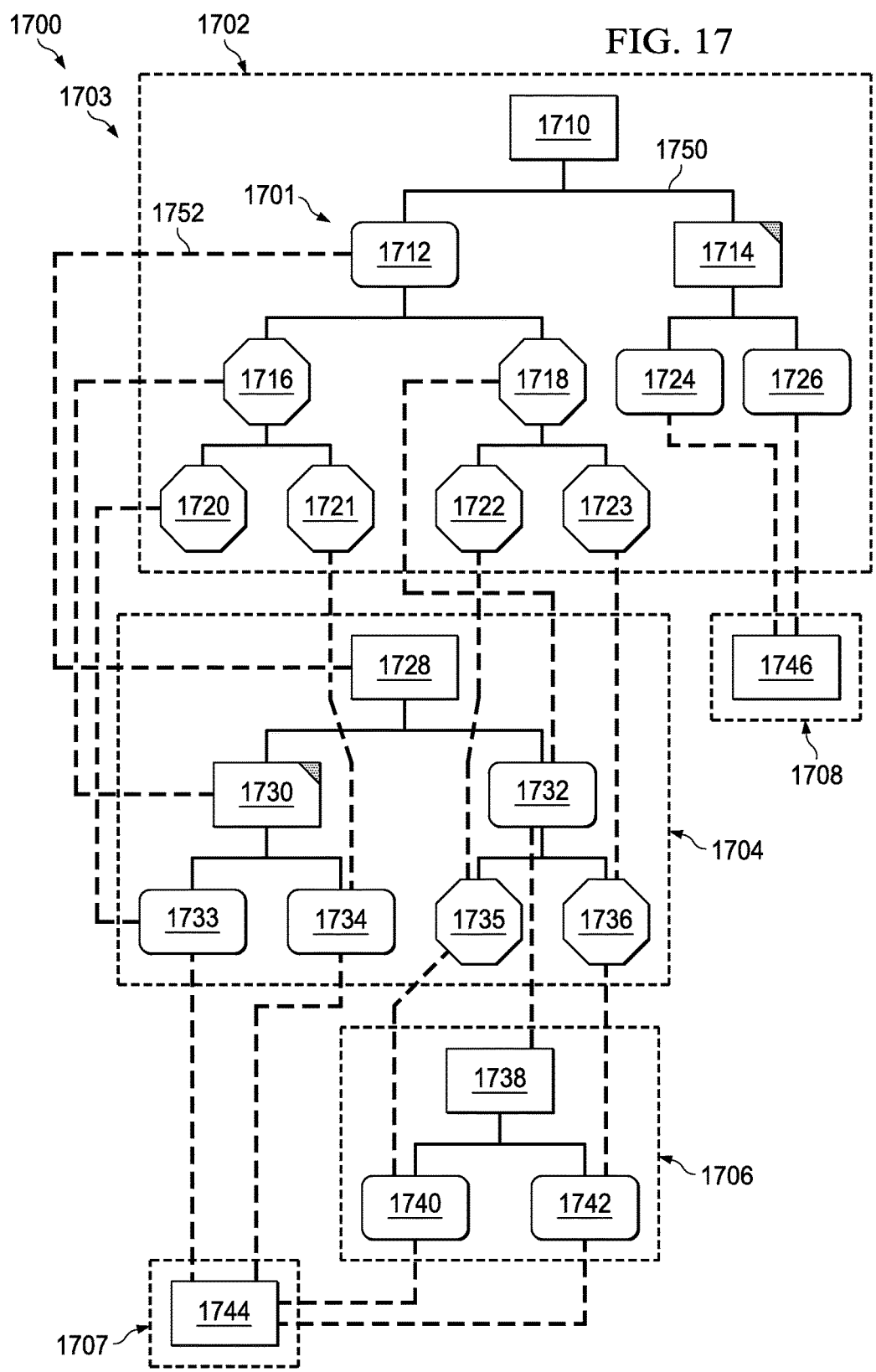
FIG. 17 is an illustration of a primary hierarchical organization in accordance with an illustrative embodiment.
Figure 18:
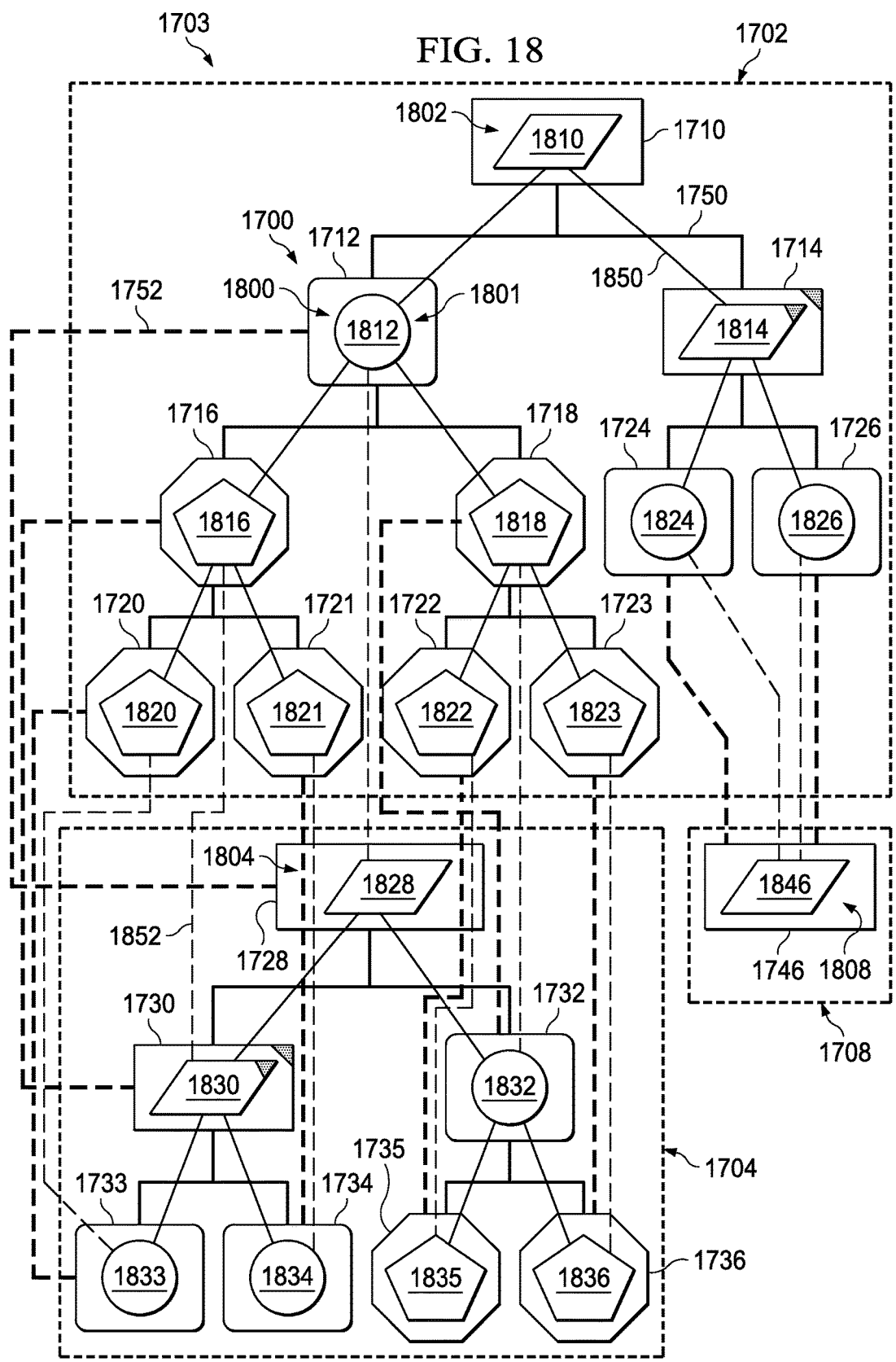
FIG. 18 is an illustration of a portion of a secondary hierarchical organization associated with a portion of a primary hierarchical organization in accordance with an illustrative embodiment.
Figure 25:
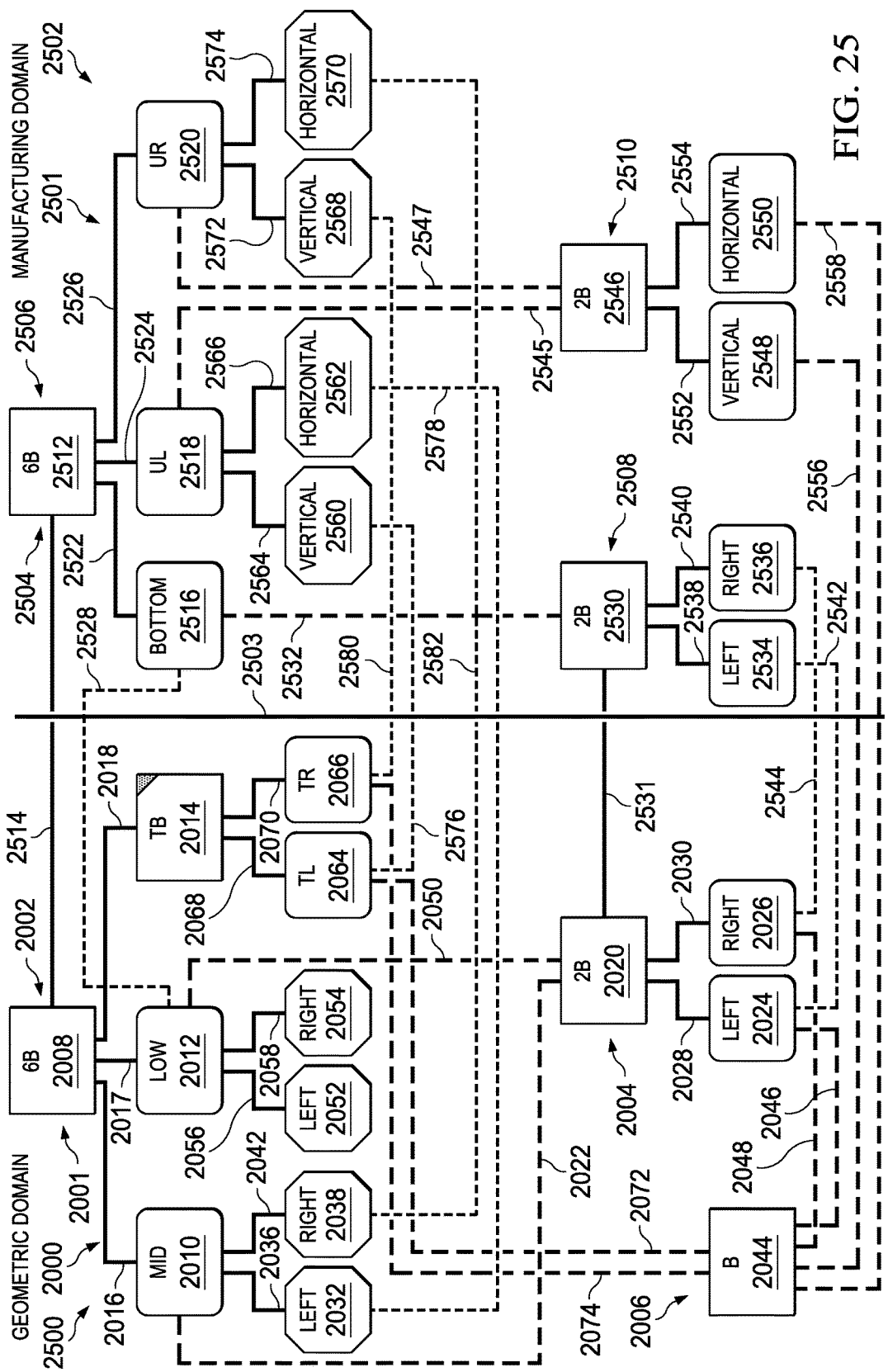
FIG. 25 is an illustration of a mapping between models for two domains in accordance with an illustrative embodiment.

In these illustrative examples, all of the objects in model 1703 in FIGS. 17-18, model 2000 in FIGS. 20-21, FIG. 23, and FIG. 25, model 2501 in FIG. 25 may be domain objects. Further, any object in model 2600 in FIGS. 26-28 and model 2900 in FIGS. 29-30 that is not a port object, a promotion object, or a connection object may be one of a domain master object and a domain configuration object.

FIG. 17 is an illustration of a primary hierarchical organization depicted in accordance with an illustrative embodiment. In this illustrative example, primary hierarchical organization 1700 is an example of one implementation of primary hierarchical organization 144 in FIG. 1.

Primary hierarchical organization 1700 is formed by master objects 1701. Master objects 1701 may be domain master objects in this illustrative example. In particular, master objects 1701 are examples of objects in group of domain master objects 128 in FIG. 1. Primary hierarchical organization 1700 with master objects 1701 may be a part of model 1703. Model 1703 may be an example of one implementation for model 114 in FIG. 1.

As depicted, primary hierarchical organization 1700 includes main structure 1702, instantiated structure 1704, instantiated structure 1706, instantiated structure 1707, and instantiated structure 1708. Main structure 1702 may be an example of one implementation for main structure 146 in primary hierarchical organization 144 in FIG. 1. Instantiated structure 1704, instantiated structure 1706, instantiated structure 1707, and instantiated structure 1708 may be examples of one implementation for number of instantiated structures 148 in primary hierarchical organization 144 in FIG. 1.

In this illustrative example, main structure 1702 may include reusable definition object 1710, usage object 1712, in-place definition object 1714, occurrence object 1716, occurrence object 1718, occurrence object 1720, occurrence object 1721, occurrence object 1722, occurrence object 1723, usage object 1724, and usage object 1726. Reusable definition object 1710 may be the root object of main structure 1702.

Reusable definition object 1710 may represent a product, such as product 102 in FIG. 1. In this illustrative example, product 102 is an assembly component. As depicted, reusable definition object 1710 may be the parent object of usage object 1712 and in-place definition object 1714.

In this illustrative example, usage object 1712 may be an instantiation of reusable definition object 1728. Reusable definition object 1728 may represent an assembly component. Usage object 1712 may represent the usage of this assembly component in the product represented by reusable definition object 1710. Reusable definition object 1728 may be the root object of instantiated structure 1704.

Instantiated structure 1704 may be independent from main structure 1702. Instantiated structure 1704 may include reusable definition object 1728, in-place definition object 1730, usage object 1732, usage object 1733, usage object 1734, occurrence object 1735, and occurrence object 1736.

As depicted, reusable definition object 1728 may be the parent object of in-place definition object 1730 and usage object 1732. Usage object 1732 may be an instantiation of reusable definition object 1738. Reusable definition object 1738 may represent an assembly component and usage object 1732 may represent the usage of this assembly component in the product represented by reusable definition object 1710.

Reusable definition object 1738 may be the root object of instantiated structure 1706. Instantiated structure 1706 may be separate from instantiated structure 1704. Instantiated structure 1706 may include reusable definition object 1738, usage object 1740, and usage object 1742.

Both usage object 1740 and usage object 1742 may be child objects of reusable definition object 1738. Further, both usage object 1740 and usage object 1742 may be instantiations of reusable definition object 1744. Reusable definition object 1744 is the root object of instantiated structure 1707.

Instantiated structure 1707 may be separate from instantiated structure 1706. As depicted, instantiated structure 1707 may only comprise one hierarchical level in this illustrative example. In other words, reusable definition object 1744 may represent a leaf component. Usage object 1740 and usage object 1742 may represent two usages of this leaf component in the product represented by reusable definition object 1710.

When reusable definition object 1738 in instantiated structure 1706 is instantiated as usage object 1732 in instantiated structure 1704, all objects in instantiated structure 1706 under reusable definition object 1738 may be instantiated as occurrence objects under usage object 1732 in instantiated structure 1704. For example, when usage object 1732 is created, usage object 1740 may be instantiated as occurrence object 1735, and usage object 1742 may be instantiated as occurrence object 1736.

Further, in this illustrative example, in-place definition object 1730 may be the parent object of usage object 1733 and usage object 1734. Both usage object 1733 and usage object 1734 may be instantiations of reusable definition object 1744.

When usage object 1712 in main structure 1702 is created, all objects within instantiated structure 1704 below reusable definition object 1728 may be instantiated as occurrence objects under usage object 1712. For example, usage object 1712 may be the parent object of occurrence object 1716 and occurrence object 1718.

In-place definition object 1730 may be instantiated as occurrence object 1716. Occurrence object 1716 may be the parent object of occurrence object 1720 and occurrence object 1721. Occurrence object 1720 may be the instantiation of usage object 1733.
Occurrence object 1721 may be the instantiation of usage object 1734.

Further, usage object 1732 may be instantiated as occurrence object 1718 under usage object 1712. Occurrence object 1718 may be the parent object of occurrence object 1722, which may be the instantiation of occurrence object 1735. Occurrence object 1723 may be the instantiation of occurrence object 1736.

In this illustrative example, in-place definition object 1714 may be the parent object of usage object 1724 and usage object 1726. Both usage object 1724 and usage object 1726 may be instantiations of reusable definition object 1746. Reusable definition object 1746 may be the root object of instantiated structure 1708. As depicted, instantiated structure 1708 comprises only one hierarchical level. In this manner, reusable definition object 1746 may represent a leaf component. Usage object 1724 and usage object 1726 may represent two usages of this leaf component in the product represented by reusable definition object 1710.

In these illustrative examples, the different master objects that form primary hierarchical organization 1700 are connected to each other by primary structural links 1750. In particular, the components belonging to a particular hierarchical structure are connected to each other in that hierarchical structure by one or more primary structural links 1750.

As used herein, a "structural link" may be a link between two objects that indicates that one of the objects is the child object of the other object. A "primary structural link" may be a link between two master objects in a primary hierarchical organization. In these illustrative examples, a primary structural link may not connect a master object in one hierarchical structure with another master object in another hierarchical structure within a primary hierarchical organization.

Further, primary instance links 1752 may also be used in primary hierarchical organization 1700. As used herein, an "instance link" may be a link between two objects that indicates that one object is the instantiation of the other object. A "primary instance link" may be a link between two master objects in a primary hierarchical organization.

Typically, a primary instance link may begin at a usage object or an occurrence object and end at the master object being instantiated by the usage object or the occurrence object. A primary instance link may cross from one hierarchical structure to another hierarchical structure within a primary hierarchical organization.

For example, a primary instance link may begin at a master object in a main structure and end at a master object in an instantiated structure. Further, the primary instance link may also indicate that the instantiated structure is instantiated or represented in the main structure. In this manner, the instantiation of a root object of an instantiated structure by a master object in the main structure, as indicated by a primary instance link, may mean that all of the objects in that instantiated structure are represented in the main structure. A primary instance link may not begin and end within a same hierarchical structure.

FIG. 18 is an illustration of a portion of a secondary hierarchical organization associated with a portion of a primary hierarchical organization depicted in accordance with an illustrative embodiment. In this illustrative example, secondary hierarchical organization 1800 may be associated with primary hierarchical organization 1700 in FIG. 17. Secondary hierarchical organization 1800 may also be part of model 1703.

Only a portion of primary hierarchical organization 1700 from FIG. 17 is depicted in this example. In particular, main structure 1702, instantiated structure 1704, and instantiated structure 1708 are depicted. Further, only a portion of secondary hierarchical organization 1800 is depicted in this example.

In this illustrative example, secondary hierarchical organization 1800 may be formed by configuration objects 1801. Configuration objects 1801 may be examples of domain configuration objects. In particular, configuration objects 1801 are examples of objects in group of domain configuration objects 130 in FIG. 1. Each of configuration objects 1801 may correspond to the master object within which the configuration object is located.

As depicted, secondary hierarchical organization 1800 may include main structure 1802 and instantiated structure 1804. Main structure 1802 may be associated with main structure 1702 of primary hierarchical organization 1700. Instantiated structure 1804 may be associated with instantiated structure 1704 of primary hierarchical organization 1700. Instantiated structure 1808 may be associated with instantiated structure 1708 of primary hierarchical organization 1700. Additionally, secondary hierarchical organization 1800 may include an instantiated structure (not shown) associated with instantiated structure 1706 in FIG. 17 and an instantiated structure (not shown) associated with instantiated structure 1707 in FIG. 17.

In this illustrative example, main structure 1802 may include reusable definition configuration object 1810, usage configuration object 1812, in-place definition configuration object 1814, occurrence configuration object 1816, occurrence configuration object 1818, occurrence configuration object 1820, occurrence configuration object 1821, occurrence configuration object 1822, occurrence configuration object 1823, usage configuration object 1824, and usage configuration object 1826. Reusable definition configuration object 1810 may be the root object of main structure 1802.

Reusable definition configuration object 1810 may correspond to reusable definition object 1710. Reusable definition configuration object 1810 may represent a configuration for the product represented by reusable definition object 1710. As depicted, reusable definition configuration object 1810 may have usage configuration object 1812 and in-place definition configuration object 1814 as child objects.

In this illustrative example, usage configuration object 1812 may be an instantiation of reusable definition configuration object 1828 corresponding to reusable definition object 1728. Reusable definition configuration object 1828 may represent a particular configuration for the component represented by reusable definition object 1728.

Reusable definition configuration object 1828 may be the root object of instantiated structure 1804. Instantiated structure 1804 may include reusable definition configuration object 1828, in-place definition configuration object 1830, usage configuration object 1832, usage configuration object 1833, usage configuration object 1834, occurrence configuration object 1835, and occurrence configuration object 1836.

As depicted, in-place definition configuration object 1830 and usage configuration object 1832 may be the child objects of reusable definition configuration object 1828. In this manner, the particular configuration represented by reusable definition configuration object 1828 for the component represented by reusable definition object 1728 may comprise the component, represented by in-place definition object 1730, having the configuration represented by in-place definition configuration object 1830.

As depicted, usage configuration object 1833 and usage configuration object 1834 may be child objects of in-place definition configuration object 1830. Both usage configuration object 1833 and usage configuration object 1834 may be instantiations of a reusable definition configuration object (not shown) for reusable definition object 1744 in FIG. 17.

Usage configuration object 1832 may be an instantiation of a reusable definition configuration object (not shown) corresponding to reusable definition object 1738 in FIG. 17. Occurrence configuration object 1835 and occurrence configuration object 1836 may be the child objects of usage configuration object 1832. When usage configuration object 1832 is created, occurrence configuration object 1835 and occurrence configuration object 1836 may also be created.

Occurrence configuration object 1835 may be an instantiation of a usage configuration object (not shown) for usage object 1740 in FIG. 17. Occurrence configuration object 1836 may be an instantiation of a usage configuration object (not shown) for usage object 1742 in FIG. 17.

Further, when reusable definition configuration object 1828 is instantiated as usage configuration object 1812, all of the configuration objects under reusable definition configuration object 1828 within instantiated structure 1804 may be instantiated under usage configuration object 1812. For example, occurrence configuration object 1816 may be an instantiation of in-place definition configuration object 1830. Occurrence configuration object 1818 may be an instantiation of usage configuration object 1832.

Additionally, occurrence configuration object 1820 may be an instantiation of usage configuration object 1833. Occurrence configuration object 1821 may be an instantiation of usage configuration object 1834. Occurrence configuration object 1822 may be an instantiation of occurrence configuration object 1835. Occurrence configuration object 1823 may be an instantiation of occurrence configuration object 1836.

In this illustrative example, usage configuration object 1824 and usage configuration object 1826 may be the child objects of in-place definition configuration object 1814. Both usage configuration object 1824 and usage configuration object 1826 may be instantiations of reusable definition configuration object 1846 corresponding to reusable definition object 1746.

As depicted, the different configuration objects in secondary hierarchical organization 1800 may be connected to each other using secondary structural links 1850. As used herein, a "secondary structural link" may be a link between two configuration objects in which one of the configuration objects is the parent object of the other configuration object. In these illustrative examples, a secondary structural link may not connect a configuration object in one hierarchical structure with another configuration object in another hierarchical structure within a secondary hierarchical organization.

Further, secondary instance links 1852 may also be present in secondary hierarchical organization 1800. As used herein, a "secondary instance link" may be a link between two configuration objects in which one of the configuration objects is an instantiation of the other configuration object.

Typically, a secondary instance link may begin at a usage configuration object or an occurrence configuration object and end at the configuration object being instantiated by the usage configuration object or the occurrence configuration object. A secondary instance link may cross from one hierarchical structure to another hierarchical structure within a secondary hierarchical organization. However, a secondary instance link may not begin and end within a same hierarchical structure.

The illustrations of primary hierarchical organization 1700 in FIG. 17 and secondary hierarchical organization in FIG. 18 are not meant to imply physical or architectural limitations to the manner in which an illustrative embodiment may be implemented. Other components in addition to or in place of the ones illustrated may be used. Some components may be optional.

In some illustrative examples, one or more additional secondary hierarchical organizations may be associated with primary hierarchical organization 1700 in model 1703 in FIGS. 17 and 18. For example, when a variant for the product represented by reusable definition object 1710 is to be added to model 1703, an additional reusable definition configuration object may be added within reusable definition object 1710.

This reusable definition configuration object may be the root object for the additional secondary hierarchical organization. The additional reusable definition configuration object may share one or more of the same child objects as reusable definition configuration object 1810.

In one illustrative example, the additional reusable definition configuration object may have a new usage configuration object corresponding to usage object 1712 as a child object instead of usage configuration object 1812. In this particular example, the additional reusable definition configuration object may still have in-place definition configuration object 1814 as a child object.

The different variations that may be possible within a product structure for the product represented by reusable definition object 1710 may be represented in model 1703 using different configuration objects and various secondary structural links and secondary instance links. Model 1703 may allow different variants of the product represented by reusable definition object 1710 to be represented in model 1703 without more redundant data than desired.

Figure 19:
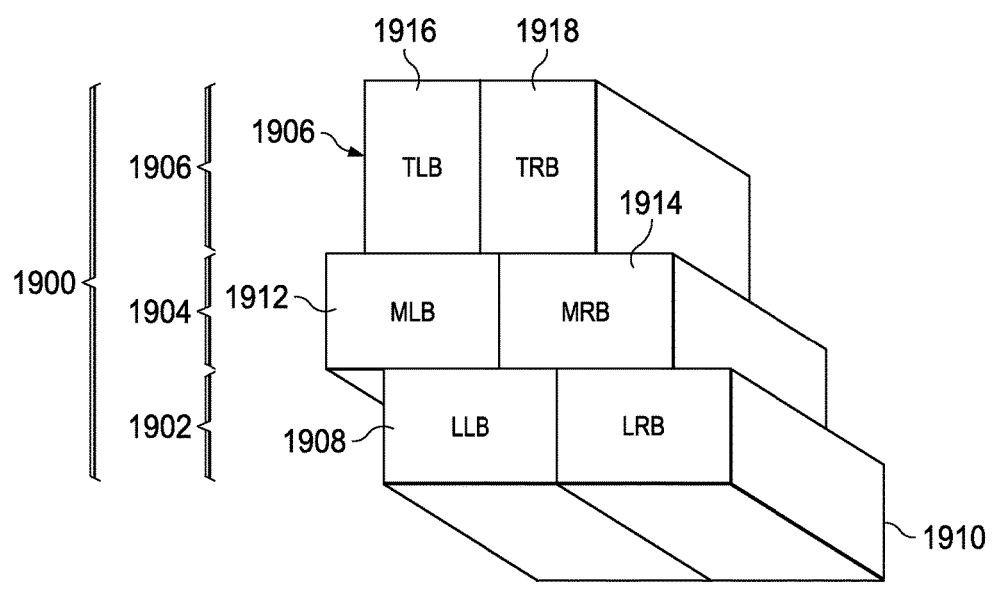
FIG. 19 is an illustration of a six-brick assembly in accordance with an illustrative embodiment.

FIG. 19 is an illustration of a six-brick assembly depicted in accordance with an illustrative embodiment. Six-brick assembly 1900 may be an example of one implementation for product 102 in FIG. 1. In this illustrative example, six-brick assembly 1900 is an example of one implementation for tangible product 104 in FIG. 1. As depicted in FIG. 19, six-brick assembly 1900 may be made up of six physical bricks. The illustrative embodiment shown in FIGS. 19-21 may be used to demonstrate the illustrative embodiments described with respect to FIGS. 1-9. In other words, the illustrative embodiment shown in FIGS. 19-21 illustrates one example of how to use the representation schemes described herein to represent a relatively simple assembly of physical objects in the form of a model.

Figure 20:
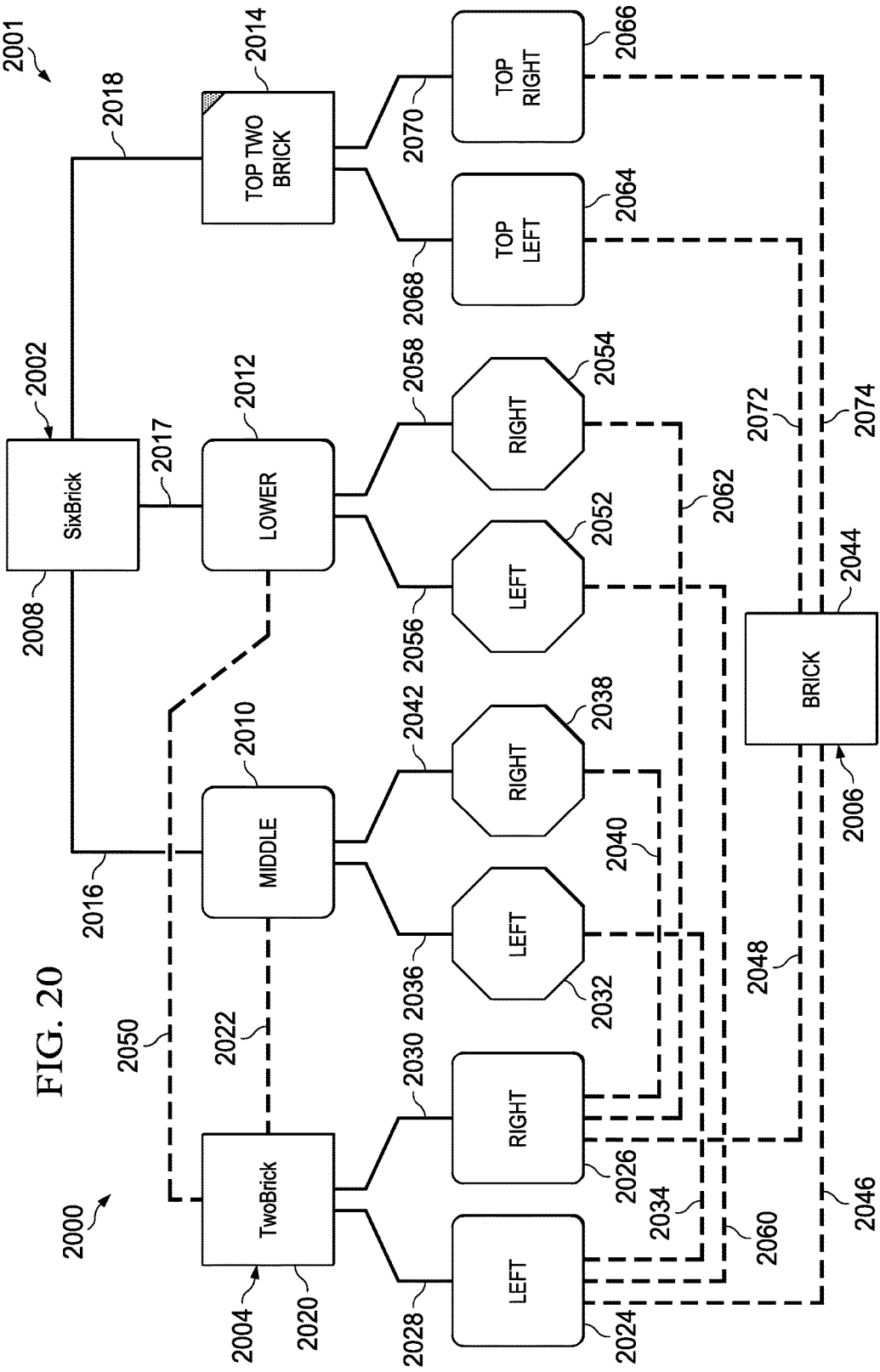
FIG. 20 is an illustration of a model of a six-brick assembly in accordance with an illustrative embodiment.
Figure 21:
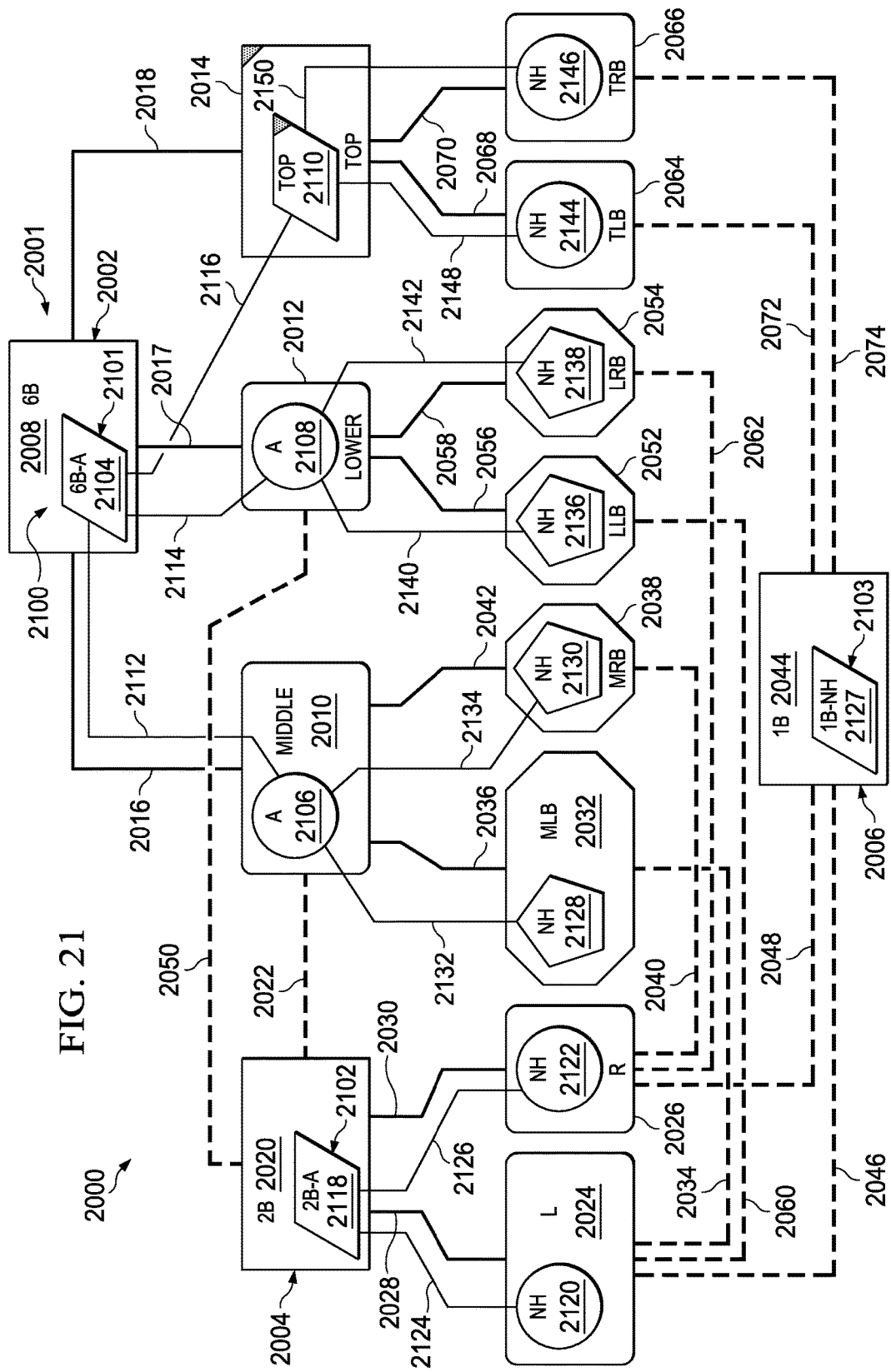
FIG. 21 is an illustration of a model of a six-brick assembly in accordance with an illustrative embodiment.

While the illustrative embodiments described in FIGS. 19-21 may appear to represent six-brick assembly 1900 in a more complex manner than a simple description of the six bricks shown, the illustrative embodiments may minimize the amount of data needed to store all possible variations of six-brick assembly 1900. For example, if the size or position of any given brick in six-brick assembly 1900 changes, then the illustrative embodiments allow for the minimum amount of data needed to store all possible variations of six-brick assembly 1900.

If six-brick assembly 1900 were to be replaced by an aircraft model comprising 500,000 components, each of which may vary in different individual aircraft models, then the illustrative embodiments may provide a very substantial savings in both storage space for storing all such representations and also save processing overhead used to process such different representations. The illustrative embodiments shown in FIGS. 19-21 do not serve to limit the claimed invention.

In this illustrative example, six-brick assembly 1900 may comprise lower two-brick assembly 1902, middle two-brick assembly 1904, and top two-brick assembly 1906. Lower two-brick assembly 1902 may comprise brick 1908 and brick 1910. Middle two-brick assembly 1904 may comprise brick 1912 and brick 1914. Top two-brick assembly 1906 may comprise brick 1916 and brick 1918. Bricks 1908, 1910, 1912, 1914, 1916, and 1918 may be different usages of a particular type of brick.

FIG. 20 is an illustration of a model of a six-brick assembly depicted in accordance with an illustrative embodiment. Model 2000 may be an example of one manner in which a product structure for six-brick assembly 1900 in FIG. 19 may be modeled. Model 2000 may be an example of one implementation for model 114 in FIG. 1. In these illustrative examples, model 2000 for six-brick assembly 1900 may be a model of the product structure for six-brick assembly 1900 with respect to a geometric domain.

As depicted, model 2000 comprises primary hierarchical organization 2001. The objects that form primary hierarchical organization 2001 may be domain master objects. Primary hierarchical organization 2001 may include main structure 2002, instantiated structure 2004, and instantiated structure 2006. As depicted, reusable definition object 2008 may represent six-brick assembly 1900 in FIG. 19. Usage object 2010, usage object 2012, and in-place definition object 2014 may be child objects of reusable definition object 2008, as indicated by primary structural link 2016, primary structural link 2017, and primary structural link 2018, respectively.

Usage object 2010 may be an instantiation of reusable definition object 2020, as indicated by primary instance link 2022. Reusable definition object 2020 may represent a two-brick assembly.

In this illustrative example, usage object 2024 and usage object 2026 may be the child objects of reusable definition object 2020, as indicated by primary structural link 2028 and primary structural link 2030, respectively. When usage object 2010 is created in model 2000 to instantiate reusable definition object 2020, usage object 2024 may be instantiated as occurrence object 2032, as indicated by primary instance link 2034. Occurrence object 2032 may be a child object of usage object 2010, as indicated by primary structural link 2036. Occurrence object 2032 may represent brick 1912 in middle two-brick assembly 1904 in FIG. 19.

Further, usage object 2026 may be instantiated as occurrence object 2038, as indicated by primary instance link 2040. Occurrence object 2038 may be a child object of usage object 2010, as indicated by primary structural link 2042. Occurrence object 2038 may represent brick 1914 in middle two-brick assembly 1904 in FIG. 19. In this manner, all child objects of reusable definition object 2020 may be instantiated as occurrence objects that are child objects of usage object 2010 when usage object 2010 is created.

Usage object 2024 and usage object 2026 may both be instantiations of reusable definition object 2044, as indicated by primary instance link 2046 and primary instance link 2048, respectively. Reusable definition object 2044 may represent a brick. Usage object 2024 may represent a left brick in a two-brick assembly and usage object 2026 may represent a right brick in a two-brick assembly. Further, usage object 2010 may represent middle two-brick assembly 1904 in FIG. 2.

Similarly, usage object 2012 may also be an instantiation of reusable definition object 2020, as indicated by primary instance link 2050. Usage object 2012 may represent lower two-brick assembly 1902 in FIG. 2. As depicted, occurrence object 2052 and occurrence object 2054 may be child objects of usage object 2012, as indicated by primary structural link 2056 and primary structural link 2058, respectively.

Occurrence object 2052 may be an instantiation of usage object 2024, as indicated by primary instance link 2060. Further, occurrence object 2052 may represent brick 1908 in lower two-brick assembly 1902 in FIG. 19. Occurrence object 2054 may be an instantiation of usage object 2026, as indicated by primary instance link 2062. Further, occurrence object 2054 may represent brick 1910 in lower two-brick assembly 1902 in FIG. 19.

In this illustrative example, in-place definition object 2014 may represent top two-brick assembly 1906 in FIG. 19. Usage object 2064 and usage object 2066 may be child objects of in-place definition object 2014, as indicated by primary structural link 2068 and primary structural link 2070, respectively.

Both usage object 2064 and usage object 2066 may be instantiations of reusable definition object 2044, as indicated by primary instance link 2072 and primary instance link 2074, respectively. Usage object 2064 may represent brick 1916 in top two-brick assembly 1906 in FIG. 19. Usage object 2066 may represent brick 1918 in top two-brick assembly 1906 in FIG. 19.

In this manner, instantiated structure 2006 may comprise reusable definition object 2044. Instantiated structure 2004 may comprise reusable definition object 2020, usage object 2024, and usage object 2026. Further, main structure 2002 may include reusable definition object 2008, usage object 2010, usage object 2012, in-place definition object 2014, occurrence object 2032, occurrence object 2038, occurrence object 2052, occurrence object 2054, usage object 2064, and usage object 2066.

FIG. 21 is an illustration of a model of a six-brick assembly depicted in accordance with an illustrative embodiment. In this illustrative example, secondary hierarchical organization 2100 has been added to model 2000. Secondary hierarchical organization 2100 may be associated with primary hierarchical organization 2001. The objects that form secondary hierarchical organization 2100 may be domain configuration objects.

Secondary hierarchical organization 2100 may be added to represent a standard configuration for six-brick assembly 1900 in FIG. 19. As one illustrative example, secondary hierarchical organization 2100 may represent the standard configuration for six-brick assembly 1900 in which none of the bricks in six-brick assembly 1900 in FIG. 19 have any holes.

In this illustrative example, an initial secondary hierarchical organization, such as secondary hierarchical organization 2100, that is to be associated with primary hierarchical organization 2001 may be created in a manner such that secondary hierarchical organization 2100 comprises at least one configuration object associated with each master object in primary hierarchical organization 2001. Consequently, secondary hierarchical organization 2100 may be similar to primary hierarchical organization 2001.

Secondary hierarchical organization 2100 may include main structure 2101, instantiated structure 2102, and instantiated structure 2103. In these illustrative examples, adding and associating secondary hierarchical organization 2100 with primary hierarchical organization 2001 may include adding and associating main structure 2101 with main structure 2002, instantiated structure 2102 with instantiated structure 2004, and instantiated structure 2103 with instantiated structure 2006.

Reusable definition configuration object 2104 may be added to reusable definition object 2008 to represent the standard configuration for six-brick assembly 1900 in FIG. 19 in which none of the bricks have holes. Reusable definition configuration object 2104 may be the root object for main structure 2101 in secondary hierarchical organization 2100.

Usage configuration object 2106, usage configuration object 2108, and in-place definition configuration object 2110 may be the child objects of reusable definition configuration object 2104, as indicated by secondary structural link 2112, secondary structural link 2114, and secondary structural link 2116, respectively.

Usage configuration object 2106 may be an instantiation of reusable definition configuration object 2118 corresponding to reusable definition object 2020. In FIG. 21, secondary instance links that are present in model 2000 are not shown in FIG. 21. For example, in model 2000, a secondary instance link (not shown) may be present between usage configuration object 2106 and reusable definition configuration object 2118.

Usage configuration object 2120 and usage configuration object 2122 may be child objects of reusable definition configuration object 2118, as indicated by secondary structural link 2124 and secondary structural link 2126, respectively. Reusable definition configuration object 2118 may be the root object of instantiated structure 2102.

Further, as depicted, usage configuration object 2120 and usage configuration object 2122 may both be instantiations of reusable definition configuration object 2127. Reusable definition configuration object 2127 may be the root object of instantiated structure 2006. Reusable definition configuration object 2127 may be the only object in instantiated structure 2006.

Occurrence configuration object 2128 and occurrence configuration object 2130 may be instantiations of usage configuration object 2120 and usage configuration object 2122, respectively.

Occurrence configuration object 2128 and occurrence configuration object 2130 may be child objects of usage configuration object 2106, as indicated by secondary structural link 2132 and secondary structural link 2134, respectively.

Usage configuration object 2108 may also be an instantiation of reusable definition configuration object 2118. Occurrence configuration object 2136 and occurrence configuration object 2138 may be child objects of usage configuration object 2108, as indicated by secondary structural link 2140 and secondary structural link 2142, respectively. Further, occurrence configuration object 2136 and occurrence configuration object 2138 may be instantiations of usage configuration object 2120 and usage configuration object 2122, respectively. Additionally, usage configuration object 2144 and usage configuration object 2146 may be child objects of in-place definition configuration object 2110, as indicated by secondary structural link 2148 and secondary structural link 2150, respectfully.

In this manner, instantiated structure 2103 may comprise reusable definition configuration object 2127. Instantiated structure 2102 may comprise reusable definition configuration object 2118, usage configuration object 2120, and usage configuration object 2122. Further, main structure 2101 may comprise reusable definition configuration object 2104, usage configuration object 2106, usage configuration object 2108, in-place definition configuration object 2110, occurrence configuration object 2128, occurrence configuration object 2130, occurrence configuration object 2136, occurrence configuration object 2138, usage configuration object 2144, and usage configuration object 2146.

In this manner, secondary hierarchical organization 2100 in model 2000 may represent the logical decomposition of the product structure for the standard configuration for six-brick assembly 1900 in FIG. 19. With secondary hierarchical organization 2100 in place, additional secondary hierarchical organizations may be added to model 2000 to represent variants of six-brick assembly 1900 that vary from this standard configuration.

Figure 22:
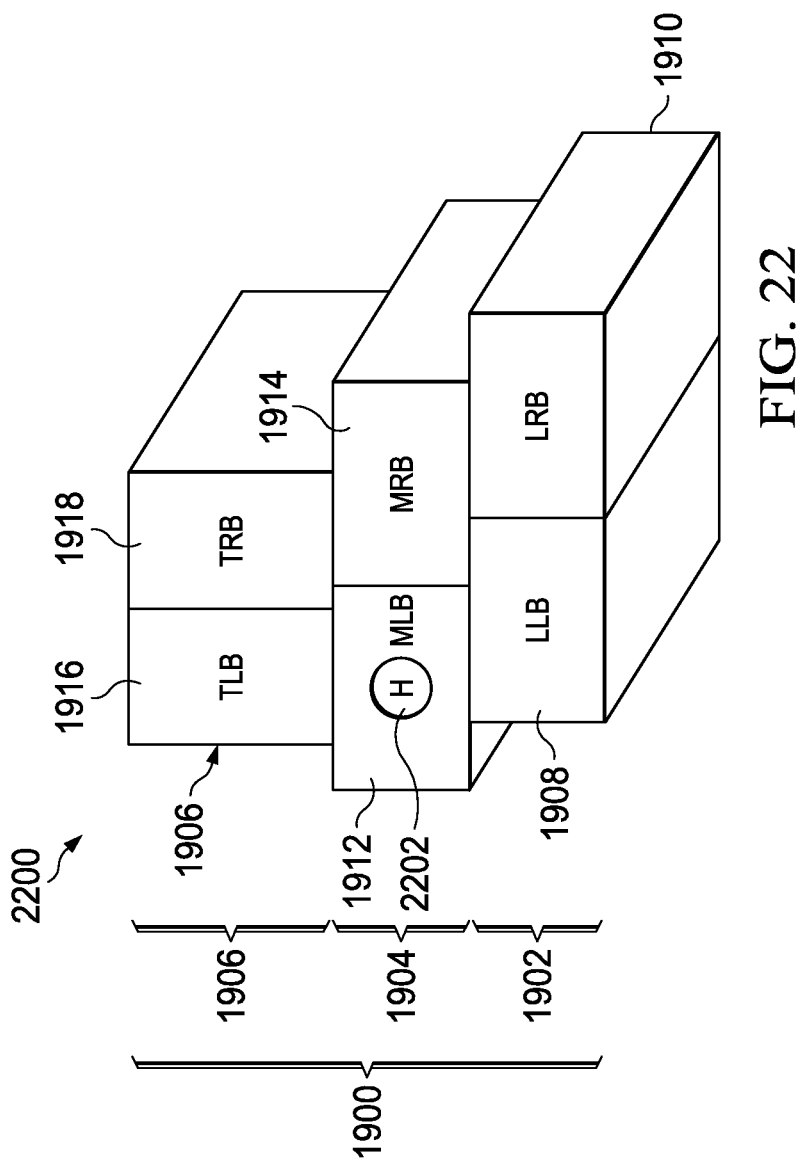
FIG. 22 is an illustration of a variant of a six-brick assembly in accordance with an illustrative embodiment.

FIG. 22 is an illustration of a variant of a six-brick assembly depicted in accordance with an illustrative embodiment. In FIG. 22, variant 2200 of six-brick assembly 1900 may be depicted. Variant 2200 of six-brick assembly 1900 in FIG. 22 may differ from six-brick assembly 1900 in FIG. 19 by having hole 2202 in brick 1912 in middle two-brick assembly 1904.

Figure 23:
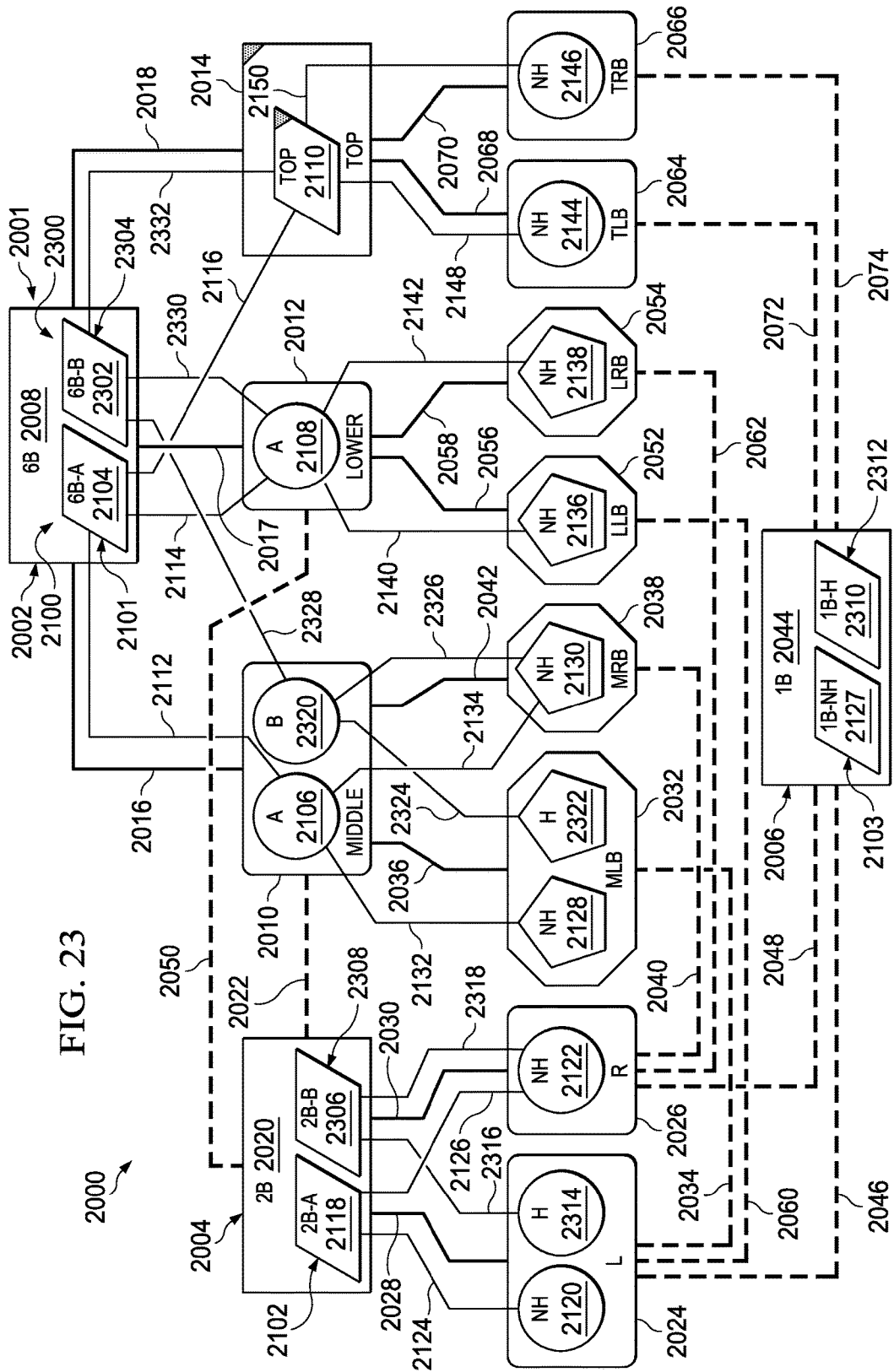
FIG. 23 is an illustration of a model representing two variants of a six-brick assembly in accordance with an illustrative embodiment.

FIG. 23 is an illustration of a model representing two variants of a six-brick assembly depicted in accordance with an illustrative embodiment. In this illustrative example, a representation of variant 2200 of six-brick assembly 1900 in FIG. 22 may be added to model 2000. In this manner, model 2000 in FIG. 23 may represent two variants of six-brick assembly 1900.

In particular, secondary hierarchical organization 2300 may be added to model 2000. The objects that form secondary hierarchical organization 2300 may be domain configuration objects. Adding an additional secondary hierarchical organization, such as secondary hierarchical organization 2300, to model 2000 after an initial secondary hierarchical organization, such as secondary hierarchical organization 2100, has already been created may not require adding an additional configuration object to each master object in primary hierarchical organization 2001.

Instead, secondary hierarchical organization 2300 may be created such that secondary hierarchical organization 2300 shares a number of configuration objects with secondary hierarchical organization 2100. Thus, data storage space and processing power used in representing both secondary hierarchical organization 2300 and primary hierarchical organization 2001 may be conserved.

In this illustrative example, adding a representation of variant 2200 of six-brick assembly 1900 in FIG. 22 to model 2000 may include adding reusable definition configuration object 2302 to reusable definition object 2008 to represent variant 2200 of six-brick assembly 1900 having hole 2202 in FIG. 22. Reusable definition configuration object 2302 may be the root object of main structure 2304 for secondary hierarchical organization 2300.

Adding a representation of variant 2200 of six-brick assembly 1900 to model 2000 may also include adding reusable definition configuration object 2306 to reusable definition object 2020 to represent hole 2202 in middle two-brick assembly 1904. Reusable definition configuration object 2306 may be the root object of instantiated structure 2308 for secondary hierarchical organization 2300.

Further, adding a representation of variant 2200 of six-brick assembly 1900 to model 2000 may include adding reusable definition configuration object 2310 to reusable definition object 2044 to represent hole 2202 in brick 1912 in FIG. 22. Reusable definition configuration object 2310 may be the root object of instantiated structure 2312 for secondary hierarchical organization 2300. Instantiated structure 2312 may only comprise reusable definition configuration object 2310.

Usage configuration object 2314 may be an instantiation of reusable definition configuration object 2310. In FIG. 23, secondary instance links present in model 2000 may not be shown. Usage configuration object 2314 may be added to usage object 2024 as the child object of reusable definition configuration object 2306, as indicated by secondary structural link 2316.

Further, secondary structural link 2318 may indicate that reusable definition configuration object 2306 shares usage configuration object 2122 with reusable definition configuration object 2118 as a child object as indicated by secondary structural link 2126. In this manner, instantiated structure 2308 may comprise reusable definition configuration object 2306, usage configuration object 2314, and usage configuration object 2122.

Usage configuration object 2320 may be added to usage object 2010 as an instantiation of reusable definition configuration object 2306. When usage configuration object 2320 is created, occurrence configuration object 2322 may be added to occurrence object 2032 as an instantiation of usage configuration object 2314.

Usage configuration object 2320 may be the parent object of occurrence configuration object 2322, as indicated by secondary structural link 2324. Further, secondary structural link 2326 may indicate that usage configuration object 2320 shares occurrence configuration object 2130 with usage configuration object 2106 as a child object.

Usage configuration object 2320 may be the child object of reusable definition configuration object 2302, as indicated by secondary structural link 2328. Further, reusable definition configuration object 2302 may share usage configuration object 2108 and in-place definition configuration object 2110 with reusable definition configuration object 2104 as child objects, as indicated by secondary structural link 2330 and secondary structural link 2332, respectively.

In this manner, main structure 2304 may comprise reusable definition configuration object 2302, usage configuration object 2320, usage configuration object 2108, in-place definition configuration object 2110, occurrence configuration object 2128, occurrence configuration object 2322, occurrence configuration object 2130, occurrence configuration object 2136, occurrence configuration object 2138, usage configuration object 2144, and usage configuration object 2146. Hole 2202 in brick 1912 of middle two-brick assembly 1904 in six-brick assembly 1900 may be represented by occurrence configuration object 2322 in main structure 2304.

The illustrations of six-brick assembly 1900 in FIG. 19, variant 2200 of six-brick assembly 1900 in FIG. 22, and model 2000 in FIGS. 20, 21, and 23 are not meant to imply physical or architectural limitations to the manner in which an illustrative embodiment may be implemented. Other components in addition to or in place of the ones illustrated may be used. Some components may be optional.

Figure 24:
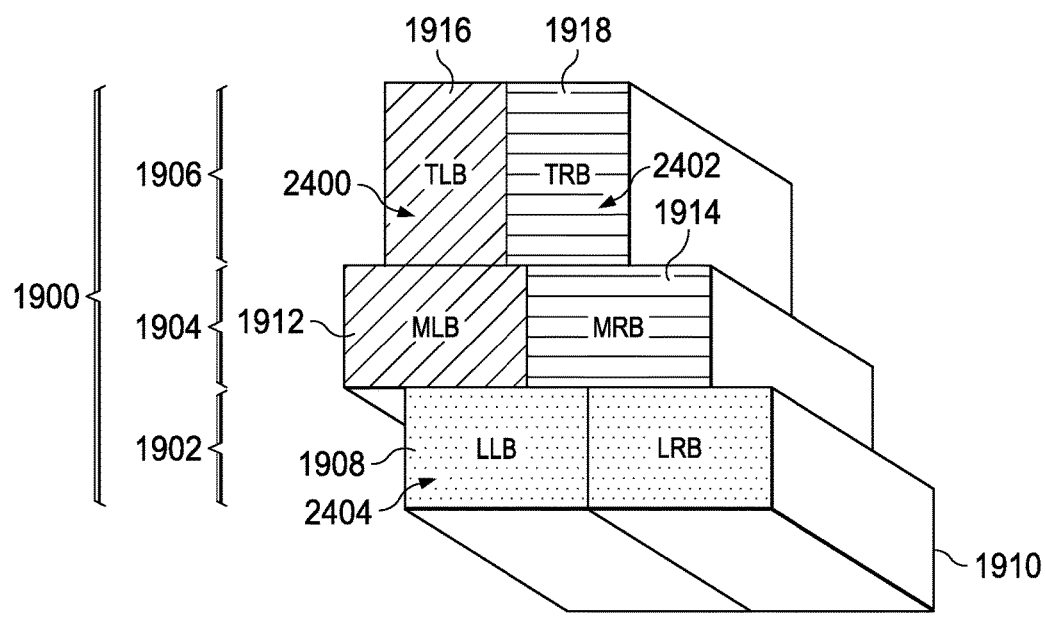
FIG. 24 is an illustration of a breakdown of sequences for assembly a six-brick assembly in accordance with an illustrative embodiment.

FIG. 24 is an illustration of a breakdown of sequences for assembly a six-brick assembly depicted in accordance with an illustrative embodiment. As depicted, six-brick assembly 1900 may be manufactured using sequence 2400, sequence 2402, and sequence 2404. These sequences may be manufacturing sequences. Sequence 2400 may comprise the assembly of brick 1912 and brick 1916. Sequence 2402 may comprise the assembly of brick 1914 and brick 1918. Further, sequence 2404 may comprise the sequence of brick 1908 and brick 1910.

FIG. 25 is an illustration of a mapping between models for two domains depicted in accordance with an illustrative embodiment. As depicted, model 2000 from FIG. 20 is a model for six-brick assembly 1900 created with respect to geometric domain 2500 for six-brick assembly 1900. In FIG. 25, model 2501 is a model for six-brick assembly 1900 created with respect to manufacturing domain 2502. Model 2501 is another example of one implementation for model 114 in FIG. 1. The objects in model 2501 are domain master objects.

Manufacturing domain 2502 and geometric domain 2500 are examples of domains that may be included in group of domains 117 in FIG. 1. Definition objects within model 2000 may represent parts and assemblies of parts for six-brick assembly 1900 in FIG. 19. Further, definition objects within model 2501 may represent the manufacturing sequences used to form assemblies of parts to form six-brick assembly 1900 in FIG. 24. In FIG. 25, one or more structural links and instance links in model 2000 and model 2501 are not shown.

Models for different domains may be mapped across these domains in some cases. For example, model 2501 may be mapped to model 2000. Boundary 2503 may indicate the boundary between geometric domain 2500 and manufacturing domain 2502. Model 2501 may comprise primary hierarchical organization 2504. Primary hierarchical organization 2504 comprises main structure 2506, instantiated structure 2508, and instantiated structure 2510.

As depicted, reusable definition object 2512 is the root object of main structure 2506. Reusable definition object 2512 may represent the overall manufacturing sequence used to form six-brick assembly 1900 in FIG. 19. Reusable definition object 2512 in model 2501 may map to reusable definition object 2008 in model 2000 as indicated by mapping link 2514.

As used herein, a "mapping link" is a link between two objects in two different models. A mapping link maps an object in one model to an object in another model. Typically, a mapping link maps two objects that are of the same type. For example, a mapping link may map a reusable definition object to a reusable definition object, an occurrence object to an occurrence object, and a usage object to a usage object.

Being in manufacturing domain 2502, reusable definition object 2512 may also be referred to as a reusable sequence definition object. Being in geometric domain 2500, reusable definition object 2008 may be referred to as a reusable part definition object. Consequently, the mapping between these two definition objects may indicate that the sequence represented by the reusable sequence definition object is used to form the part represented by the reusable part definition object.

Further, usage object 2516, usage object 2518, and usage object 2520 may be the child objects of reusable definition object 2512, as indicated by primary structural link 2522, primary structural link 2524, and primary structural link 2526, respectively. In this illustrative example, usage object 2516 may represent sequence 2404 in FIG. 24. Usage object 2518 may represent sequence 2400 in FIG. 24 and usage object 2520 may represent sequence 2402 in FIG. 24.

Usage object 2516 in model 2501 may map to usage object 2012 in model 2000 as indicated by mapping link 2528. In other words, sequence 2404 represented by usage object 2516 may be used to form lower two brick-assembly 1902 represented by usage object 2012.

Usage object 2516 may be an instantiation of reusable definition object 2530, as indicated by primary instance link 2532. Reusable definition object 2530 may be the root object of instantiated structure 2508. In this illustrative example, reusable definition object 2530 may represent a manufacturing sequence for assembling a left brick and a right brick to form a two-brick assembly. Reusable definition object 2530 in model 2501 may map to reusable definition object 2020 in model 2000, as indicated by mapping link 2531.

Further, usage object 2534 and usage object 2536 may be the child objects of reusable definition object 2530, as indicated by primary structural link 2538 and primary structural link 2540, respectively. Usage object 2534 and usage object 2536 in model 2501 may map to usage object 2024 and usage object 2026, respectively, in model 2000, as indicated by mapping link 2542 and mapping link 2544, respectively. In this manner, instantiated structure 2508 in model 2501 may map to instantiated structure 2004 in model 2000 indicating that the sequence represented by reusable definition object 2530 in model 2501 may be used to form the two-brick assembly represented by reusable definition object 2020 in model 2000.

Further, usage object 2024 and usage object 2026 may be instantiations of reusable definition object 2044 from model 2000. In this manner, reusable definition object 2044 representing a single brick may be used in more than one model for more than one domain. In particular, reusable definition object 2044 used in model 2000 for geometric domain 2500 may be also used in model 2501 for manufacturing domain 2502 even though reusable definition object 2044 is depicted on the side of boundary 2503 for geometric domain 2500.

In this illustrative example, usage object 2518 and usage object 2520 may be instantiations of reusable definition object 2546, as indicated by primary instance link 2545 and primary instance link 2547, respectively. Reusable definition object 2546 may represent a sequence for assembling a vertical brick and a horizontal brick to form a two-brick assembly.

Usage object 2548 and usage object 2550 may be the child objects of reusable definition object 2546, as indicated by primary structural link 2552 and primary structural link 2554, respectively. Usage object 2548 and usage object 2550 may be instantiations of reusable definition object 2044, as indicated by primary instance link 2556 and primary instance link 2558, respectively.

Occurrence object 2560 and occurrence object 2562 may be the child objects of usage object 2518, as indicated by primary structural link 2564 and primary structural link 2566, respectively. In particular, occurrence object 2560 and occurrence object 2562 may be instantiations of usage object 2548 and usage object 2550, respectively.

Additionally, occurrence object 2568 and occurrence object 2570 may be the child objects of usage object 2520, as indicated by primary structural link 2572 and 2574, respectively. In particular, occurrence object 2568 and occurrence object 2570 may be instantiations of usage object 2548 and usage object 2550, respectively.

In this illustrative example, occurrence object 2560 may map to usage object 2064 as indicated by mapping link 2576, while occurrence object 2562 may map to occurrence object 2032 as indicated by mapping link 2578. In this manner, the sequence represented by usage object 2518 may be the sequence used to assemble brick 1916 represented by usage object 2064 and brick 1912 represented by occurrence object 2032 together.

Similarly, occurrence object 2568 may map to usage object 2066 as indicated by mapping link 2580, while occurrence object 2570 may map to usage object 2038 as indicated by mapping link 2582. In this manner, the sequence represented by usage object 2520 may be the sequence used to assemble brick 1918 represented by usage object 2066 and brick 1914 represented by usage object 2038.

Figure 26:
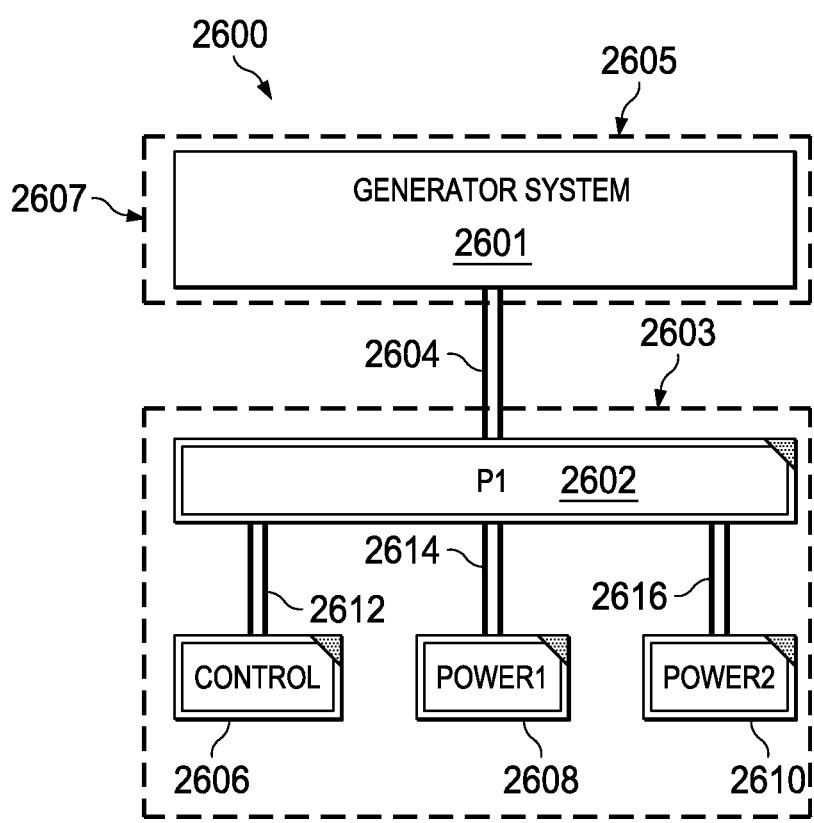
FIG. 26 is an illustration of a model for a generator system in accordance with an illustrative embodiment.

FIG. 26 is an illustration of a model for a generator system depicted in accordance with an illustrative embodiment. In this illustrative example, model 2600 may be a model of the product structure for a generator system. Model 2600 may be an example of one implementation for model 114 in FIG. 1. Model 2600 includes reusable definition object 2601.

Reusable definition object 2601 may represent the generator system. Reusable definition object 2601 may be the root object of main structure 2607 of primary hierarchical organization 2605 for model 2600.

In-place port definition object 2602 may be a child object of reusable definition object 2601, as indicated by primary port structural link 2604. In-place port definition object 2602 may represent a physical port on the generator system represented by reusable definition object 2601. In this illustrative example, in-place port definition object 2602 may belong to interface category 1200 in FIG. 12. In other words, in-place port definition object 2602 may not be connectable to another port master object.

As used herein, a "port structural link" may be a link between a port object and another object in a model. A "primary port structural link" may be a link between a port master object and another port master object or a different master object in the model.

Although in-place port definition object 2602 is connected to reusable definition object 2601, in-place port definition object 2602 may not be considered part of primary hierarchical organization 2605. In-place port definition object 2606, in-place port definition object 2608, and in-place port definition object 2610 may be child objects of in-place port definition object 2602, as indicated by primary port structural link 2612, primary port structural link 2614, and primary port structural link 2616, respectively.

Consequently, in-place port definition object 2606, in-place port definition object 2608, and in-place port definition object 2610 also belong to interface category 1200 in FIG. 12. In this manner, these in-place port definition objects may not be connectable to other port master objects.

In this illustrative example, in-place port definition object 2606, in-place port definition object 2608, and in-place port definition object 2610 may represent a control port, a first power port, and a second power port, respectively, on the generator system represented by reusable definition object 2601. These ports may be physical ports or physical connection points on the generator system.

In-place port definition object 2602, in-place port definition object 2606, in-place port definition object 2608, and in-place port definition object 2610 may form port substructure 2603 in model 2600. Port substructure 2603 may be considered connected to but not part of primary hierarchical organization 2605.

Figure 27:
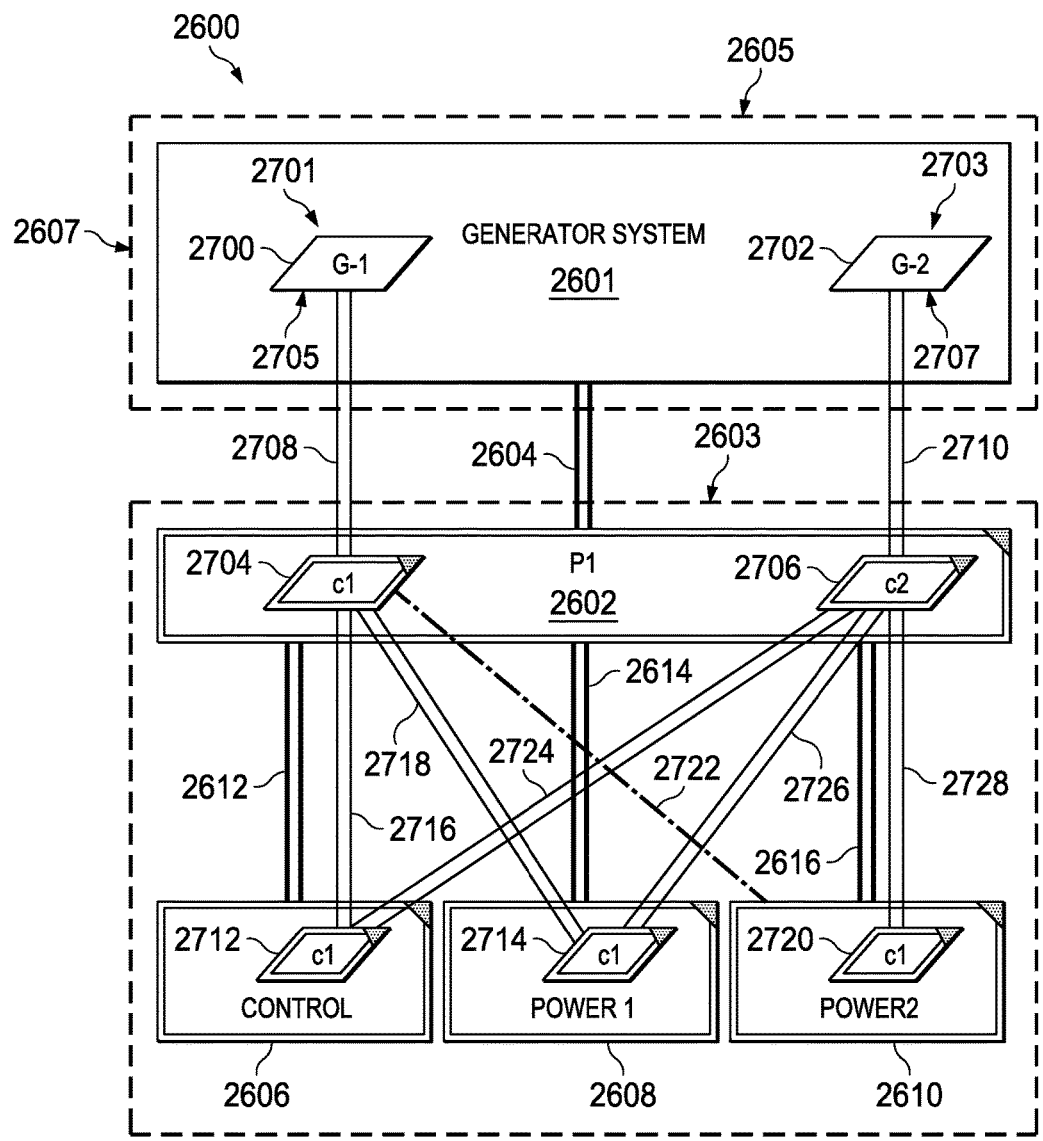
FIG. 27 is another illustration of a model for a generator system in accordance with an illustrative embodiment.

FIG. 27 is an illustration of a model for a generator system depicted in accordance with an illustrative embodiment. In this illustrative example, secondary hierarchical organization 2701 and secondary hierarchical organization 2703 have been added to model 2600 from FIG. 26. Reusable definition configuration object 2700 may be the root object of main structure 2705 of secondary hierarchical organization 2701. Reusable definition configuration object 2702 may be the root object of main structure 2707 of secondary hierarchical organization 2703.

Reusable definition configuration object 2700 and reusable definition configuration object 2702 may correspond to reusable definition object 2601. In particular, reusable definition configuration object 2700 and reusable definition configuration object 2702 may each represent a particular configuration for the generator system represented by reusable definition object 2601.

In-place port definition configuration object 2704 and in-place port definition configuration object 2706 may correspond to in-place port definition object 2602. Each of these port configuration objects may represent a particular configuration for the port represented by in-place port definition object 2602.

In-place port definition configuration object 2704 and in-place port definition configuration object 2706 may be the child objects of reusable definition configuration object 2700 and reusable definition configuration object 2702, respectively, as indicated by secondary port structural link 2708 and secondary port structural link 2710, respectively. As used herein, a "secondary port structural link" may be a link between a port configuration object and another port configuration object or a different configuration object in a model.

In-place port definition configuration object 2712 may correspond to in-place port definition object 2606. In-place port definition configuration object 2714 may correspond to in-place port definition object 2608. In-place port definition configuration object 2712 and in-place port definition configuration object 2714 may be the child objects of in-place port definition configuration object 2704, as indicated by secondary port structural link 2716 and secondary port structural link 2718, respectively.

Further, in-place port definition configuration object 2720 may correspond to in-place port definition object 2610. Exclusion link 2722 indicates that in-place port definition configuration object 2704 may not include any configuration of in-place port definition object 2610.

In-place port definition configuration object 2712, in-place port definition configuration object 2714, and in-place port definition configuration object 2720 may all be child objects of in-place port definition object 2706, as indicated by secondary port structural link 2724, secondary port structural link 2726, and secondary port structural link 2728, respectively. In this manner, the configuration for the port represented by in-place port definition object 2704 may only include the control port and the first power port. However, the configuration for the port represented by in-place port definition configuration object 2706 may include the control port, the first power port, and the second power port.

Figure 28:
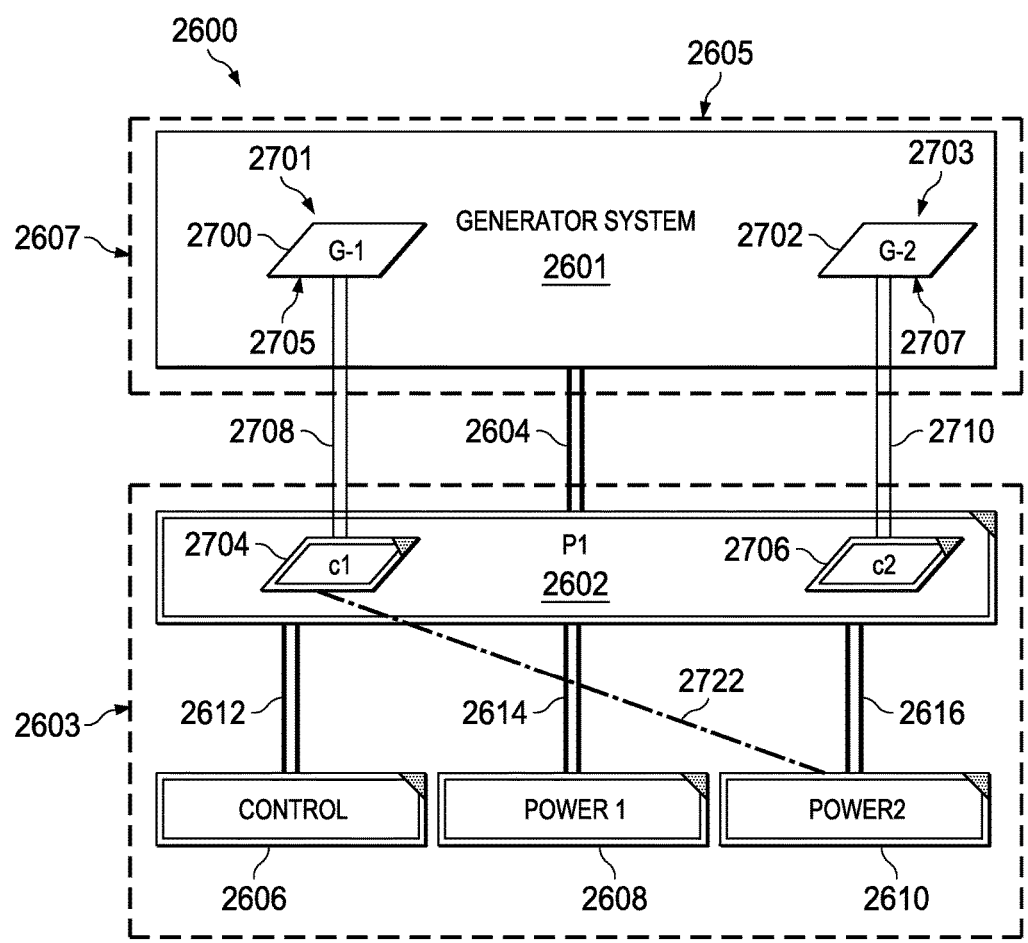
FIG. 28 is another illustration of a model for a generator system in accordance with an illustrative embodiment.

FIG. 28 is another illustration of a model for a generator system depicted in accordance with an illustrative embodiment. In this illustrative example, model 2600 from FIG. 27 is shown in a simplified manner. In particular, secondary port structural link 2716, secondary port structural link 2718, and secondary port structural link 2724, secondary port structural link 2726, and secondary port structural link 2728 have been excluded.

Since the configuration represented by in-place port definition configuration object 2706 includes all ports represented by in-place port definition object 2606, in-place port definition object 2608, and in-place port definition object 2610, the corresponding secondary port structural links have been omitted. Since the configuration represented by in-place port definition configuration object 2706 excludes only the port represented by in-place port definition object 2610, exclusion link 2722 has been used to indicate this exclusion and the corresponding secondary port structural links for the other ports have been omitted. Omitting these different secondary port structural links may simplify the depiction of model 2600.

Figure 29:
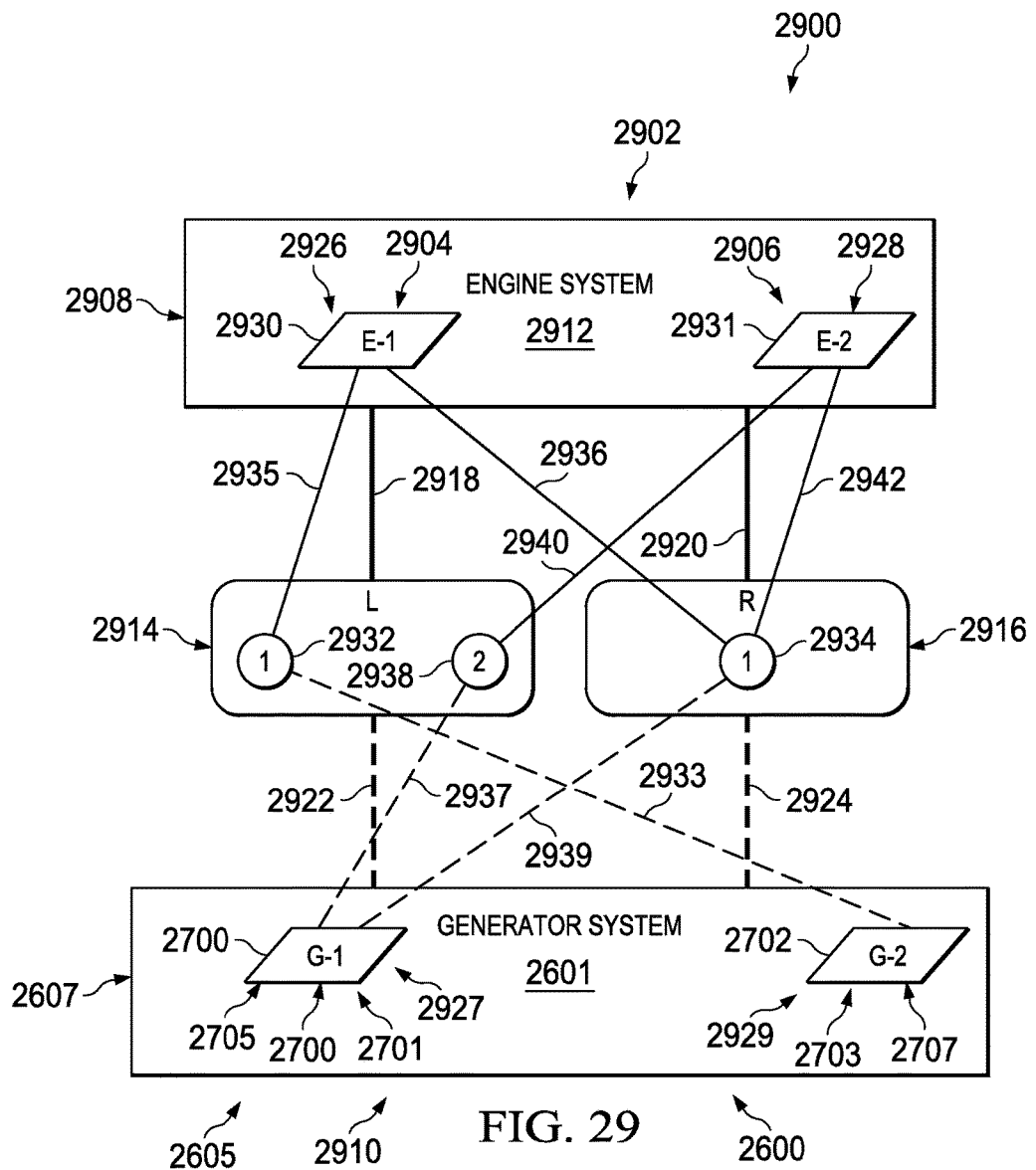
FIG. 29 is an illustration of a model for an engine system in accordance with an illustrative embodiment.

FIG. 29 is an illustration of a model for an engine system depicted in accordance with an illustrative embodiment. In this illustrative example, model 2900 may be a model of the product structure for an engine system. In particular, model 2900 may be a simplified model in which a number of links and objects have been omitted. Model 2900 may be an example of one implementation for model 114 in FIG. 1.

As depicted, model 2900 may comprise primary hierarchical organization 2902, secondary hierarchical organization 2904, and secondary hierarchical organization 2906. Primary hierarchical organization 2902 may comprise main structure 2908 and instantiated structure 2910. In this illustrative example, instantiated structure 2910 may be main structure 2607 of primary hierarchical organization 2605 from model 2600 in FIG. 28.

Reusable definition object 2912 may be the root object of main structure 2908 of primary hierarchical organization 2902. Reusable definition object 2912 may represent an engine system. Usage object 2914 and usage object 2916 may be the child objects of reusable definition object 2912, as indicated by primary structural link 2918 and primary structural link 2920, respectively.

Both usage object 2914 and usage object 2916 may be instantiations of reusable definition object 2601, as indicated by primary instance link 2922 and primary instance link 2924, respectively. In particular, usage object 2914 may represent a left generator system for the engine system and usage object 2916 may represent a right generator system for the engine system.

Secondary hierarchical organization 2904 may include main structure 2926 and secondary instantiated structure 2927. Secondary instantiated structure 2927 may be main structure 2705 of secondary hierarchical organization 2701. Further, secondary hierarchical organization 2904 may include main structure 2928 and secondary instantiated structure 2929. Secondary instantiated structure 2929 may be main structure 2707 of secondary hierarchical organization 2703.

Reusable definition configuration object 2930 may be the root object of secondary hierarchical organization 2904. Usage configuration object 2932 and usage configuration object 2934 may be the child objects of reusable definition configuration object 2930, as indicated by secondary structural link 2935 and secondary structural link 2936, respectively.

Usage configuration object 2932 may be an instantiation of reusable definition configuration object 2702, as indicated by secondary instance link 2933. Usage configuration object 2934 may be an instantiation of reusable definition configuration object 2700, as indicated by secondary instance link 2939.

Reusable definition configuration object 2931 may be the root object of secondary hierarchical organization 2904. Usage configuration object 2938 and usage configuration object 2934 may be the child objects of reusable definition configuration object 2931, as indicated by secondary structural link 2940 and secondary structural link 2942, respectively. Usage configuration object 2938 may be an instantiation of reusable definition configuration object 2700, as indicated by secondary instance link 2937.

Figure 30:
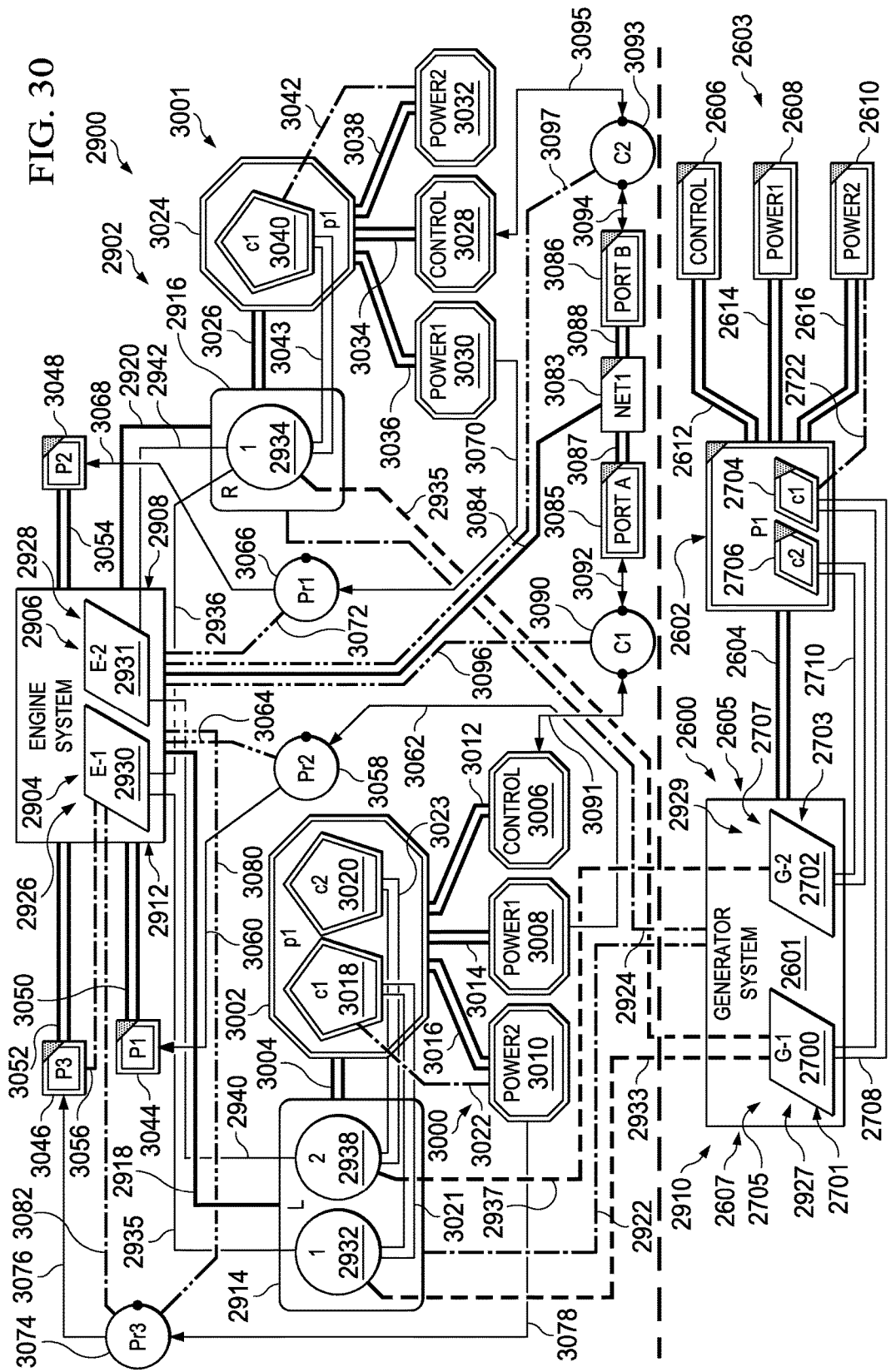
FIG. 30 is an illustration of a more detailed model of an engine system in accordance with an illustrative embodiment.

FIG. 30 is an illustration of a more detailed model of an engine system depicted in accordance with an illustrative embodiment. In FIG. 30, model 2900 is depicted in greater detail as compared to model 2900 in FIG. 29. In this illustrative example, port substructure 3000 may be connected to usage object 2914 in main structure 2908 of primary hierarchical organization 2902. Further, port substructure 3001 may be connected to usage object 2916 in main structure 2908 of primary hierarchical organization 2902.

However, neither port substructure 3000 nor port substructure 3001 may be considered part of primary hierarchical organization 2902. Port substructure 3000 and port substructure 3001 may be instantiations of port substructure 2603 connected to main structure 2607 in primary hierarchical organization 2605.

In this illustrative example, each of the port master objects in port substructure 3000 and port substructure 3001 may belong to connectable category 1300 in FIG. 13. In other words, each of the port master objects in port substructure 3000 and port substructure 3001 may be connectable to another port master object.

Port substructure 3000 may include port occurrence object 3002, port occurrence object 3006, port occurrence object 3008, and port occurrence object 3010. Port occurrence object 3002 may be a child object of usage object 2914, as indicated by primary port structural link 3004. Port occurrence object 3002 may be an instantiation of in-place port definition object 2602. A primary port instance link indicating this relationship is omitted in this example.

Further, port occurrence object 3006, port occurrence object 3008, and port occurrence object 3010 may be child objects of port occurrence object 3002, as indicated by primary port structural link 3012, primary port structural link 3014, and primary port structural link 3016. Port occurrence object 3006, port occurrence object 3008, and port occurrence object 3010 may be instantiations of in-place port definition object 2606, in-place port definition object 2608, and in-place port definition object 2610, respectively. Primary port instance links indicating these relationships have been omitted in this example.

In this illustrative example, port occurrence configuration object 3018 and port occurrence configuration object 3020 may correspond to port occurrence object 3002. Port occurrence configuration object 3018 and port occurrence configuration object 3020 may be instantiations of in-place port definition configuration object 2704 and in-place port definition configuration object 2706, respectively. The secondary port instance links indicating these relationships have been omitted.

Port occurrence configuration object 3018 and port occurrence configuration object 3020 may be child objects of usage configuration object 2932 and usage configuration object 2938, respectively, as indicated by secondary port structural link 3021 and secondary port structural link 3023, respectively. Exclusion link 3022 may indicate that the configuration represented by port occurrence configuration object 3018 does not include the port represented by port occurrence object 3010.

Port substructure 3001 may include port occurrence object 3024, port occurrence object 3028, port occurrence object 3030, and port occurrence object 3032. Port occurrence object 3024 may be a child object of usage object 2916, as indicated by primary port structural link 3026. Port occurrence object 3024 may be an instantiation of in-place port definition object 2602. A primary port instance link indicating this relationship is omitted in this example.

Further, port occurrence object 3028, port occurrence object 3030, and port occurrence object 3032 may be child objects of port occurrence object 3024, as indicated by primary port structural link 3034, primary port structural link 3036, and primary port structural link 3038. Port occurrence object 3028, port occurrence object 3030, and port occurrence object 3032 may be instantiations of in-place port definition object 2606, in-place port definition object 2608, and in-place port definition object 2610, respectively. Primary port instance links indicating these relationships have been omitted in this example.

In this illustrative example, port occurrence configuration object 3040 may correspond to port occurrence object 3024. Port occurrence configuration object 3040 may be an instantiation of in-place port definition configuration object 2704. The secondary port instance links indicating this relationship has been omitted.

Port occurrence configuration object 3040 may be a child object of usage configuration object 2934, as indicated by secondary port structural link 3043. Exclusion link 3042 may indicate that the configuration represented by port occurrence configuration object 3040 does not include the port represented by port occurrence object 3032.

Additionally, in this illustrative example, in-place port definition object 3044, in-place port definition object 3046, and in-place port definition object 3048 may be child objects of reusable definition object 2912, as indicated by primary port structural link 3050, primary port structural link 3052, and primary port structural link 3054, respectively. However, in-place port definition object 3044, in-place port definition object 3046, and in-place port definition object 3048 may not be considered part of primary hierarchical organization 2902.

In-place port definition object 3044, in-place port definition object 3046, and in-place port definition object 3048 may belong to interface category 1200 in FIG. 12. In other words, these in-place port definition configuration objects may not be connectable to other port master objects and may need to be implemented by connectable port master objects.

Exclusion link 3056 may indicate that the configuration for the engine system represented by reusable definition configuration object 2930 does not include the port represented by in-place port definition object 3046. However, the configuration for the engine system represented by reusable definition configuration object 2931 may include all three ports represented by in-place port definition object 3044, in-place port definition object 3046, and in-place port definition object 3048.

In this illustrative example, promotion object 3058 may be used to indicate that the port represented by port occurrence object 3008 is used to implement the role of the port represented by in-place port definition object 3044. In other words, promotion object 3058 may promote a connectable port object to the role of an interface port object.

In particular, promotion link 3060 between promotion object 3058 and in-place port definition object 3044 may indicate than an object is promoted to the role of in-place port definition object 3044 by promotion object 3058. Further, promotion link 3062 between promotion object 3058 and port occurrence object 3008 may indicate that port occurrence object 3008 is the object that is promoted to the role of in-place port definition object 3044.

Promotion object 3058 may be a child object of reusable definition object 2912, as indicated by auxiliary structural link 3064. As used herein, an "auxiliary structural link" may be a link between an auxiliary object and a domain object. However, promotion object 3058 may not be considered part of primary hierarchical organization 2902.

In a similar manner, promotion object 3066 may be used to indicate that the port represented by port occurrence object 3030 is used to implement the role of the port represented by in-place port definition object 3048. Promotion link 3068 may indicate that a connectable port object is being promoted to the role of in-place port definition object 3048. Further, promotion link 3070 may indicate that port occurrence object 3030 is the connectable port object being promoted.

Further, promotion object 3066 may also be a child object of reusable definition object 2912, as indicated by auxiliary structural link 3072. However, promotion object 3066 may not be considered part of primary hierarchical organization 2902.

Further, promotion object 3074 may be used to indicate that the port represented by port occurrence object 3010 is used to implement the role of the port represented by in-place port definition object 3046. Promotion link 3076 may indicate that a connectable port object is being promoted to the role of in-place port definition object 3046. Further, promotion link 3078 may indicate that port occurrence object 3010 is the connectable port object being promoted.

Promotion object 3074 may also be a child object of reusable definition object 2912, as indicated by auxiliary structural link 3080. However, promotion object 3074 may not be considered part of primary hierarchical organization 2902. Further, exclusion link 3082 may indicate that reusable definition configuration object 2930 does not include promotion object 3074 as a child object.

In this illustrative example, in-place definition object 3083 may be a child object of reusable definition object 2912, as indicated by primary structural link 3084. In-place definition object 3083 may be considered part of primary hierarchical organization 2902 in this example.

In-place definition object 3083 may represent a connection member such as, for example, without limitation, a net, a wire, a tube, a logical transport net, or some other type of physical or logical connection member having two ends. Each of these ends may be considered a connection point, or a port.

In this manner, in-place definition object 3083 may have in-place port definition object 3085 and in-place port definition object 3086 as child objects, as indicated by primary port structural link 3087 and primary port structural link 3088, respectively. In-place port definition object 3085 and in-place port definition object 3086 may not be considered part of primary hierarchical organization 2902. In-place port definition object 3085 and in-place port definition object 3086 may belong to connectable category 1300 in FIG. 13.

As depicted, connection object 3090 and connection object 3093 may be child objects of reusable definition object 2912, as indicated by auxiliary structural link 3096 and auxiliary structural link 3097, respectively. However, these connection objects may not be considered part of primary hierarchical organization 2902.

Connection object 3090 along with connection link 3091 and connection link 3092 may be used to indicate that the port represented by in-place port definition object 3085 may be connected to the port represented by port occurrence object 3006. Further, connection object 3093 along with connection link 3094 and connection link 3095 may be used to indicate that the port represented by in-place port definition object 3086 may be connected to the port represented by port occurrence object 3028.

Figure 31:
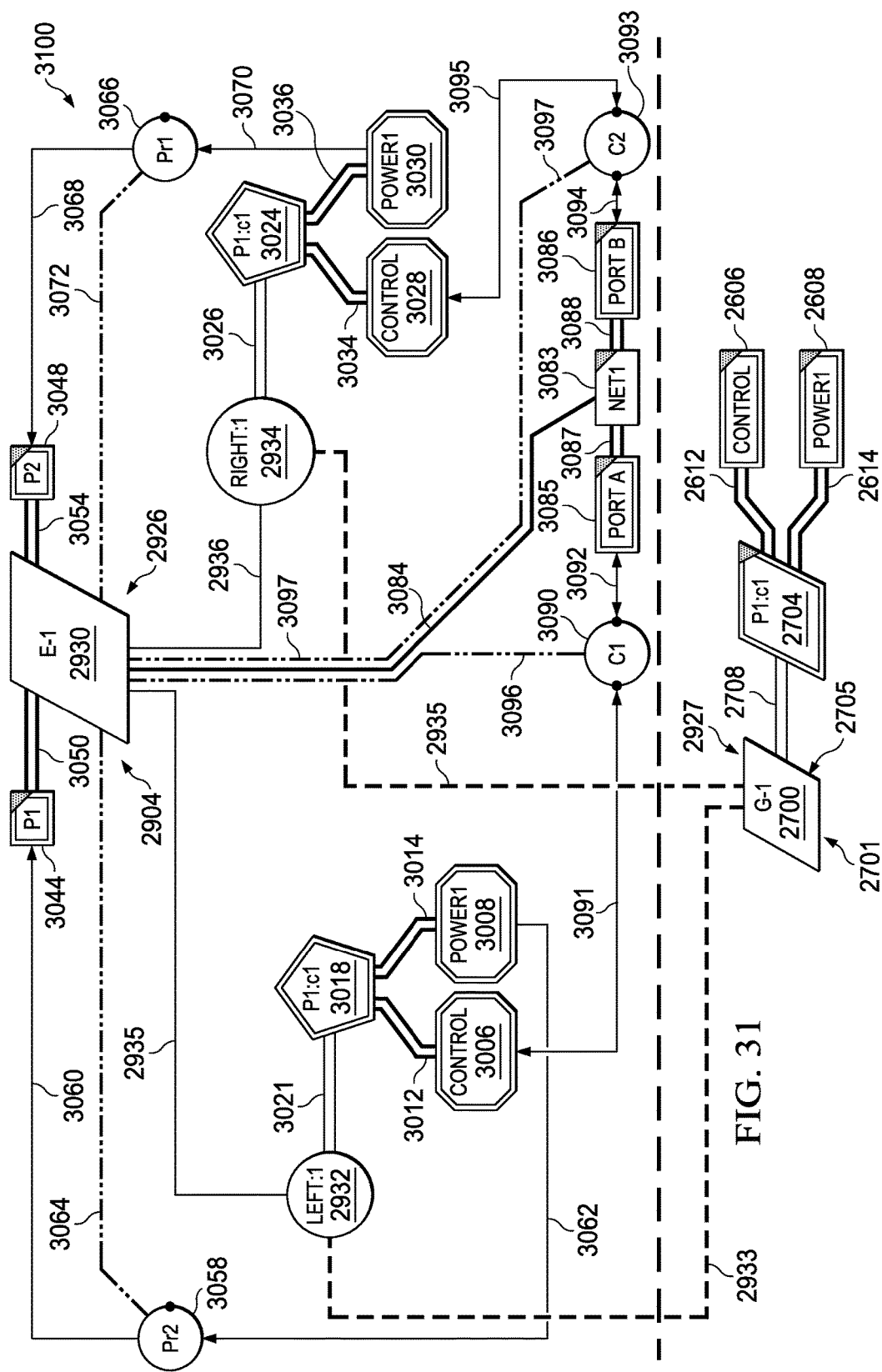
FIG. 31 is an illustration of a projection of a configuration for an engine system in accordance with an illustrative embodiment.

FIG. 31 is an illustration of a projection of a configuration for an engine system depicted in accordance with an illustrative embodiment. In this illustrative example, projection 3100 may be a projection of the configuration for the engine system represented by reusable definition configuration object 2930. As depicted, secondary hierarchical organization 2906 is depicted along with the various auxiliary objects that are part of the configuration.

Figure 32:
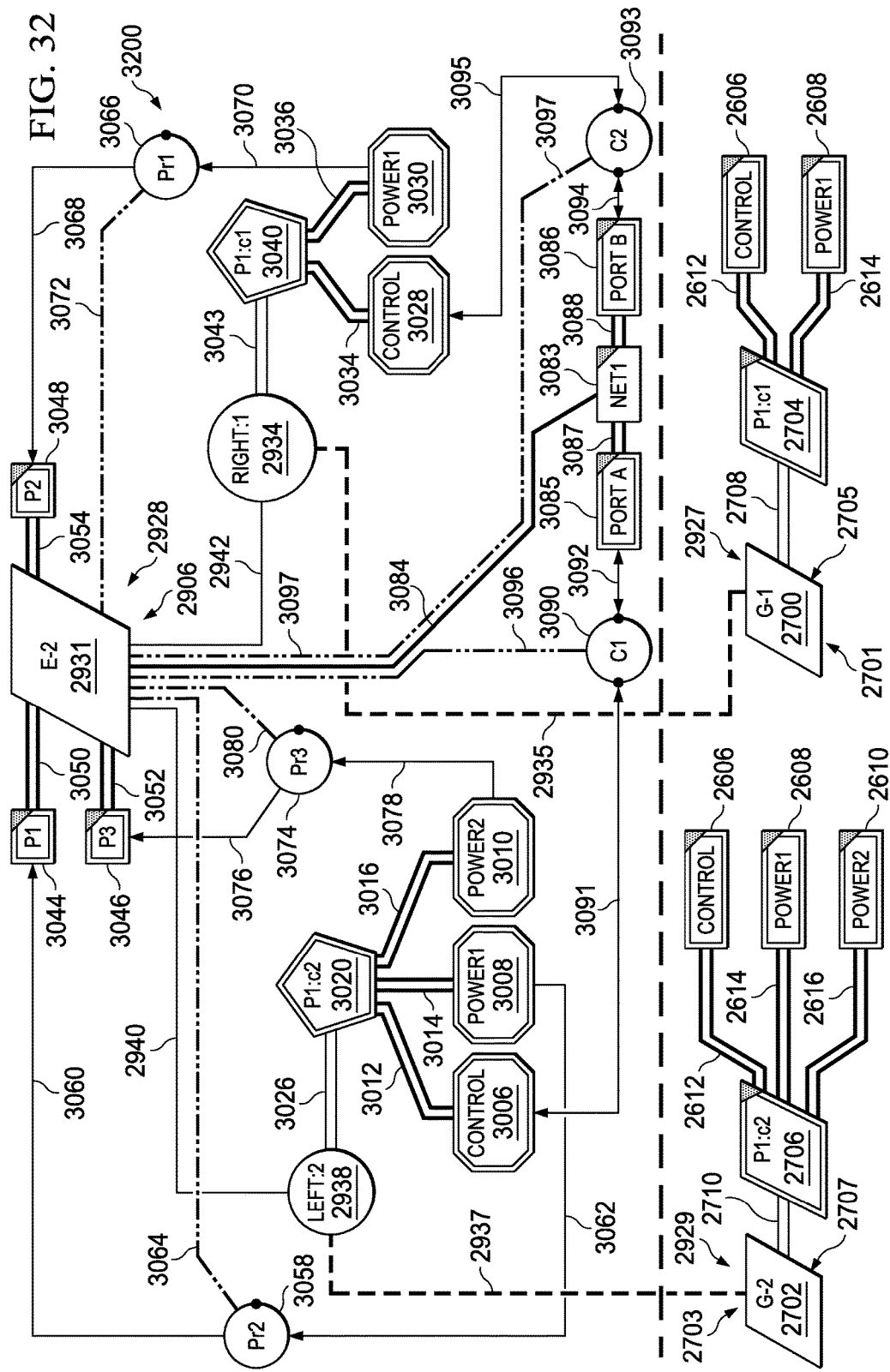
FIG. 32 is an illustration of a projection of a configuration for an engine system in accordance with an illustrative embodiment.

FIG. 32 is an illustration of a projection of a configuration for an engine system depicted in accordance with an illustrative embodiment. In this illustrative example, projection 3200 may be a projection of the configuration for the engine system represented by reusable definition configuration object 2931. As depicted, secondary hierarchical organization 2906 is depicted along with the various auxiliary objects that are part of the configuration.

The illustrations of model 1703 in FIGS. 17-18, six-brick assembly 1900 in FIGS. 19, 22, and 24, model 2000 in FIGS. 20, 21, 23, and 25, model 2501 in FIG. 25, model 2600 in FIGS. 26-28, model 2900 in FIGS. 29-30, projection 3100 in FIG. 31, and projection 3200 in FIG. 32 are not meant to imply physical or architectural limitations to the manner in which an illustrative embodiment may be implemented. Other components in addition to or in place of the ones illustrated may be used. Some components may be optional.

Figure 33:
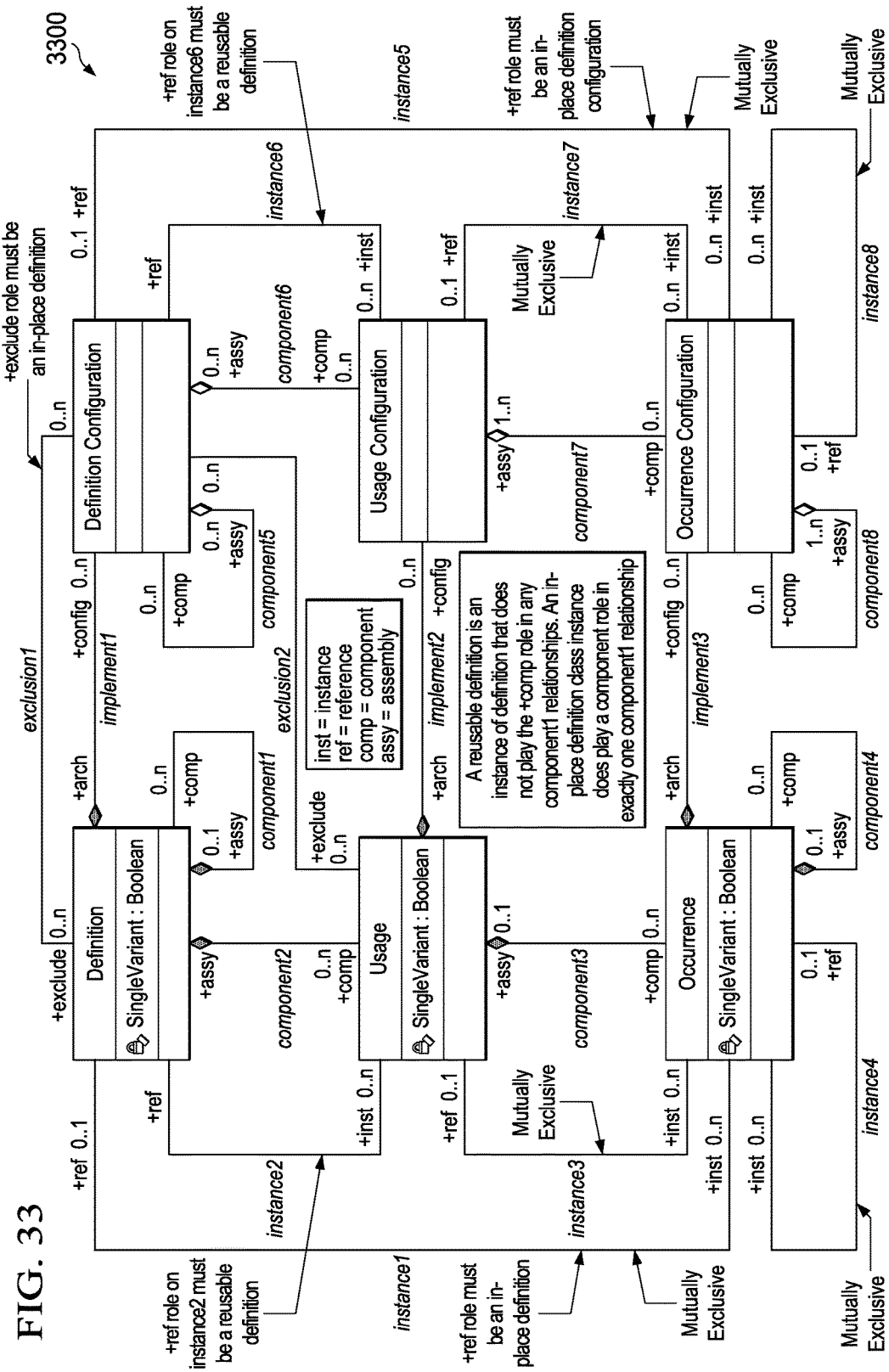
FIG. 33 is an illustration of a data model in accordance with an illustrative embodiment.

FIG. 33 is an illustration of a data model depicted in accordance with an illustrative embodiment. In this illustrative example, data model 3300 is an example of one manner in which model 114 in FIG. 1 may be implemented using the Unified Modeling Language (UML).

Figure 34:
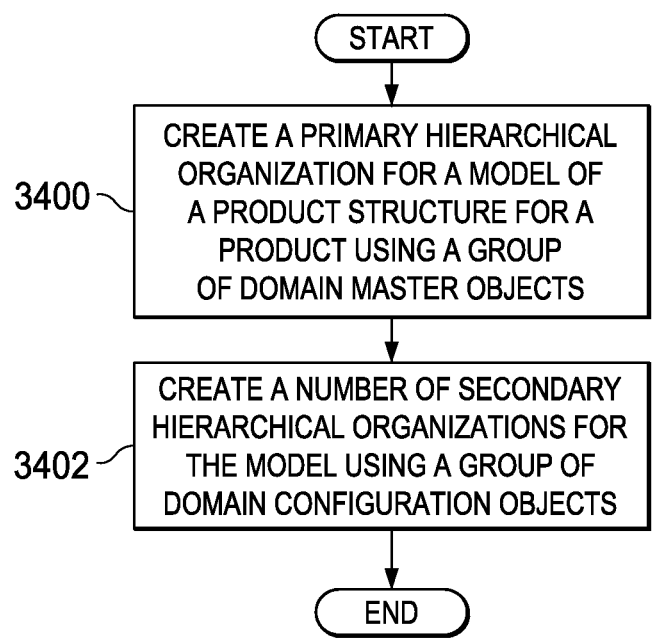
FIG. 34 is an illustration of a process for managing variations in a product structure for a product in the form of a flowchart in accordance with an illustrative embodiment.

FIG. 34 is an illustration of a process for managing variations in a product structure for a product in the form of a flowchart depicted in accordance with an illustrative embodiment. The process described in FIG. 34 may be implemented using data manager 116 and visualizer 166 in FIG. 1.

Additionally, the process illustrated in FIG. 34 may be implemented using one or more processors, possibly in a networked or distributed environment, such as, but not limited to, data processing system 3600 in FIG. 36 below. As used herein, the terms "data manager" and "visualizer" are not limited to data manager 116 or visualizer 166 in FIG. 1 but may also include any processor or set of processors used together with a computer readable medium in order to effectuate the operations described herein. The process illustrated in FIG. 34 may be implemented using software, hardware, or a combination thereof.

The process may begin by creating a primary hierarchical organization for a model of a product structure for a product using a group of master domain objects (operation 3400). The model created in operation 3400 may be, for example, model 114 in FIG. 1. The primary hierarchical organization may be primary hierarchical organization 144 in FIG. 1.

Thereafter, a number of secondary hierarchical organizations for the model may be created using a group of domain configuration objects (operation 3402), with the process terminating thereafter. Each secondary hierarchical organization in the number of secondary hierarchical organizations may be associated with the primary hierarchical organization. Further, each secondary hierarchical organization may be configured to represent a variant of the product. A number of configuration objects in each secondary hierarchical organization may represent a number of variations in the product structure for the product.

In this illustrative example, when a representation of a new variant of the product is to be added to the model, a new secondary hierarchical organization may be added to the model. The new secondary hierarchical organization may be associated with the primary hierarchical organization and may share at least one configuration object with another secondary hierarchical organization in the number of secondary hierarchical organizations in the model. In this manner, the new secondary hierarchical organization may be optimized. In particular, the new secondary hierarchical organization may be an optimized product variant structure.

The flowchart and block diagrams in the different depicted embodiments illustrate the architecture, functionality, and operation of some possible implementations of apparatuses and methods in an illustrative embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowchart or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

FIG. 35A, FIG. 35B, and FIG. 35C form a table of terms and descriptions for these terms depicted in accordance with an illustrative embodiment. In this illustrative example, table 3500 includes terms 3502 and descriptions 3504. Terms 3502 may comprise terms related to the different illustrative embodiments as described in FIGS. 1-32 above. Further, descriptions 3504 are illustrative examples of the definitions for the terms included in terms 3502 in accordance with the usage of these terms in FIGS. 1-32.

FIG. 36 is an illustration of a data processing system in the form of a block diagram depicted in accordance with an illustrative embodiment. In this illustrative example, data processing system 3600 may be used to implement one or more computers in computer system 118 in FIG. 1. In particular, data manager 116 from FIG. 1 may be implemented in data processing system 3600. As depicted, data processing system 3600 includes communications framework 3602, which provides communications between processor unit 3604, memory 3606, persistent storage 3608, communications unit 3610, input/output unit 3612, and display 3614.

Processor unit 3604 serves to run instructions for software that may be loaded into memory 3606. Processor unit 3604 may be a number of processors, a multi-processor core, or some other type of processor, depending on the particular implementation.

Memory 3606 and persistent storage 3608 are examples of storage devices 3616. A storage device is any piece of hardware that is capable of storing information, such as, for example, without limitation, data, program code in functional form, and/or other suitable information either on a temporary basis and/or a permanent basis. Storage devices 3616 also may be referred to as computer readable storage devices or non-transitory storage devices in these examples.

Memory 3606, in these examples, may be, for example, a random access memory or any other suitable volatile or non-volatile storage device. In some cases, memory 3606 may take the form of associative memory. Depending on the implementation, model 114 from FIG. 1 may be stored in memory 3606.

Persistent storage 3608 may take various forms, depending on the particular implementation. For example, persistent storage 3608 may contain one or more components or devices. For example, persistent storage 3608 may be a hard drive, a flash memory, a rewritable optical disk, a rewritable magnetic tape, or some combination of the above.

Communications unit 3610, in these examples, provides for communications with other data processing systems or devices. In these examples, communications unit 3610 is a network interface card that may provide communications through the use of physical and/or wireless communications links.

Input/output unit 3612 allows for input and output of data between data processing system 3600 and other devices. For example, input/output unit 3612 may provide a connection for user input through a keyboard, a mouse, a printer, and/or some other suitable input device. Display 3614 provides a mechanism to display information to a user.

Instructions for the operating system, applications, and/or programs may be located in storage devices 3616, which are in communication with the processor unit 3604 through communications framework 3602. In these illustrative examples, the instructions are in a functional form on persistent storage 3608. These instructions may be loaded into memory 3606 for execution by processor unit 3604. The processes of the different embodiments may be performed by processor unit 3604 using computer-implemented instructions, which may be located in a memory, such as memory 3606.

These instructions are referred to as program code, computer usable program code, or computer readable program code that may be read and executed by a processor in processor unit 3604. The program code in the different embodiments may be embodied on different physical or computer readable storage media, such as memory 3606 or persistent storage 3608.

For example, data manager 116 from FIG. 1 may be implemented as program code. In some cases, data manager 116 may be implemented as a software layer on top of an existing database structure stored in memory 3606 or persistent storage 3608. Further, data manager 116 from FIG. 1 may be implemented in program code in the form of software tools such as, for example, without limitation, authoring software, text-based software, database management software, artificial intelligence software, and/or other types of software.

Program code 3618 is located in a functional form on computer readable media 3620 that is selectively removable and may be loaded onto or transferred to data processing system 3600 for execution by processor unit 3604. Program code 3618 and computer readable media 3620 form computer program product 3622 in these examples. In one example, computer readable media 3620 may be computer readable storage media 3624 or computer readable signal media 3626.

Computer readable storage media 3624 may include, for example, an optical or magnetic disk that is inserted or placed into a drive or other device that is part of persistent storage 3608 for transfer onto a storage device, such as a hard drive, that is part of persistent storage 3608. Computer readable storage media 3624 also may take the form of a persistent storage, such as a hard drive, a thumb drive, or a flash memory, that is connected to data processing system 3600.

In these examples, computer readable storage media 3624 is a physical or tangible storage device used to store program code 3618 rather than a medium that propagates or transmits program code 3618.

Alternatively, program code 3618 may be transferred to data processing system 3600 using computer readable signal media 3626. Computer readable signal media 3626 may be, for example, a propagated data signal containing program code 3618. For example, computer readable signal media 3626 may be an electromagnetic signal, an optical signal, and/or any other suitable type of signal.

The different components illustrated for data processing system 3600 are not meant to provide architectural limitations to the manner in which different embodiments may be implemented. The different illustrative embodiments may be implemented in a data processing system including components in addition to or in place of those illustrated for data processing system 3600. Other components shown in FIG. 36 can be varied from the illustrative examples shown. The different embodiments may be implemented using any hardware device or system capable of running program code.

In another illustrative example, processor unit 3604 may take the form of a hardware unit that has circuits that are manufactured or configured for a particular use. This type of hardware may perform operations without needing program code to be loaded into a memory from a storage device to be configured to perform the operations.

For example, when processor unit 3604 takes the form of a hardware unit, processor unit 3604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 3618 may be omitted In still another illustrative example, processor unit 3604 may be implemented using a combination of processors found in computers and hardware units. Processor unit 3604 may have a number of hardware units and a number of processors that are configured to run program code 3618. With this depicted example, some of the processes may be implemented in the number of hardware units, while other processes may be implemented in the number of processors. In some cases, processor unit 3604 may be part of an artificial intelligence system.

Thus, the different illustrative embodiments may provide a method and apparatus for managing variations in a product structure for a product using a model for the product structure. In one illustrative embodiment, a product management system for managing variations in a product structure for a product comprises a model and a data manager. The model comprises a primary hierarchical organization and a number of optimized product variant structures. The primary hierarchical organization comprises a group of domain master objects. The number of optimized product variant structures comprises a group of domain configuration objects in which each domain configuration object in the group of domain configuration objects represents a configuration for a component represented by a corresponding domain master object in the group of domain master objects. The data manager is configured to manage the variations in the product structure using the model.

The different illustrative embodiments provide a method and apparatus for managing the different possible variations in a produce that reduces using a model comprising objects belonging to classes derived from fundamental classes, such as fundamental classes 121 in FIG. 1. In particular, different variants of a product may be represented within a single model. In some illustrative examples, using optimized product variant structures within the model may reduce the amount of data storage needed to capture the different variations in the product structure for a product from, for example, gigabytes, to, for example, kilobytes. In some cases, the data storage needed may be reduced from terabytes to megabytes or kilobytes.

With this type of model, minor variations to a few components in a product comprising billions or trillions of components may be represented without needing to duplicate the model or portions of the model. New variations to a product structure for a product that form a new variant of the product may be captured in the model using a new optimized product variant structure. The new optimized product variant structure may comprise a number of new configuration objects that represent the different variations to the product structure as well as a number of shared configuration objects. The number of shared configuration objects may be shared with at least one of other optimized product variant structure in the model. In this manner, the overall data footprint of the model may be optimized.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A data processing system for reducing an amount of data storage used to capture variations in a product structure, relative to storing each variation individually, by managing variations in a product structure for a product, the data processing system comprising:
    a processor; and
    a non-transitory computer recordable storage medium in communication with the processor and storing a model, the model comprising:
        a primary hierarchical organization comprising a group of domain master objects, a main structure, and a number of instantiated structures, wherein at least one domain master object in the main structure is associated with an instantiated structure in the number of instantiated structures, the group of domain master objects comprising a number of objects considered necessary in a product structure; and
        a number of optimized product variant structures comprising a group of domain configuration objects in which each domain configuration object in the group of domain configuration objects represents a configuration for a component represented by a corresponding domain master object in the group of domain master objects, wherein the number of optimized product variant structures is a number of secondary hierarchical organizations in which each secondary hierarchical organization in the number of secondary hierarchical organizations is associated with the primary hierarchical organization and configured to represent a variant of the product and wherein a number of domain configuration objects in the each secondary hierarchical organization represents a number of variations in the product structure for the product; and
        wherein the group of domain master objects and the group of domain configuration objects belong to domain classes derived from fundamental classes, wherein a domain master object in the group of domain master objects is selected from one of a domain definition object, a domain usage object, and a domain occurrence object, and wherein a domain configuration object in the group of domain configuration objects is selected from one of a definition configuration object, a usage configuration object, and a usage configuration object; and
    the processor configured to modify the non-transitory computer recordable storage medium by being configured to add a secondary hierarchical organization to the model for a new variant of the product and to nest the number of secondary hierarchical organizations within the primary hierarchical organization, whereby a first amount of data storage used to store the model in the non-transitory computer recordable storage medium is less than a second amount of data storage which would be used to store individually the number of variations in the model.

2. The product management system of claim 1, wherein a secondary hierarchical organization in the number of secondary hierarchical organizations further comprises:
    a main structure; and
    a number of instantiated structures, wherein at least one domain configuration object in the main structure is associated with an instantiated structure in the number of instantiated structures.

3. The product management system of claim 1, wherein domain master objects in the group of domain master objects in the primary hierarchical organization are connected to each other by primary structural links and primary instance links and wherein domain configuration objects in the number of domain configuration objects in the each secondary hierarchical organization are connected to each other by secondary structural links and secondary instance links.

4. The product management system of claim 1 further comprising:
    a data manager configured to manage the variations in the product structure using the model, wherein the data manager is configured to represent a variant of the product in the model by creating a new secondary hierarchical organization in the model that is associated with the primary hierarchical organization.

5. The product management system of claim 4, wherein the new secondary hierarchical organization shares at least one domain configuration object with another secondary hierarchical organization in the number of secondary hierarchical organizations.

6. The product management system of claim 1, wherein at least two optimized product variant structures in the number of optimized product variant structures share a same number of domain configuration objects.

7. The product management system of claim 1, wherein a domain configuration object in the group of domain configuration objects is selected from one of a domain definition configuration object, a domain usage configuration object, and a domain occurrence configuration object.

8. The product management system of claim 1, wherein the model is a first model corresponding to a first domain and further comprising:
    a second model corresponding to a second domain, wherein at least one object in the first model maps to a corresponding object in the second model.

9. The product management system of claim 1, wherein the model further comprises:
    a set of auxiliary objects belonging to auxiliary classes in which the auxiliary classes are derived from the fundamental classes.

10. The product management system of claim 9, wherein the set of auxiliary objects comprises:
    a set of port objects, wherein the set of port objects includes at least one of a set of port master objects and a set of port configuration objects.

11. The product management system of claim 10, wherein the set of auxiliary objects further comprises:
    a set of connection objects, wherein a connection object in the set of connection objects is configured to connect a connectable port object in the set of port objects to another connectable port object in the set of port objects.

12. The product management system of claim 10, wherein the set of auxiliary objects further comprises:
    a set of promotion objects, wherein a promotion object in the set of promotion objects is configured to promote a connectable port object to a role of an interface port object.

13. An apparatus for reducing an amount of data storage used to capture variations in a product structure, relative to storing each variation individually, by managing variations in a product structure for a product, the apparatus comprising:
- a data processing system storing a model, the model comprising:
  - a primary hierarchical organization comprising a group of domain master objects in which a domain master object in the group of domain master objects belongs to a domain master class derived from a corresponding fundamental class, the group of domain master objects comprising a number of objects considered necessary in a product structure; and
  - a number of optimized product variant structures comprising a group of domain configuration objects in which a domain configuration object in the group of domain configuration objects belongs to a domain configuration class derived from the corresponding fundamental class, wherein each domain configuration object in the group of domain configuration objects represents a configuration for a component represented by a corresponding domain master object in the group of domain master objects, wherein the number of optimized product variant structures is a number of secondary hierarchical organizations in which each secondary hierarchical organization in the number of secondary hierarchical organizations is associated with the primary hierarchical organization and configured to represent a variant of the product and wherein a number of domain configuration objects in the each secondary hierarchical organization represents a number of variations in the product structure for the product;
  - wherein the group of domain master objects and the group of domain configuration objects belong to domain classes derived from fundamental classes, wherein a domain master object in the group of domain master objects is selected from one of a domain definition object, a domain usage object, and a domain occurrence object, and wherein a domain configuration object in the group of domain configuration objects is selected from one of a definition configuration object, a usage configuration object, and a usage configuration object;
- the data processing system configured to add a secondary hierarchical organization to the model for a new variant of the product and to nest the number of secondary hierarchical organizations within the primary hierarchical organization, whereby a first amount of data storage used to store the model in the data processing system is less than a second amount of data storage which would be used to store individually the number of variations in the model.

14. The apparatus of claim 13 further comprising:
- a data manager configured to manage the variations in the product structure using the model and represent a variant of the product in the model by creating a new optimized product variant structure in the model that is associated with the primary hierarchical organization, wherein the variant of the product comprises a number of variations to the product structure for the product and wherein the new optimized product variant structure shares at least one configuration object with another optimized product variant structure in the number of optimized product variant structures.

15. A computer-implemented method for reducing an amount of data storage used to capture variations in a product structure, relative to storing each variation individually, by managing variations in a product structure for a product, the method comprising:
- creating on a data processing system a primary hierarchical organization for a model of the product structure for the product using a group of domain master objects, the group of domain master objects comprising a number of objects considered necessary in a product structure;
- creating a number of optimized product variant structures for the model using a group of domain configuration objects in which each domain configuration object in the group of domain configuration objects represents a configuration for a component represented by a corresponding domain master object in the group of domain master objects;
- storing on a storage device in communication with the data processing system, at least one of the primary hierarchical organization and the number of optimized product variant structures store in the storage device, wherein an optimized model is formed, and whereby a first amount of data storage used to store the optimized model in the storage device is less than a second amount of data storage which would be used to store individually the number of variations in the optimized model.

16. The computer-implemented method of claim 15 further comprising:
- adding a new optimized product variant structure to the optimized model in which the new optimized product variant structure is associated with the primary hierarchical organization, wherein the new optimized product variant structure represents a new variant of the product and wherein the variant of the product comprises a number of variations to the product structure for the product.

17. The computer-implemented method of claim 16, wherein the step of adding a new secondary hierarchical organization to the optimized model comprises:
- adding the new optimized product variant structure to the optimized model such that the new optimized product variant structure shares at least one configuration object with another optimized product variant structure in the number of optimized product variant structures.

* * * * *